(12) United States Patent
Ohashi et al.

(10) Patent No.: US 6,747,818 B2
(45) Date of Patent: Jun. 8, 2004

(54) IMAGE FORMING LENS, IMAGE FORMING LENS UNIT, ORIGINAL DOCUMENT READING MODULE, APPARATUS AND METHOD, AND IMAGE INFORMATION PROCESSING APPARATUS

(75) Inventors: Kazuyasu Ohashi, Funabashi (JP); Kiichiro Nishina, Yokohama (JP); Akihisa Itabashi, Tokyo (JP)

(73) Assignee: Ricoh Company Ltd., Tokyo (JP)

( * ) Notice: Subject to any disclaimer, the term of this patent is extended or adjusted under 35 U.S.C. 154(b) by 218 days.

(21) Appl. No.: 09/946,482

(22) Filed: Sep. 6, 2001

(65) Prior Publication Data
US 2002/0101665 A1 Aug. 1, 2002

(30) Foreign Application Priority Data

Sep. 6, 2000 (JP) .......................................... 2000-270483
Apr. 2, 2001 (JP) .......................................... 2001-103207

(51) Int. Cl.[7] ............................. G02B 9/62; G02B 27/02
(52) U.S. Cl. ........................................ 359/806; 359/760
(58) Field of Search ................................. 359/806, 668, 359/809, 811, 754–796, 746–748

(56) References Cited

U.S. PATENT DOCUMENTS 3,644,037 A * 2/1972 Larrabu ........................ 355/52
4,564,269 A * 1/1986 Uehara ....................... 359/650
4,585,314 A * 4/1986 Tateoka ....................... 359/761
6,111,703 A * 8/2000 Hozumi ....................... 359/772
6,181,488 B1 * 1/2001 Yoneyama et al. ......... 359/772

* cited by examiner

Primary Examiner—Huang Xuan Dang
Assistant Examiner—Joseph Martinez
(74) Attorney, Agent, or Firm—Dickstein Shapiro Mortin & Oshinsky LLP

(57) ABSTRACT

An image forming lens for forming an image of an original document includes a front side lens group arranged at an object side and a rear side lens group arranged at an image forming side. The front side lens group includes from 2 to 4 lenses including at least one positive lens, and the rear side lens group includes one negative lens. The back-focus of the image forming lens when in use is equal to or smaller than 25% of an entire length of the image forming lens, and the open space between the front side lens group and the rear side lens group is equal to or greater than 50% of the entire length of the image forming lens. The front side lens group lens can include two, three or four pieces of lenses. By configuring an image forming lens with at least three lenses, correction of aberration is easy and high performance can be realized.

166 Claims, 30 Drawing Sheets

EXAMPLE 1

EXAMPLE 2

EXAMPLE 3

FIG. 25
EXAMPLE 4
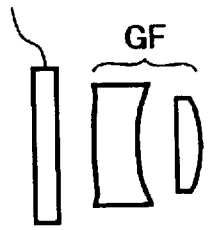
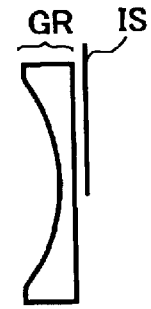
FIG. 26
EXAMPLE 5
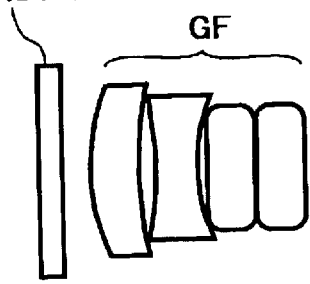
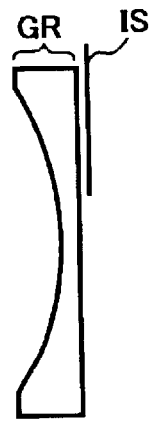
FIG. 27
EXAMPLE 6
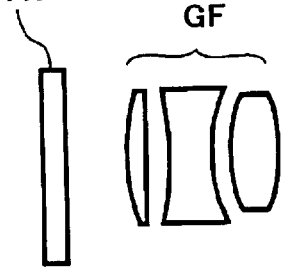

FIG. 28
EXAMPLE 7
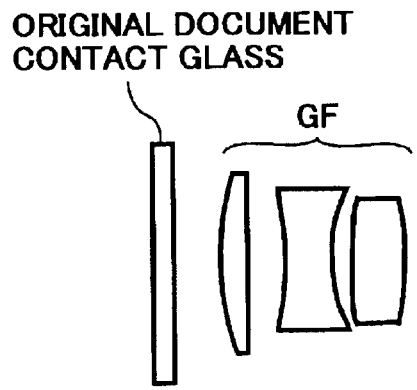
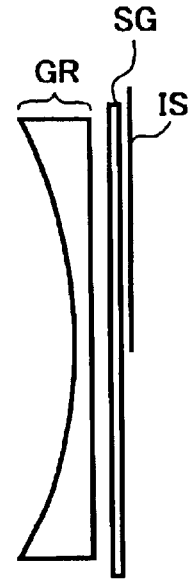
FIG. 29
EXAMPLE 8
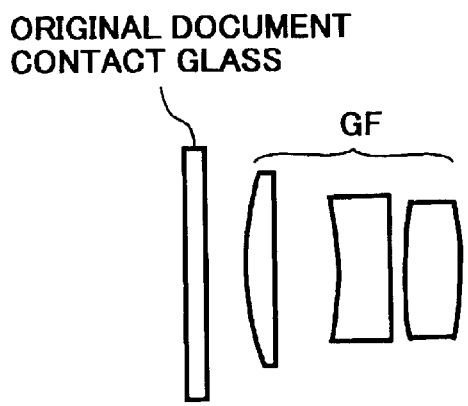
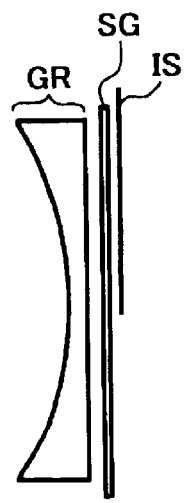

EXAMPLE 9

EXAMPLE 10

FIG. 32
EXAMPLE 11
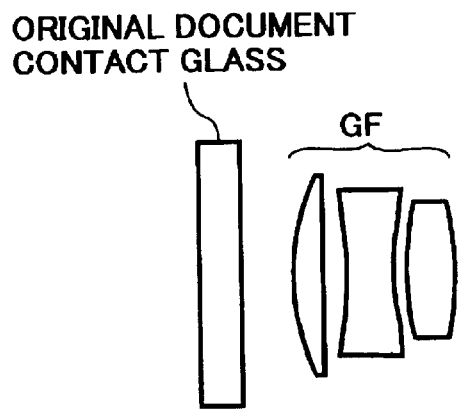
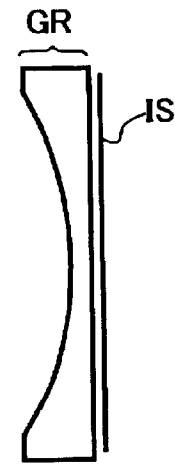
FIG. 33
EXAMPLE 12
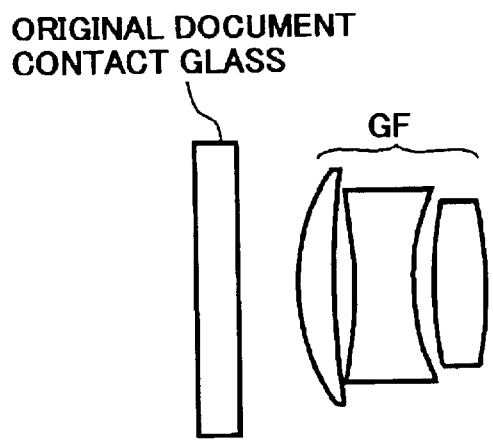
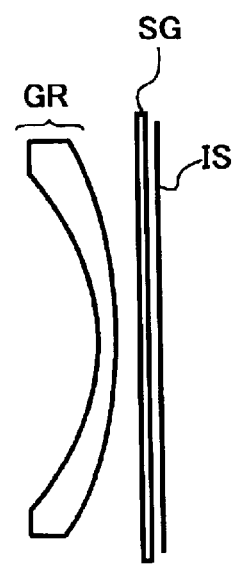

FIG. 34
EXAMPLE 13
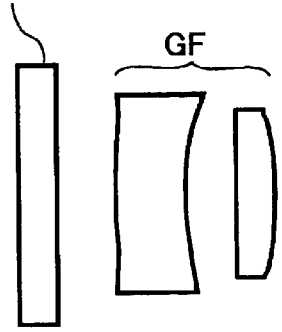
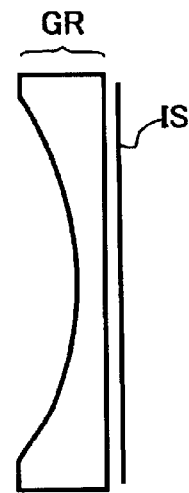
FIG. 35
EXAMPLE 14
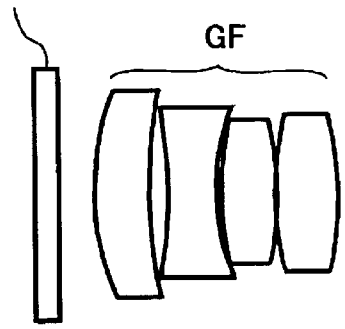
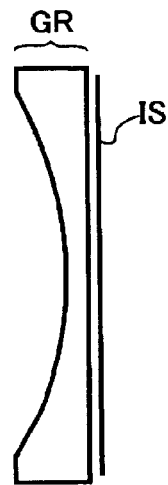

FIG. 36
EXAMPLE 15
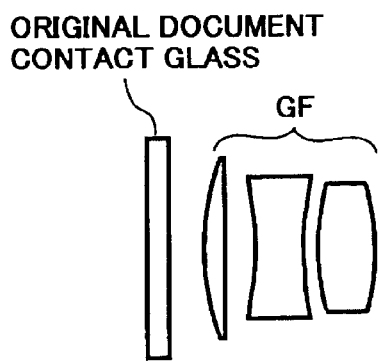
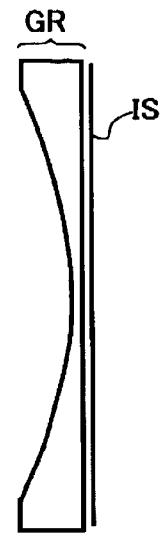
FIG. 37
EXAMPLE 16
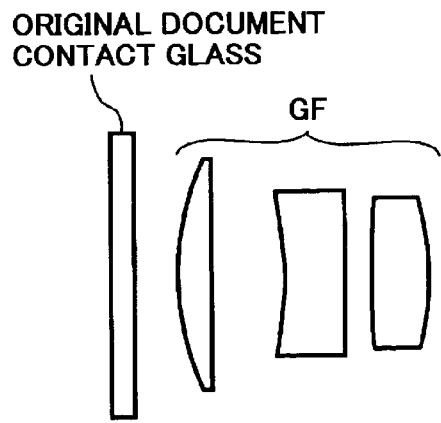
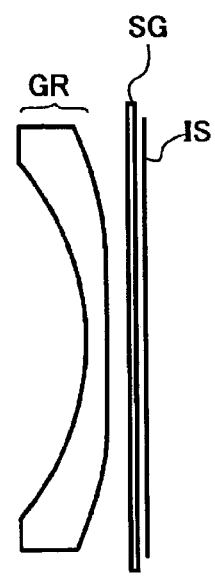

EXAMPLE 17

EXAMPLE 18

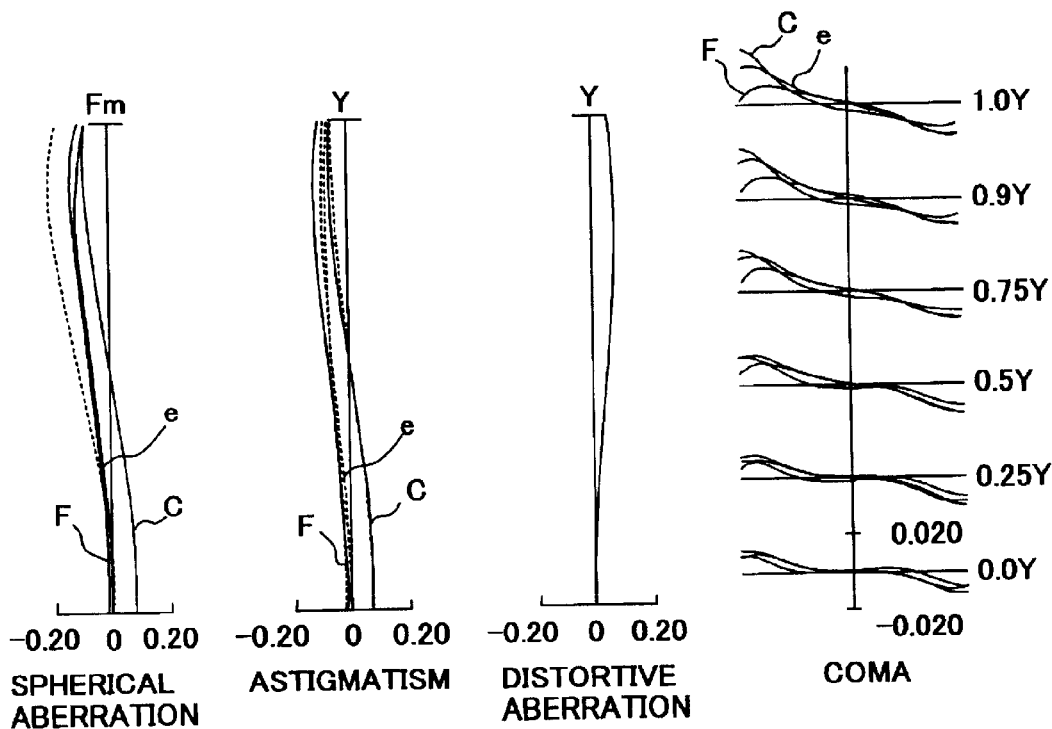
FIG.40 EXAMPLE 1
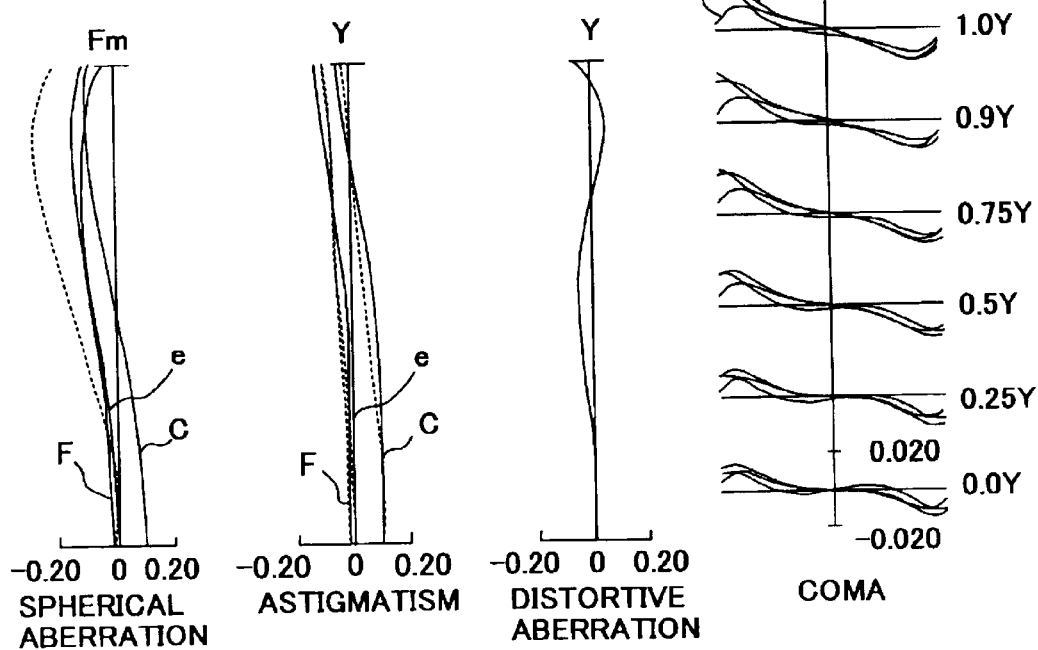
FIG.41 EXAMPLE 2

EXAMPLE 3

EXAMPLE 4

EXAMPLE 5

EXAMPLE 6

EXAMPLE 7

EXAMPLE 8

EXAMPLE 9

EXAMPLE 10

EXAMPLE 11

EXAMPLE 12

EXAMPLE 13

EXAMPLE 14

EXAMPLE 15

EXAMPLE 16

EXAMPLE 17

EXAMPLE 18

IMAGE FORMING LENS, IMAGE FORMING LENS UNIT, ORIGINAL DOCUMENT READING MODULE, APPARATUS AND METHOD, AND IMAGE INFORMATION PROCESSING APPARATUS

BACKGROUND OF THE INVENTION

1. Field of the Invention

The present invention relates to an image forming lens, an image forming lens unit, an original document reading module, an original document reading method, an original document reading apparatus and an image information processing apparatus.

2. Description of the Related Art

An image forming lens is used in original document reading parts of various image forming apparatuses such as copying machines, facsimile machines, multi-functional products, etc. The image forming lens is also used in image scanners for reading an original document. The resolution of reading an original document with such apparatuses has recently increased from 300 or 400 dpi (dots per inch) to 600 dpi, and more recently to 1200 dpi. With such increase in the resolution of reading an original document with such apparatuses, higher performance is demanded for the lenses for use in reading the original document.

It is known that Gauss type lenses can accomplish a high resolution with a relatively wide lens diameter. The Gauss type lenses are widely used in original document reading parts of digital copying machines, multi-functional products, etc. and high-end flatbed image scanners. However, for realizing the higher performance recently demanded for an image forming lens, at least 6 pieces of lenses are required, as described for example in Japanese Patent Laid-open Publication No. 2000-111794. Therefore, the cost of such an image forming lens is inevitably high.

Japanese Patent Laid-open Publication No. 7-56085 describes an image forming lens having a two-lens construction. However, the image forming lens having a two-lens construction has a limitation in realizing such a higher performance recently demanded for the image forming lens. Therefore, the image forming lens having a two-lens construction is not suitable for use in an original document reading part of digital copying machines and multi-functional products requiring a relatively high resolution, and is generally used in facsimile apparatuses or image scanners not requiring a high reading resolution.

Also, an image forming lens having an anamorphic lens surface is known to be used in original document reading parts of digital copying machines, etc., as described for example in Japanese Patent Laid-open Publication No. 2000-307800. However, in the image forming lens of JP No. 2000-307800, the lens having the anamorphic lens surface is not arranged close to the image surface of the image forming lens, and therefore the effect of the anamorphic lens surface is not sufficiently realized.

For enhancing the performance of an image forming lens, it is conceivable to form a surface thereof in a non-spherical shape. Further, when the above-described original document reading parts of digital copying machines, etc. and the image scanners include a one-dimensional light receiving element array (line sensor), in addition to forming a surface of the image forming lens in a non-spherical shape, another surface thereof can be formed in an anamorphic shape, as described in Japanese Patent Laid-open Publication No. 2000-307800. However, as described above, the effect of the anamorphic lens surface is not sufficiently realized.

SUMMARY OF THE INVENTION

The present invention has been made in view of the above-discussed and other problems and addresses the above-discussed and other problems.

Preferred embodiments of the present invention provide a novel image forming lens that has a lesser number of lenses in comparison with Gauss type lenses and that yet has a performance higher than or equivalent to that of the Gauss type lenses.

Other preferred embodiments of the present invention provide an image forming lens that has the function and performance exceeding those of image forming lenses having a lens surface of an anamorphic shape and that is yet relatively low in cost.

According to a preferred embodiment of the present invention, an image forming lens for forming an image of an original document includes a front side lens group arranged at an object side and a rear side lens group arranged at an image forming side. The front side lens group includes from 2 to 4 individual lenses including at least one positive lens, and the rear side lens group includes one negative lens. The back-focus of the image forming lens when in use is equal to or smaller than 25% of an entire length of the image forming lens, and the air space, i.e., open space, between the front side lens group and the rear side lens group is equal to or greater than 50% of the entire length of the image forming lens. The front side lens group lens can include two, three or four lenses. By configuring an image forming lens with three individual lenses, correction of aberration is easy and relatively high performance can be realized.

In the above-described image forming lens, each lens can be spherical, so that manufacturing of each lens is relatively easy and thereby the image forming lens is realized at relatively low cost.

The above-described image forming lens can be configured such that at least one lens surface thereof is non-spherical. The non-spherical surface can be the incident side surface of the rear side lens group or the imaging side surface of the rear side lens group. That is, the rear side lens group can be configured such that the object side surface and/or the imaging side surface of thereof are non-spherical.

In the above-described image forming lens, the rear side lens group can be of plastic construction. In the above-described image forming lens, because the rear side lens group is disposed close to the image surface of the image forming lens, the rear side lens group is larger than the front side lens group. Accordingly, by using a plastic lens for the rear side lens group, the cost of the image forming lens can be further reduced. By using a plastic lens for the rear side lens group, the object side surface and/or the imaging side surface thereof can be easily formed in non-spherical shapes.

In the above-described image forming lens, because the rear side lens group is disposed close to the image surface of the image forming lens and a light receiving element array is arranged at the image surface, the outer shape of the rear side lens group can have a rotational asymmetry with respect to the optical axis of the image forming lens. In this case, the outer shape of the rear side lens group may be in a strip-like form having a long dimension in a main scanning direction. Here, the main scanning direction corresponds to the direction in which light receiving elements of the light receiving element array are arranged.

When the rear side lens group is plastic, an engaging part for positioning, supporting or fixing the image forming lens can be formed at a part of the rear side lens group. The engaging part can be protruding or concave.

In the above-described image forming lens, the back-focus of the image forming lens in the actual usage state thereof can be equal to or smaller than 10% of the entire length of the image forming lens. The smaller back-focus is advantageous in correcting aberration. However, if the back-focus is relatively large within the limit of 25% of the entire length of the image forming lens, for example, an adjusting mechanism for adjusting the position of a light receiving element array relative to the rear side lens group can be advantageously arranged within the back-focus.

In the above-described image forming lens, as described above, the outer shape of the rear side lens group can have a rotational asymmetry with respect to the optical axis of the image forming lens. However, the above-described image forming lens can be configured such that the outer shapes of the front side lens group and the rear side lens group have a rotational symmetry with respect to the optical axis of the image forming lens and thereby the entire image of an original document can be read at one time with an area sensor.

In the above-described image forming lens, for realizing high performance, the balance between the focal length of the front side lens group $f_F$ and the focal length of the rear side lens group $f_R$ is important. Preferably, the ratio $f_R/f_F$ should be in the range of $-1.8 < f_R/f_F < -0.8$.

According to another preferred embodiment of the present invention, an image forming lens unit includes the above-described image forming lens and a supporting device configured to support each lens of the front side lens group and the rear side lens group and to integrate the front side lens group and the rear side lens group with each other.

The supporting device can be configured such that a front side lens group supporting part for supporting the front side lens group and a rear side lens group mounting part for mounting the rear side lens group are integrally formed. Alternatively, the supporting device may include a front side lens group supporting device for supporting the front side lens group, a rear side lens group supporting device for supporting the rear side lens group and a connecting device to connect the front side lens group supporting device and the rear side lens group supporting device with each other. In each of the above-described cases, the front side lens group can be made so as to move in the optical axis direction of the image forming lens relative to the rear side lens group supporting device or to rotate around the optical axis of the image forming lens, or to move in the optical axis direction and rotate around the optical axis. When the front side lens group can move in the optical axis direction, the focusing can be made by movement of the front side lens group in the optical axis direction. When the front side lens group is rotatable around the optical axis, inclination of the image surface due to eccentricity in the image forming lens can be corrected by rotating the front side lens group.

In the above-described image forming lens unit, one or more folding mirrors for bending an optical path of the image forming lens can be provided between the front side lens group and the rear side lens group. Thereby, freedom in the layout of the image forming lens can he increased.

Further, the above-described image forming lens unit may include a shading device for correcting the brightness of an image at the image surface in the main scanning direction, between the front side lens group and the rear side lens group. In this case, the shading device can be a shielding plate having an opening of a predetermined shape. The folding mirror may have a reflecting surface of a predetermined shape so as to function as a shielding device to correct the brightness of an image at the image surface of the image forming lens in the main scanning direction. When the above-described image forming lens unit is configured such that the entire image of an original document can be read at one time with an area sensor, the shading device can be configured so as to correct the brightness of an image on the area sensor.

According to another preferred embodiment of the present invention, an original document reading module for forming an image of an original document and converting image information of the image into electrical signals includes an image forming lens and a light receiving element array. The image forming lens is configured as described above. The light receiving element array is configured to photo-electrically convert image information of the image of the original document formed by the image forming lens on the light receiving element array into the electrical signals.

In the above-described image forming lens module, the rear side lens group and the light receiving element array can be integrated with each other. Further, when the back-focus of the image forming lens in the actual usage state thereof is relatively small, the image forming lens module may be configured such that the imaging side surface of the rear side lens group functions as a shielding member of a package of the light receiving element array. In particular, when the back-focus of the image forming lens is substantially zero, that is, the imaging side surface of the rear side lens group coincides with the image surface of the image forming lens, the light receiving element array may be directly attached to the imaging side surface of the rear side lens group. In this case, the imaging side surface of the rear side lens group can be non-spherical.

In the above-described image forming lens module, the supporting device can be configured in substantially the same manner as described above with respect to an image forming lens unit according to a preferred embodiment of the present invention.

Further, in the above-described image forming lens module, one or more folding mirrors for bending an optical path of the image forming lens can be provided between the front side lens group and the rear side lens group. Furthermore, the above-described image forming lens module may include a shading device for correcting the brightness of an image at the image surface in the main scanning direction, between the front side lens group and the rear side lens group. In this case, the shading device can be a shielding plate having an opening of a predetermined shape. The folding mirror may have a reflecting surface of a predetermined shape so as to function as a shielding device to correct the brightness of an image at the image surface of the image forming lens in the main scanning direction. When the above-described image forming lens unit is configured such that the entire image of an original document can be read at one time with an area sensor, the shading device can be configured so as to correct the brightness of an image on the area sensor.

According to another preferred embodiment of the present invention, an original document reading apparatus includes a scanning device configured to scan an original document; a light receiving element array configured to photo-electrically convert image information of an image formed thereupon into electrical signals; an image forming lens configured to image a light flux from the original document being scanned by the scanning device so as to form an image of the original document on the light receiving element array; a signal processing device configured to signal-process the electrical signals of the light receiving element array; and an image processing device configured to apply image processing to the electrical signals processed by the signal processing device. The image forming lens is configured as described above.

In the above-described original document reading apparatus, the image forming lens may include a supporting device configured to support each lens of the front side lens group and the rear side lens group and to integrate the front side lens group and the rear side lens group with each other, and the image forming lens and the supporting device may be integrated with each other so as to form the image forming lens unit described above.

Further, in the above-described original document reading apparatus, the image forming lens and the light receiving element array may be integrated with each other so as to form the original document reading module described above.

Furthermore, in the above described original document reading apparatus, the scanning device may include an original document contact glass provided at a predetermined position, a conveying device configured to convey the original document contacting the original document contact glass over the contact glass, and an illuminating device configured to illuminate the original document being conveyed over the contact glass across a main scanning direction of the original document. Alternatively, the scanning device may include an original document glass on which the original document is flatly placed at a predetermined position, an illuminating device configured to illuminate the original document placed at the predetermined position on the contact glass across a main scanning direction of the original document, a series of mirrors for guiding a light flux from a part of the original document illuminated by the illuminating device to the image forming lens through an optical path from the illuminated part of the original document to the image forming lens, and a moving device configured to move the illuminating device in a sub-scanning direction and to move the series of mirrors so as to maintain the optical path from the illuminated part of the original document to the image forming lens at a constant length.

In the above-described original document reading apparatus, the signal processing device or the image processing device may be configured to process the electrical signals of the light receiving element array such that a size of the image of the original document formed by the image forming lens on the light receiving element array is electrically adjusted. Alternatively, the signal processing device and the image processing device may be configured to process the electrical signals of the light receiving element array such that a size of the image of the original document formed by the image forming lens on the light receiving element array is electrically adjusted.

According to still another preferred embodiment of the present invention, an image information processing apparatus includes an original document reading device configured to read an image of an original document to convert image information of the image into electrical signals and an outputting device configured to output the electrical signals of the original document reading device. The original document reading device is configured as described above.

In the above described image information processing apparatus, the outputting device may include a display device to display the image information, such as a CRT, a liquid crystal display device or a liquid crystal panel of a liquid crystal projector, or a writing device to write the image information onto an electrical recording medium, such as a magnetic tape, a magnetic disc or an optical disc. Further, the outputting device may include a transmitting device to transmit the image information over a wired or wireless communication network. The outputting device may include a printer configured to print the image information on a recording medium formed in a sheet, such as paper or an overhead projector (OHP) sheet. The printer can be an ink jet printer or an electrophotographic optical printer. Further, the outputting device may include two or more of the above-described outputting devices. For example, the outputting device may include the above-described transmitting device, the writing device and the printer. In this case, the image information processing device can be a multi-functional apparatus having the function of reading the image of an original document and writing image information of the image into a magnetic or optical disc, the function of transmitting the image information via facsimile transmission, and the function of forming the image information on a sheet-like recording medium.

According to still another preferred embodiment of the present invention, an image forming lens for forming an image of an original document includes a front side lens group having 2 or more lenses and arranged at an object side, said 2 more lenses including at least one positive lens; and a rear side lens group including one negative lens and arranged at an image forming side. The back-focus of the image forming lens in an actual usage state thereof is equal to or smaller than 25% of an entire length of the image forming lens, an open space between the front side lens group and the rear side lens group is equal to or greater than 50% of the entire length of the image forming lens, and the rear side lens group includes at least one anamorphic surface.

According to still another preferred embodiment of the present invention, a method of reading an image of an original document includes the steps of providing an image forming lens configured as described above; scanning the original document and forming the image of the original document on a light receiving element array with the image forming lens; and converting image information of the image of the original document formed on the light receiving element array by the image forming lens into electrical signals with the light receiving element array.

In the above-described method, the step of providing the image forming lens may include the step of providing a supporting device for supporting each lens of the front side lens group and the rear side lens group and for integrating the front side lens group and the rear side lens group with each other so as to form an image forming lens unit. In this case, in the scanning and image forming step, the original document is scanned and the image of the original document is formed on the light receiving element array with the image forming lens unit.

Further, the above-described method may further include the step of integrating the rear side lens group of the image forming lens and the light receiving element array with each other so that the image forming lens and the light receiving element array forms an original document reading module. In this case, in the scanning and image forming step, the original document is scanned and the image of the original document is formed on the light receiving element array of the original document reading module, and in the converting step, the image information of the image of the original document is converted into the electrical signals with the light receiving element array of the original document reading module.

Furthermore, in the above-described method, the scanning and image forming step may include the step of illuminating the original document at an original document illuminating part at a predetermined position with an illuminating device while conveying the original document relative to the original document illuminating part. Alternatively, in the above-described method, the scanning and image forming step may include the step of illuminating the original document in the main scanning direction with an illuminating device while maintaining a fixed optical path length from the image forming lens to the light receiving element array, guiding a light flux from a part of the original document illuminated by the illuminating device to the image forming lens via a series of mirrors, moving the illuminating device in the sub-scanning direction and moving the series of mirrors such that the optical path length from the illuminating device to the image forming lens is constant.

BRIEF DESCRIPTION OF THE DRAWINGS

A more complete appreciation of the present invention and many of the attendant advantages thereof will be readily obtained as the same becomes better understood by reference to the following detailed description when considered in conjunction with the accompanying drawings, wherein:

FIG. 25 is a diagram illustrating construction of an image forming lens according to example 4 of the present invention;

FIG. 26 is a diagram illustrating construction of an image forming lens according to example 5 of the present invention;

FIG. 27 is a diagram illustrating construction of an image forming lens according to example 6 of the present invention;

FIG. 28 is a diagram illustrating construction of an image forming lens according to example 7 of the present invention;

FIG. 29 is a diagram illustrating construction of an image forming lens according to example 8 of the present invention;

FIG. 32 is a diagram illustrating construction of an image forming lens according to example 11 of the present invention;

FIG. 33 is a diagram illustrating construction of an image forming lens according to example 12 of the present invention;

FIG. 34 is a diagram illustrating construction of an image forming lens according to example 13 of the present invention;

FIG. 35 is a diagram illustrating construction of an image forming lens according to example 14 of the present invention;

FIG. 36 is a diagram illustrating construction of an image forming lens according to example 15 of the present invention;

FIG. 37 is a diagram illustrating construction of an image forming lens according to example 16 of the present invention;

FIG. 40 is a diagram illustrating aberration of the image forming lens of example 1;

FIG. 41 is a diagram illustrating aberration of the image forming lens of example 2;

DETAILED DESCRIPTION OF THE PREFERRED EMBODIMENTS

Figure 1:
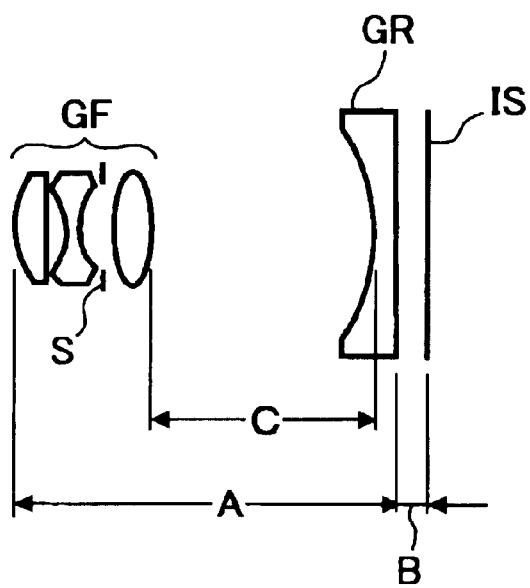
FIG. 1 is a diagram illustrating an image forming lens according to a preferred embodiment of the present invention.

Referring now to the drawings, wherein like reference numerals designate identical or corresponding parts throughout the several views, preferred embodiments of the present invention are described.

FIG. 1 is a diagram illustrating an image forming lens according to a preferred embodiment of the present invention. As illustrated in FIG. 1, the image forming lens includes a front side lens group GF at the object side (the left side in figure) and a rear side lens group GR at the image forming side. The front side lens group GF is constructed of two or more lenses, in this example, three lenses, including at least one positive lens. The rear side lens group GR is constructed of one negative lens. The front side lens group GF can be constructed of two or four lenses as described later.

In FIG. 1, the symbol IS denotes an image surface of the image forming lens. The distance B represents a back-focus (a distance between the image side surface of the rear side lens group GR and the image surface IS) when the image forming lens is in an actual usage state. Herein, the actual usage state refers to a state where the image forming lens images an object at an finite distance with a design magnification. The distance A represents an entire length of the image forming lens. The distance C represents an open space between the front side lens group GF and the rear side lens group GR. The back-focus B in the actual usage state of the image forming lens is equal to or smaller than 25% of the lens length A, and the air space C is equal to or larger than 50% of the lens length A. The symbol S in FIG. 1 denotes an aperture diaphragm. The aperture diaphragm S may be provided at an appropriate position of the front side lens group GF in an appropriate manner.

The front side lens group GF mainly performs an imaging operation and the rear side lens group GR performs the function of a so-called field-flattener.

For the image forming lens as described above to accomplish a sufficient imaging performance, the front side lens group GF must be constructed of two or more lenses. When the front side lens group GF is constructed of one lens, even if the surface thereof is made non-spherical, the aberration correction performance of the lens is limited. Therefore, the image forming lens cannot provide a sufficient performance required for the image forming lens for use in image forming apparatuses such as digital copying machines and multi-functional image information processing apparatuses.

Further, for the rear side lens group GR to sufficiently perform the function of the field-flattener, the back-focus B in the actual usage state of the image forming lens must be equal to or smaller than 25% of the lens length A.

For efficiently correcting the curvature of field of the front side lens group GF with the rear side lens group GR, the height of principal rays out of the optical axis of the image forming lens must be as high as possible. Therefore, the back-focus B is preferably as small as possible.

Furthermore, for reducing the size of the front side lens group GF, the air space C between the front side lens group GF and the rear side lens group GR must be equal to or greater than 50% of the lens length A. If the air space C is not equal to or greater than 50% of the lens length A, the front side lens group GF is increased in size, thereby causing an increase in the cost thereof.

By thus constructing an image forming lens as described above, the image forming lens of the present invention achieves with a relatively small number of lenses, e.g., 3 to 4 individual lenses, a function and performance equivalent to or exceeding those of a Gauss type image forming lens having a construction of 6 pieces of lens, such as that described for example in JP Laid-open Publication No. 2000-111794, thus realizing a reduction in the cost of the image forming lens.

Further, the above-described image forming lens can obtain a higher performance by forming at least one surface of the rear side lens group GR in an anamorphic shape. The anamorphic lens surface has an effect on enabling independent correction of curvature of field and coma in the main scanning direction (meridional plane) and the sub-scanning direction (sagittal plane) to a certain degree. The freedom in the above correction increases as the light flux for each image height is separated far from each other when the light flux passes the anamorphic lens surface.

In the above-described image forming lens of the present invention, the rear side lens group GR is disposed close to the image surface, and thereby the light flux for each image height is sufficiently separated from each other when the light flux passes the rear side lens group GR. Therefore, by forming at least a surface of the rear side lens group GR in an anamorphic shape, the curvature of field in the main and sub-scanning directions can be corrected with a remarkably high freedom. The present invention brings out an effect of the anamorphic lens surface to a maximum degree in an image forming lens, so that a performance greatly exceeding that of conventional document reading lenses using an anamorphic lens surface can be obtained.

The above-described image forming lens can be further reduced in cost by using a plastic lens for the rear side lens group GR.

In the above-described image forming lens, the rear side lens group GR is disposed near the image surface IS. Therefore, the height of a paraxial ray of the rear side lens group GR is relatively short. Therefore, when a plastic lens is used for the rear side lens group GR, even if a change in the power of the rear side lens group GR due to temperature change is increased, an affect of such change in the power of the rear side lens group GR on the aberration or back-focus of the image forming lens is relatively small. Therefore, the rear side lens group GR of the image forming lens of the present invention is suitable for being made of plastic.

For further increasing the lens diameter and the performance of the image forming lens of the present invention, at least one surface of the rear side lens group GR is preferably made non-spherical.

Because the rear side lens group GR is close to the image surface IS and thereby a light flux for each image height is sufficiently separated from each other when passing the rear side lens group GR, by making one surface of the rear side lens group GR non-spherical, the aberration of the rear side lens group GR out of the optical axis can be effectively corrected. In particular, when a molded plastic lens is used for the rear side lens group GR, one surface thereof can be relatively easily formed in a non-spherical shape practically without increasing the cost.

Furthermore, for further increasing the lens diameter and the performance of the image forming lens of the present invention, the rear side lens group GR is preferably configured such that a curved line, which is formed when the lens surface having an anamorphic shape crosses a flat plane including the optical axis of the rear side lens group GR, is formed in a non-arc shape. In the above-described image forming lens, the rear side lens group GR is disposed near the image surface IS, and thereby the light flux for each image height is sufficiently separated from each other when the light flux passes the rear side lens group GR, as described above. Therefore, by forming the cross sections of the rear side lens group GR in the main scanning and sub-scanning directions in non-arc shapes, respectively, the aberration out of the optical axis can be effectively corrected. In particular, when the rear side lens group GR is the one formed in plastic molding, the increase in the cost of the rear side lens group GR by making the above cross sections a non-arc shape is practically none. present invention, the rear side lens group GR can be formed as necessary in a shape having rotational asymmetry with respect to the optical axis thereof. When the image forming lens is used in combination with a one-dimensional light receiving element array (line sensor), the effective light flux area required for the rear side lens group GR is in a belt-like shape long in the main scanning direction and short in the sub-scanning direction.

Figure 2:
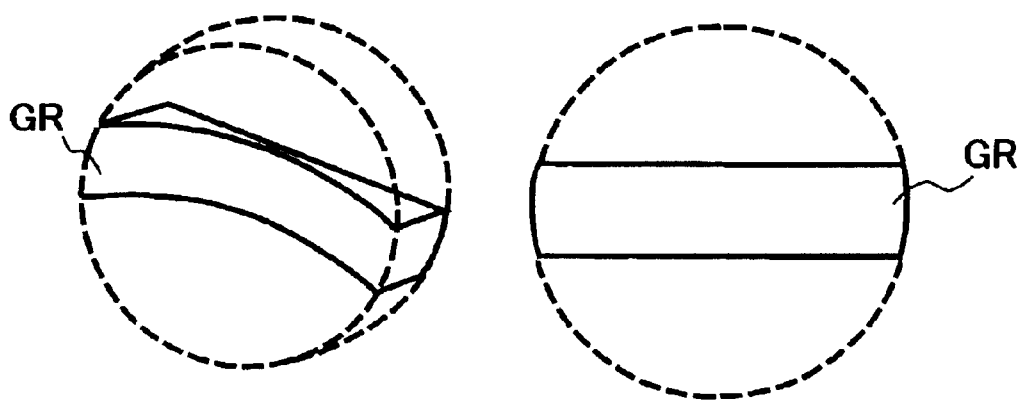
FIG. 2 is a schematic drawing illustrating an outer shape of a rear side lens group of the image forming lens, which is formed in a strip-like shape.
Figure 3:
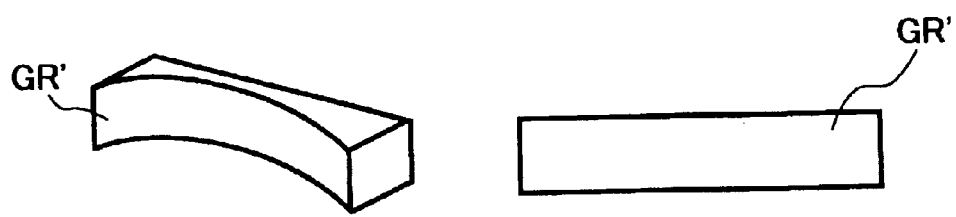
FIG. 3 is a schematic drawing illustrating another outer shape of the rear side lens group, which is formed in a rectangle-like shape.

In this case, the outer shape of the rear side lens group GR can be formed in a strip-like shape as illustrated in FIG. 2, which can be formed by cutting a part of a disk, or in a rectangle-like shape as the one illustrated and denoted by GR' in FIG. 3. The outer shape of the rear side lens group GR can be formed in a shape having rotational asymmetry even when the rear side lens group GR is formed with glass. However, by using a molded plastic lens for the rear side lens group lens GR, the outer shape of the rear side lens group GR can be more easily formed in such a shape having rotational asymmetry.

Figure 4:
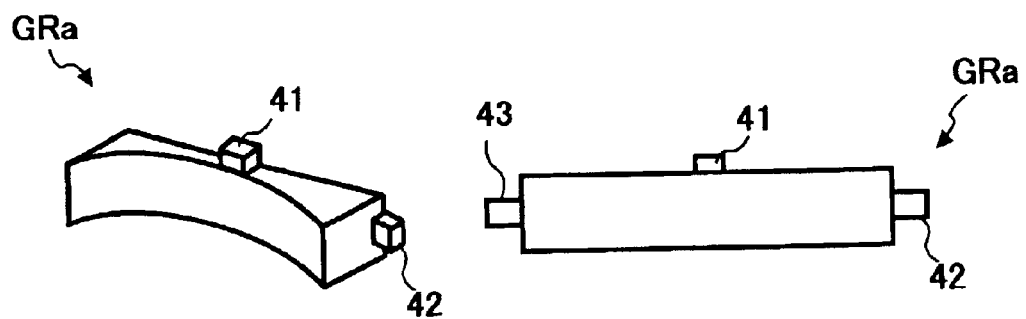
FIG. 4 is a schematic drawing illustrating another rear side lens group, in which an engaging part for positioning, and engaging parts used for supporting or fixing the rear side lens group are provided.

Further, when a rear side lens group is made with a plastic molding, as in the rear side lens group GRa illustrated in FIG. 4, the engaging part 41 for positioning and the engaging parts 42 and 43 used for supporting or fixing the rear side lens group GRa can be easily provided to the rear side lens group GRa, because these engaging parts 41, 42 and 43 can be formed at an upper part or a side part of the rear side lens group GRa integrally with the rear side lens group GRa by molding. In the example in FIG. 4, the engaging parts 41, 42 and 43 are formed in a protruding manner. However, the engaging parts 41, 42, and 43 can instead be concave.

In each of FIG. 2, FIG. 3 and FIG. 4, the left side figure is an oblique perspective view of the rear side lens group GR (GR', GRa) and the right side figure is a view thereof in the optical axis direction.

In the above-described image forming lens, the front side lens group GF and the rear side lens group GR are supported by a supporting device so as to be integrated with each other and to be formed as the image forming lens.

Figure 5:
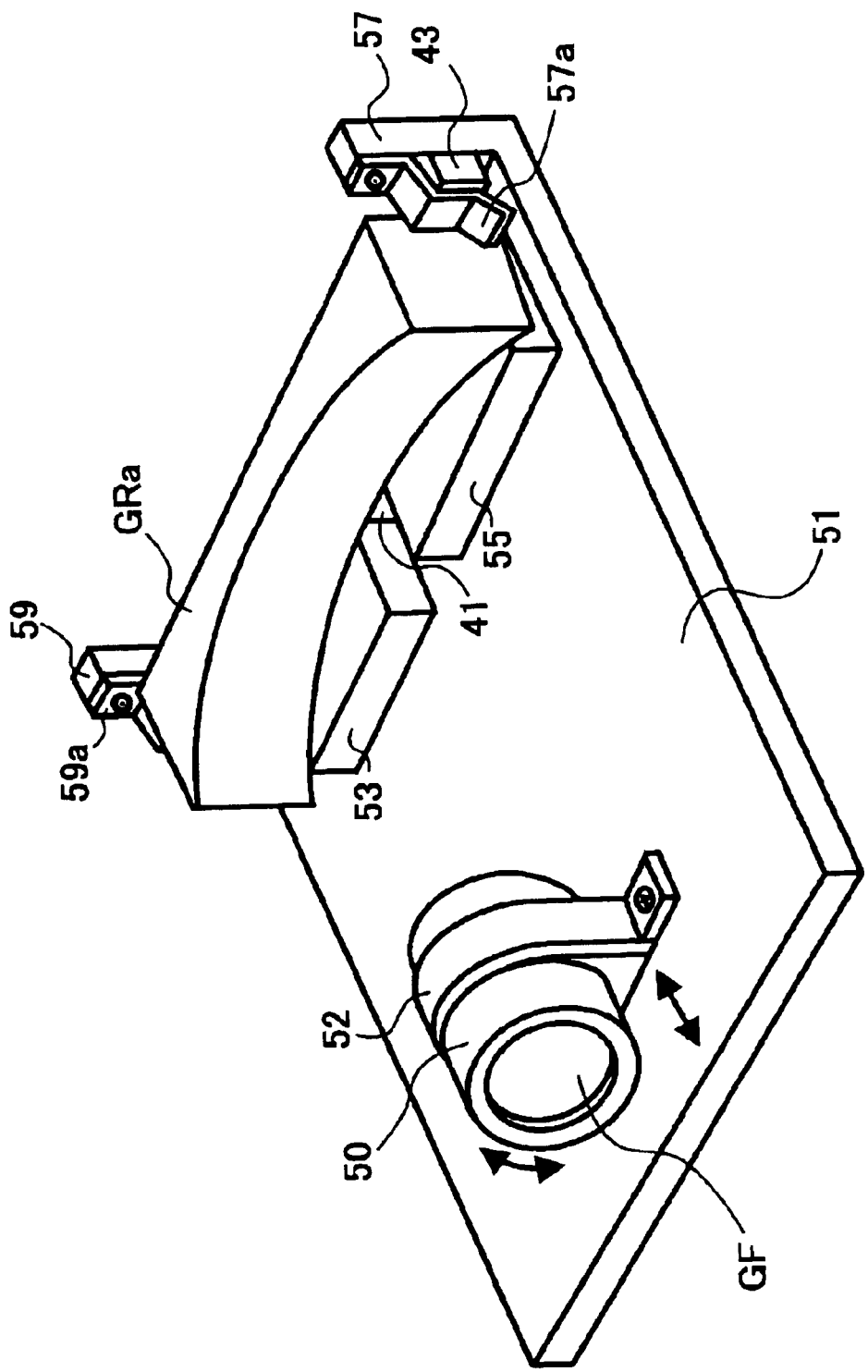
FIG. 5 is a schematic drawing illustrating an image forming lens unit according to a preferred embodiment of the present invention, including a front side lens group supporting device, a rear side lens group supporting device, and a connecting device to connect these supporting devices with each other.

FIG. 5 illustrates an image forming lens in which the supporting device includes a front side lens group supporting device, a rear side lens group supporting device, and a connecting device to connect these supporting devices with each other. Another image forming lens in which a front side lens group supporting device for supporting a front side lens group and a rear side lens group mounting device for mounting the rear side lens group thereto are integrally formed is described later. In the above-described image forming lens of the present invention, because the air space between the front side lens group GF and the rear side lens group GR is relatively large, in some cases, the front side lens group supporting device and the rear side lens group supporting device are preferably separate, for example, when the front side lens group GF is in a shape having rotational symmetry and the rear side lens group GR is in a shape having rotational asymmetry.

In FIG. 5, a front side lens group barrel 50 constitutes the front side lens group supporting device. A rear side lens group supporting device 51 supporting the rear side lens group GRa is substantially a flat plate in a rectangular form. Seats 53 and 55 for forming a groove for positioning are formed at an end part in the longitudinal direction of the rear side lens group supporting device 51. Further, pillar-like engaging parts 57 and 59 for supporting and fixing the rear side lens group GRa are provided in a standing manner.

The rear side lens group GRa is the one illustrated in FIG. 4, in which the engaging part 41 for positioning is provided in a protruding manner at a center part of the rear side lens group GRa in the longitudinal direction thereof (i.e., in the main scanning direction), and the engaging part 42 (not shown) and the engaging part 43 for supporting and fixing the rear side lens group GRa are formed at sides of the rear side lens group GRa in the longitudinal direction thereof, respectively.

The rear side lens group GRa is positioned with the engaging part 41 engaged with the groove between the seats 53 and 55, and is fixed to the rear side lens group supporting device 51 with the engaging parts 42 and 43 of the rear side lens group GRa depressed by plate springs 57a and 59a which are provided to the engaging parts 57 and 59 of the rear side lens group supporting device 51.

The front side lens group barrel 50 is formed in a shape having rotational symmetry relative to the optical axis thereof, and is fixed to a flat surface of the supporting device 51 by a connecting device 52.

Thus, the front side lens group barrel 50 is integrated with the rear side lens group supporting device 51 by the connecting device 52. However, the front side lens group barrel 50 is rotatable relative to the optical axis of the front side lens group GF in the state being integrated with the rear side lens group supporting device 51, and is movable in the optical axis direction of the front side lens group GF. By thus configuring an image forming lens unit as described above, inclination of the image surface due to eccentricity among lenses of the image forming lens unit, etc. can be corrected by only rotating the front side lens group GF around the optical axis thereof. The effect of such correction of inclination of the image surface is remarkable when the image forming lens unit is used in combination with a one-dimensional light receiving element array (line sensor). Further, the construction of the image forming lens is relatively simple.

Further, when the front side lens group supporting device (the front side lens group barrel) 50 and the rear side lens group supporting device 51 are constructed separately as described above, focusing can be accomplished only by moving the front side lens group GF in the optical direction thereof. In this case, because the rear side lens group GRa is not moved for focusing, in particular when the rear side lens group GRa is in a shape having rotational asymmetry, mounting of the rear side lens group GRa can be simplified, as illustrated in FIG. 5. Furthermore, as illustrated in FIG. 5, because the seats 53 and 55 are provided to the rear side lens group supporting device 51, the width of the rear side lens group GRa (the thickness in the sub-scanning direction) can be made relatively thin.

In constructing an image forming lens unit, the supporting device for an image forming lens can be configured in various manners. Also, in integrating the image forming lens with the supporting device, the image forming lens can be configured in various manners.

Figure 6A:
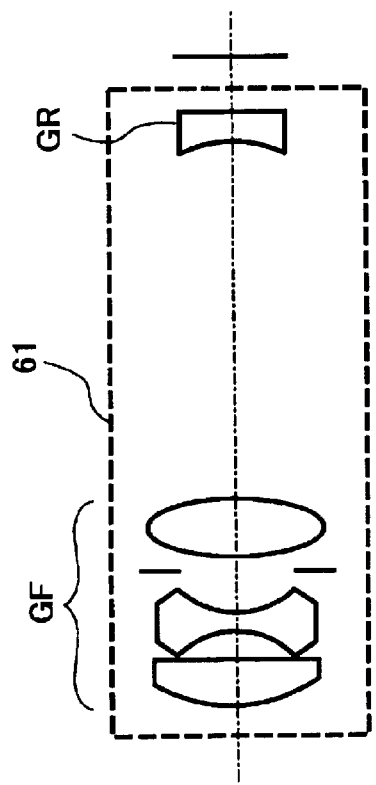
FIG. 6A and FIG. 6B are diagrams illustrating image forming lens units according to other embodiments of the present invention, FIG. 6A illustrating an example in which a front side lens group and a rear side lens group are arranged on a straight line on the optical axis of the image forming lens unit, and FIG. 6B illustrating an example in which a front side lens group and a rear side lens group are arranged such that the optical path of the image forming lens unit is bent by a mirror between the front side lens group and the rear side lens group.
Figure 6B:
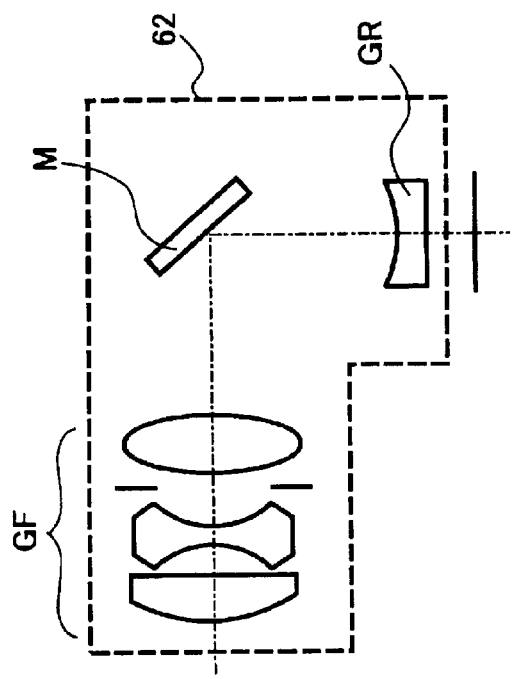

FIG. 6A and FIG. 6B are diagrams illustrating exemplary construction of an image forming lens unit. For example, in the example illustrated in FIG. 6A, the front side lens group GF and the rear side lens group GR are arranged on a straight line on the optical axis of the image forming lens unit and are appropriately integrated with each other by a supporting device 61. In the example illustrated in FIG. 6B, the front side lens group GF and the rear side lens group GR are arranged such that the optical path of the image forming lens unit is bent by a mirror M between the front side lens group GF and the rear side lens group GR, and the front side lens group GF and the rear side lens group GR are appropriately integrated with each other in such a state by a supporting device 62.

By thus bending an optical path of an image forming lens unit, the freedom in designing a layout of an original document reading apparatus is increased.

The brightness of an image formed by an image forming lens generally decreases towards the peripheral part of the image according to the principle of the fourth power of cosine. This principle holds true with respect to an image formed by an image forming lens for reading the image of an original document, and the brightness of the image of the original document at the image surface of the image forming lens where a light receiving device is located gradually decreases towards the peripheral part from the optical axis part of the image. If an image of an original document having uneven brightness is read by an image forming lens, and when the image of the original document is reproduced with image information which has been obtained by reading the image of the original document with the image forming lens, unevenness in density appears in the reproduced image.

The above-described unevenness in density of an image can be avoided by various methods, such as for example, 1) by electrically correcting image information of the image, which has been obtained by reading the image with an image forming lens, 2) by setting the illumination of an original document illuminating part such that the illumination increases from the center part toward the peripheral part of the original document illuminating part, 3) by providing a shading device in the optical path of an image forming light flux, or 4) by combining two or more of the above-described described methods.

In an image forming lens of the present invention, because the front side lens group GF and the rear side lens group GR are separated from each other by a relatively large space, the shading device can be arranged in such a space. Thereby, an additional space for the shading device is not required outside of the image forming lens.

Figure 7:
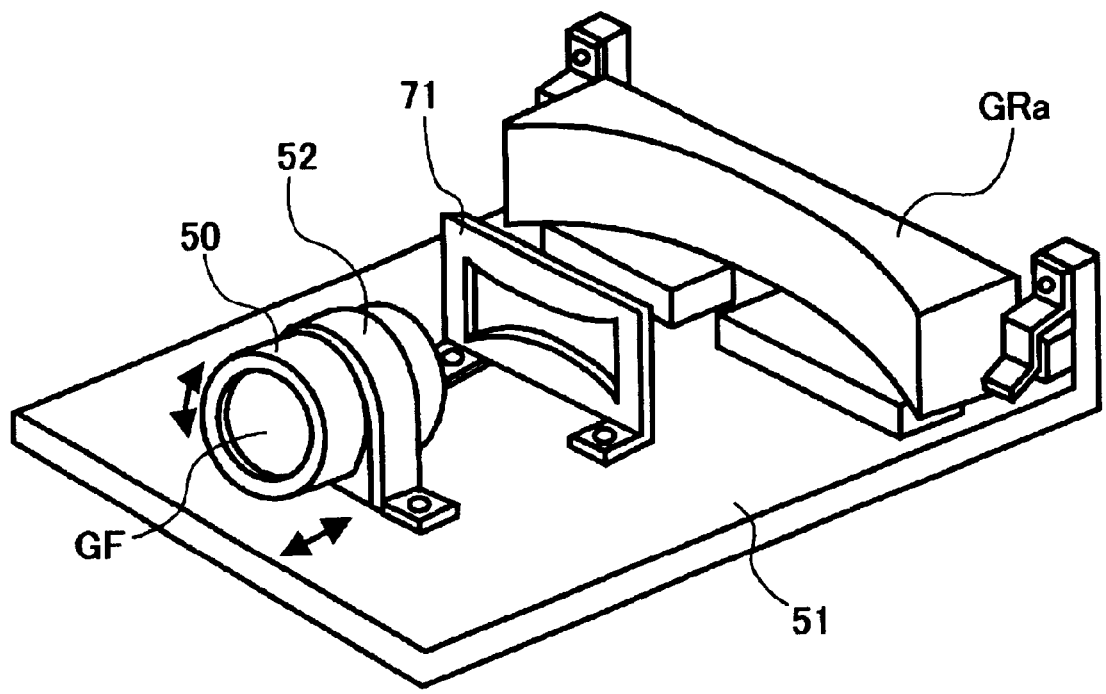
FIG. 7 is a schematic drawing illustrating an image forming lens unit according to another preferred embodiment of the present invention, in which a shading device for correcting the brightness of an image at the image surface in the main scanning direction is provided between a front side lens group and a rear side lens group of an image forming lens.

FIG. 7 is a schematic drawing illustrating an image forming lens unit according to a preferred embodiment of the present invention, in which a shading device 71 for correcting the brightness of an image at the image surface in the main scanning direction is provided between the front side lens group GF and the rear side lens group GRa.

The shading device 71 is configured to be a shading correction plate having an opening of a predetermined shape so as to shield more greatly for a light flux having a smaller field angle. The shading device 71 is fixed to the rear side lens group supporting device 51. In FIG. 7, the parts other than the shading device 71 are substantially the same as those illustrated in FIG. 5.

Figure 8:
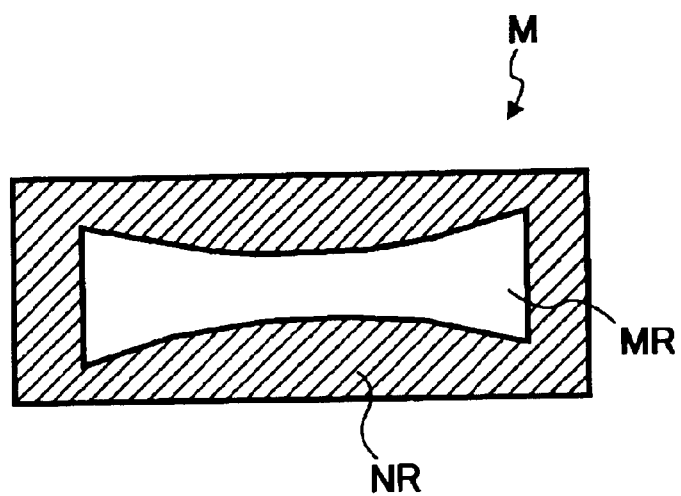
FIG. 8 is a diagram illustrating a folding mirror for bending an optical path, which also functions as a shading device.

When the optical path is bent between the front side lens group GF and the rear side lens group GR by the folding mirror M as in the image forming lens unit illustrated in FIG. 6B, the folding mirror M can be configured so as to function also as the shading device for correcting the brightness of an image at the image surface in the main scanning direction by including a reflecting part MR and a non-reflecting part NR around the reflecting part MR, as illustrated in FIG. 8, and by forming the reflecting part MR, i.e., the shape of a reflecting surface, in a predetermined shape (such that the reflecting area for a light flux having a smaller field angle is smaller).

Figure 9:
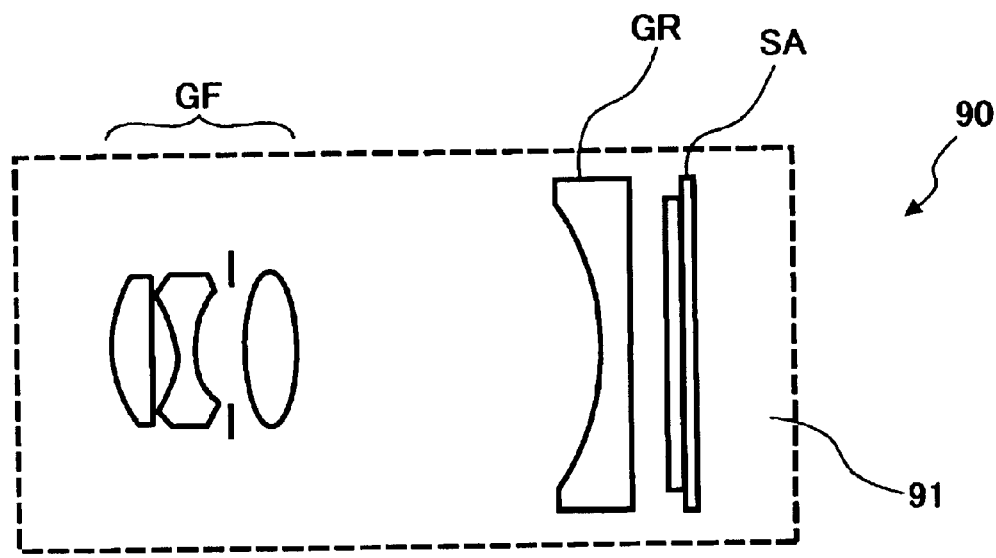
FIG. 9 is a diagram illustrating an original document reading module according to another preferred embodiment of the present invention.

FIG. 9 is a diagram illustrating an original document reading module according to a preferred embodiment of the present invention. An original document reading module 90 is a module to read an image of an original document to convert image information of the image into electrical signals. The original document reading module 90 includes an image forming lens, and a light receiving element array SA which samples the image of the original document and photo-electrically converts the image into the electrical signals. The image forming lens and the light receiving element array SA are integrated with each other in an appropriate manner by an integrating device 91. The image forming lens is one of the lenses previously described, and is constructed of the front side lens group GF and the rear side lens group GR as illustrated in FIG. 9.

Figure 10:
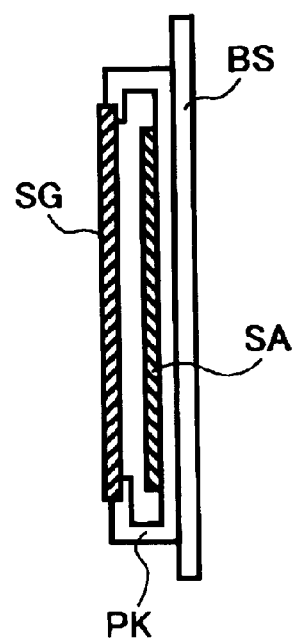
FIG. 10 is a diagram illustrating a background light receiving element array which is packaged in a package integrated with a substrate plate and which is enclosed in the package by a shielding glass functioning as a shielding member.

For the light receiving element array SA, known CCDS, CMOS sensors, etc. can be used. The light receiving element array SA is generally packaged in a package PK integrated with a substrate plate BS, and is enclosed in the package PK by a shielding glass SG functioning as a shielding member, as illustrated in FIG. 10.

Figure 11:
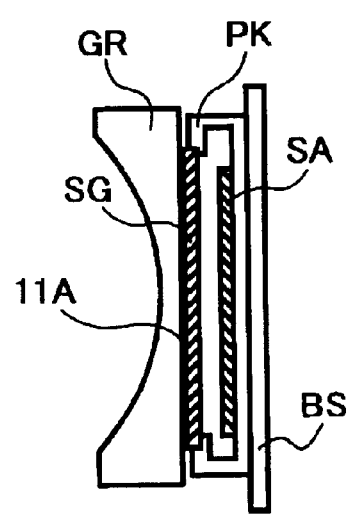
FIG. 11 is a diagram illustrating an original document reading module according to another preferred embodiment of the present invention, in which the image surface side surface of a rear side lens group of an original document reading lens is attached to the surface of a shielding member of a light receiving element array with adhesive material.

The light receiving element array SA must be provided such that its light receiving surface coincides with the image surface of an image forming lens. In the image forming lens of the present invention, the rear side lens group GR is disposed close to the image surface of the image forming lens. Therefore, as illustrated in FIG. 11, the rear side lens group GR and the light receiving element array SA can be integrated with each other in an original document reading module, so that the construction of the original document reading module can be simplified.

The light receiving element array SA and the rear side lens group GR can be integrated in various manners. FIG. 11 illustrates an example in which the surface of the rear side lens group GR at the image surface side is attached to the surface of the shielding member (e.g., shielding glass) SG with transparent adhesive material 11A.

Figure 12:
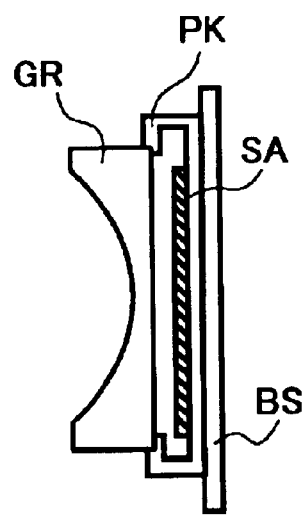
FIG. 12 is a diagram illustrating an original document reading module according to another preferred embodiment of the present invention, in which the image side surface of the rear side lens group is configured to function as the shielding member in a package of the light receiving element array.

When the back-focus of the image forming lens in the actual usage state thereof is sufficiently short, as illustrated in FIG. 12, the surface of the rear side lens group GR at the image surface side can be configured to function as the shielding member SG of the package PK of the light receiving element array SA. Thereby, the shielding member SG in FIG. 11 can be eliminated to reduce the cost of the original document reading module.

Figure 13:
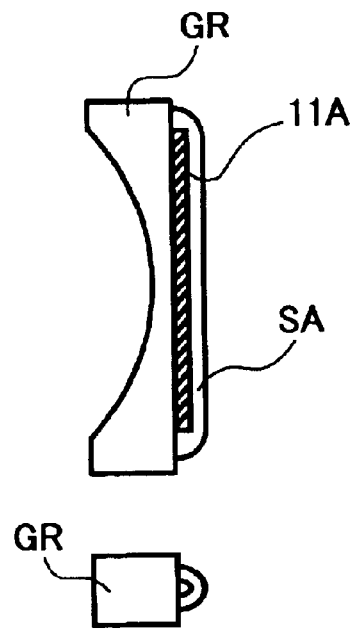
FIG. 13 is a diagram illustrating an original document reading module according to another preferred embodiment of the present invention, in which the light receiving element array is directly attached to the image side surface of the rear side lens group by the adhesive material.

Further, when the back-focus of the image forming lens in the actual usage state thereof is almost zero, as illustrated in FIG. 13, the light receiving element array SA itself can be directly attached to the image side surface of the rear side lens group GR by the adhesive material 11A. Thereby, the package PK is eliminated to further reduce the cost of the original document reading module.

Figure 14:
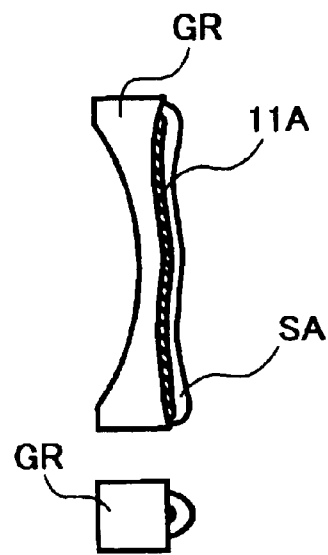
FIG. 14 is a diagram illustrating an original document reading module according to another preferred embodiment of the present invention, in which the light receiving element array is directly attached to the image side surface of the rear side lens group by the adhesive material and in which the image side surface of the rear side lens group is non-spherical.

In each of the original document reading modules illustrated in FIGS. 11, 12 and 13, the image side surface of the rear side lens group GR is flat or substantially flat. FIG. 14 illustrates an example in which the image side surface of the rear side lens group GR is not flat. Even when the image side surface of the rear side lens group GR is not flat, i.e. curved, when directly attaching the light receiving element array SA to the rear side lens group GR, as illustrated in FIG. 14, by forming the image side surface of the rear side lens group GR in a curved surface along the curvature of field of the image forming lens, the rear side lens group GR and the light receiving element array SA can be easily attached to each other by the adhesive material 11A, so as to be integrated with each other. Thereby, the construction of the original document reading module is simplified and the performance of the original document reading module is further enhanced.

In FIGS. 13 and 14, a diagram at a lower part of each figure illustrates a state of each original document reading module when the original document reading module is viewed in the main scanning direction (i.e., in the upward and downward directions in the diagram at an upper part of each figure).

In each of the original document reading modules illustrated in FIGS. 11, 12, 13 and 14, the construction of each light receiving element array SA is thus simplified, and thereby the cost of each original document reading module can be reduced.

Each of the above-described original document reading modules can be configured such that the rear side lens group GR and the light receiving element array SA are not integrated with each other. In particular, when the back-focus of an image forming lens is relatively large, the necessity of integrating a rear side lens group of the image forming lens and a light receiving element array with each other is low.

Figure 15:
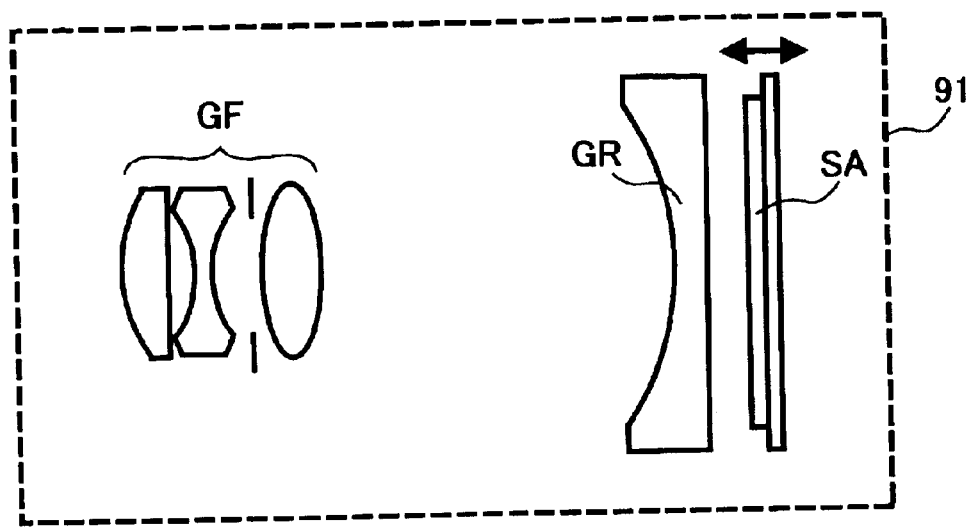
FIG. 15 is a diagram illustrating an original document reading module according to another preferred embodiment of the present invention, in which a rear side lens group and a light receiving element array are not integrated.

FIG. 15 is a diagram illustrating an original document reading module according to another embodiment of the present invention, in which a rear side lens group of an image forming lens and a light receiving element array are not integrated with each other.

When a rear side lens group GR of an image forming lens and a light receiving element array SA are not integrated with each other as illustrated in FIG. 15, focusing can be made by moving the light receiving element array SA in the optical axis direction at the image surface side of the rear side lens group GR. By thus configuring an original document reading module such that focusing can be made by moving a light receiving element array, as compared with a case in which focusing is made by moving only the front side lens group of an image forming lens, change in the performance of the image forming lens when focusing is made can be reduced.

In particular, in FIG. 15, when the back-focus of the image forming lens is relatively large, e.g., equal to or greater than 10% of the entire length of the image forming lens, a device for moving the light receiving element array SA can be provided at a space between the rear side lens group GR of the image forming lens and the light receiving element array SA. In FIG. 15, numeral 91 denotes an appropriate integrating device as in FIG. 9.

In each of the above-described original document reading modules, an image forming lens and a light receiving element array can be integrated with each other into a module in any manner.

Figure 16:
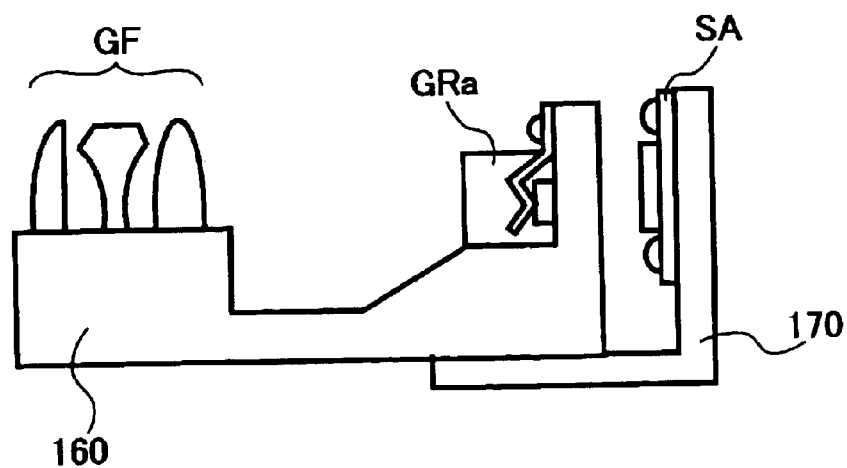
FIG. 16 is a diagram illustrating an original document reading module according to another preferred embodiment of the present invention, in which an image forming lens and a light receiving element array are integrated into a module by supporting a front side lens group and a rear side lens group of the image forming lens with a supporting device such that an image forming lens unit is constructed of the image forming lens and the supporting device, supporting the light receiving element array with a separate supporting device, and integrating the supporting device for the image forming lens and the supporting device for the light receiving element array with each other.

FIG. 16 illustrates an original document reading module according to another preferred embodiment of the present invention, in which an image forming lens and a light receiving element array are integrated with each other into a module by supporting the whole part of the image forming lens with a supporting device such that an image forming lens unit is constructed of the image forming lens and the supporting device, supporting the light receiving element array with a separate supporting device, and integrating the supporting device for the image forming lens and the supporting device for the light receiving element array with each other.

In FIG. 16, a front side lens group GF and a rear side lens group GRa are supported by a supporting device 160 so as to thereby construct an image forming lens unit, and a light receiving element array SA is supported by a dedicated supporting member 170, which is formed in an L-like shape. The supporting device 160 of the image forming lens unit and the supporting member 170 for the light receiving element array SA are integrated with each other. Specifically, the rear end part of the supporting device 160 is supported by the horizontal part of the supporting member 170, and the light receiving element array SA is fixed to the vertical part of the supporting member 170. The supporting member 170 is configured so as to move relative to the supporting device 160 in the optical axis direction of the image forming lens, so that the above-described focusing by moving the light receiving element array SA can be performed.

In the supporting device 160, a supporting part for supporting each lens of the front side lens group GF and a mounting part for mounting the rear side lens group GRa thereto are integrally formed.

Figure 17:
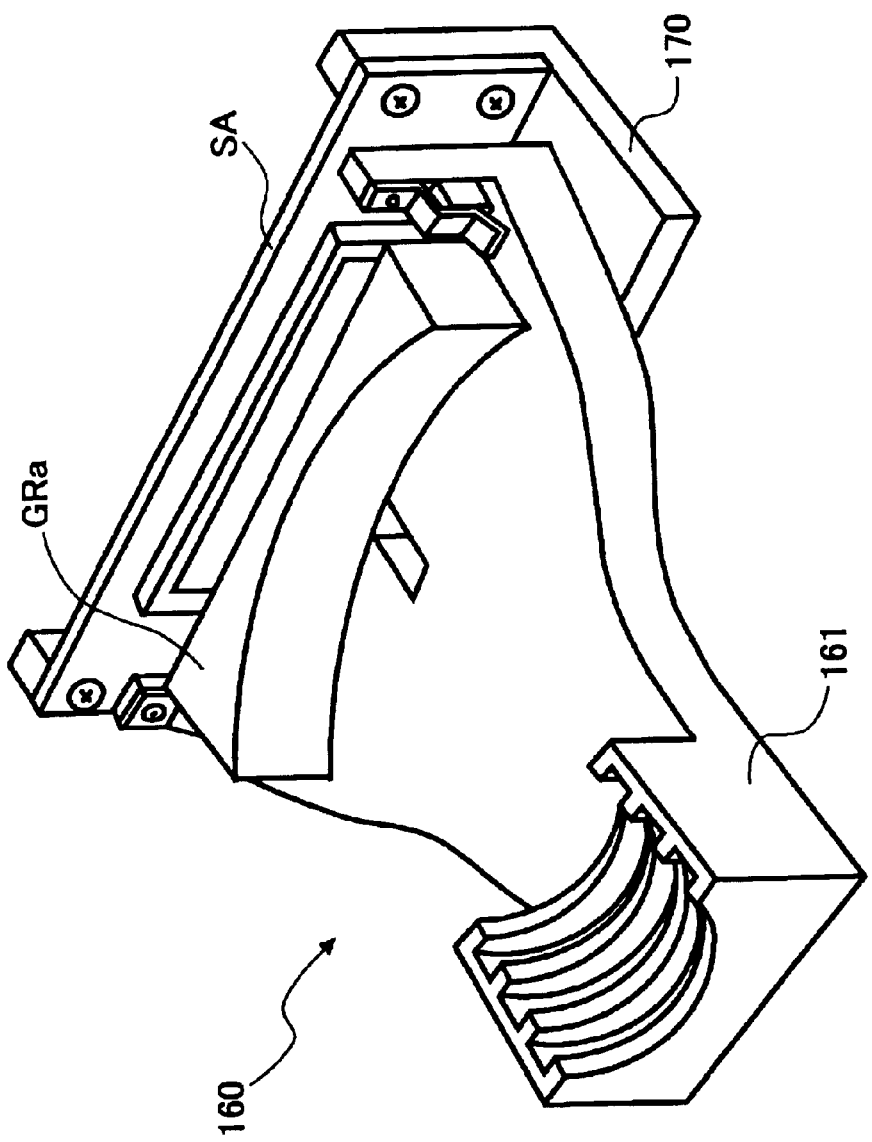
FIG. 17 is a schematic drawing illustrating an example of the supporting device supporting the front side lens group and the rear side lens group of an image forming lens unit, in which a front side lens group supporting part and a rear side lens group mounting part are integrally formed.

FIG. 17 is a schematic drawing illustrating an exemplary construction of the supporting device 160.

In FIG. 17, each lens of the front side lens group GF is inserted into a corresponding lens receiving part of a supporting part 161 of the supporting device 160 so as to be supported. The lens receiving part of the supporting part 161 is formed in a groove. Each lens of the front side lens group GF is fixed to the supporting part 161 by adhesive material. The rear side lens group GR is substantially the same as the one illustrated and denoted by GRa in FIG. 4 or FIG. 5 and described with reference thereto, and is supported substantially in the same manner as described with reference to FIG.

4 and FIG. 5 above. Specifically, the rear side lens group GR is supported by the supporting device 160 by plate springs as described with reference to FIG. 5.

By thus supporting the front side lens group GF and the rear side lens group GR by a single device, i.e., the supporting device 160, as illustrated in FIG. 16 and FIG. 17, when compared with a case in which the front side lens group GF is supported by the front side lens group barrel 50 which is a separate member from the rear side lens group supporting device 51 as illustrated in FIG. 5, the number of parts constituting the image forming lens unit can be remarkably reduced, thereby reducing the cost thereof.

The supporting device 160 as described with reference to FIG. 16 and FIG. 17 is an example of the supporting device for supporting an image forming lens unit, in which the supporting part supporting each lens of the front side lens group GF and the mounting part mounting the rear side lens group GR thereto are integrally formed.

In an original document reading module, when an image forming lens unit, in which an image forming lens is integrated with a supporting member, is used, the image forming lens unit can be configured in various manners as described with reference to FIGS. 5–8.

For example, as illustrated in FIG. 5 and FIG. 7, the image forming lens unit can be configured to include the front side lens group supporting device 50 supporting the front side lens group GF of the image forming lens, the rear side lens group supporting device 51 supporting the rear side lens group GR, and the connecting device 52 connecting the supporting devices 50 and 51 with each other. In this case, the front side lens group supporting device 50 is movable relative to the rear side lens group supporting device 51 in the optical axis direction of the image forming lens unit and is rotatable around the optical axis.

Further, each of the above-described image forming lens units can be configured such that a folding mirror is provided between the front side lens group GF and the rear side lens group GR of the image forming lens so as to bend the optical path of the image forming lens as in FIG. 6B, or such that a shading device for correcting the brightness of an image at the image surface in the main scanning direction is provided between the front side lens group GF and the rear side lens group GR as in FIG. 7. The shading device can be a shielding plate having an opening of a predetermined size as in FIG. 7, or the folding mirror can be configured to include a reflecting surface formed in a predetermined shape so as to function as the shielding device also in a similar manner as described with reference to FIG. 8.

Figure 18:
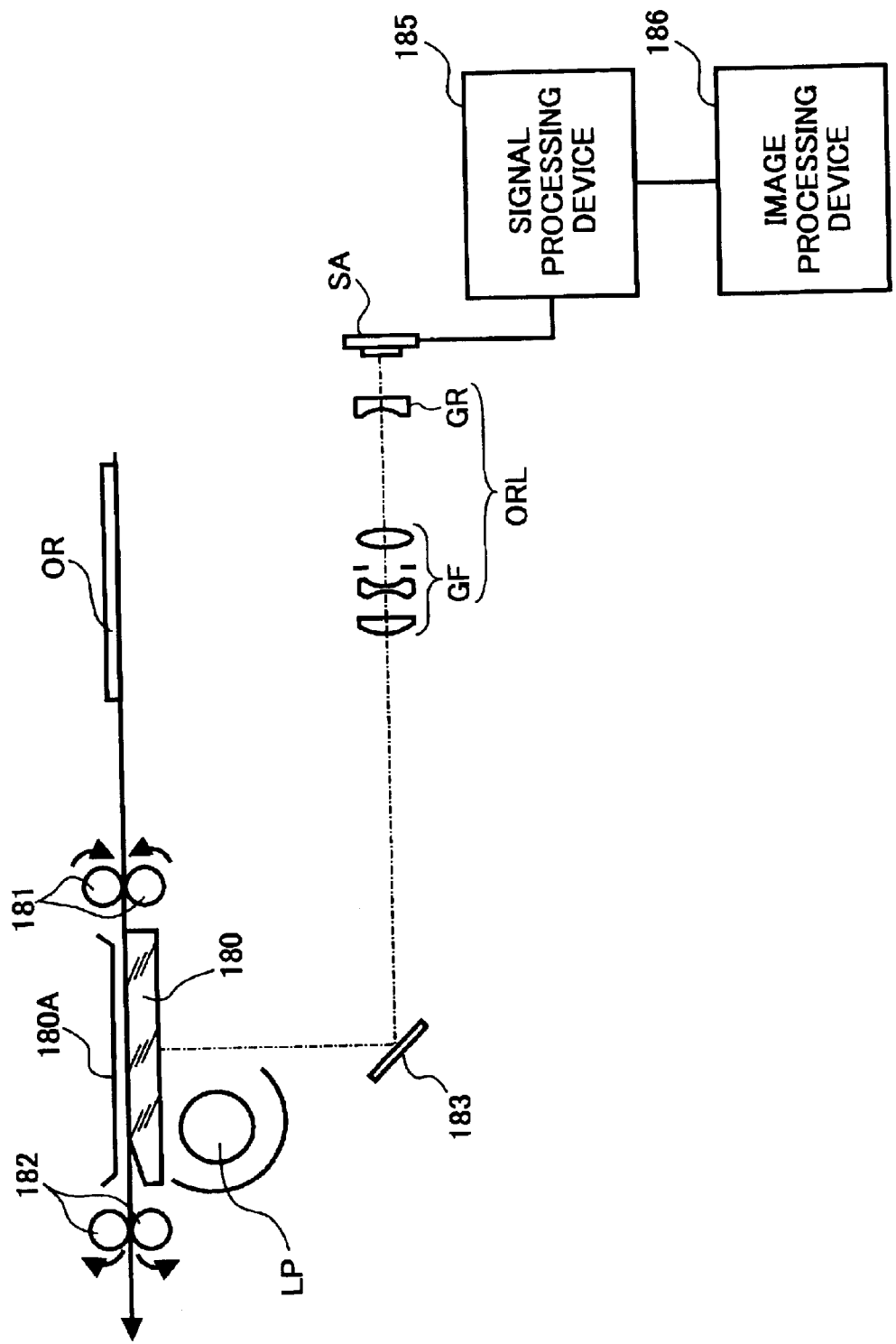
FIG. 18 is a diagram illustrating an original document reading apparatus according to a preferred embodiment of the present invention.
Figure 19:
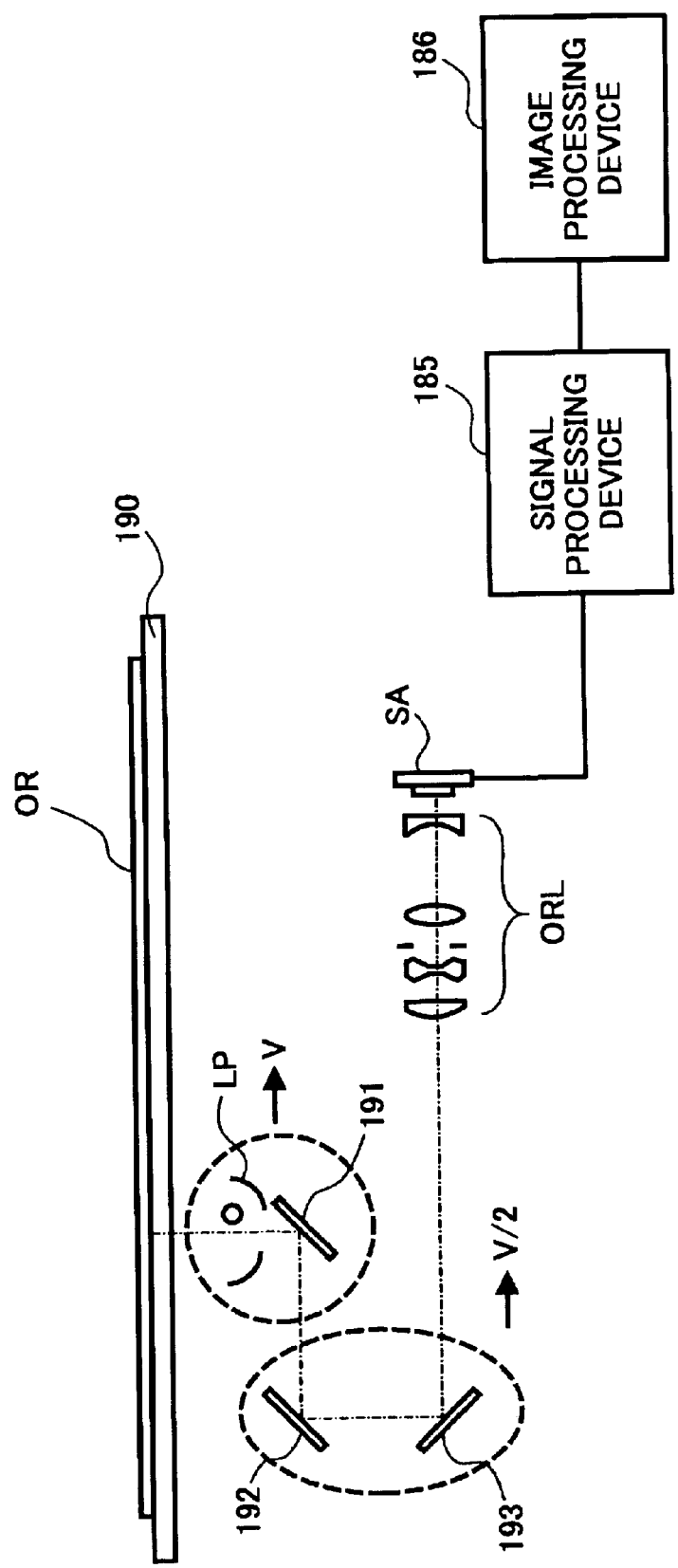
FIG. 19 is a diagram illustrating an original document reading apparatus according to another preferred embodiment of the present invention.

Referring now to FIGS. 18 and 19, description will be made below with respect to original document reading apparatuses according to preferred embodiments of the present invention.

Each of the original document reading apparatuses is configured such that an image forming lens ORL forms an image of an original document OR on a light receiving element array SA while scanning the original document OR with the image forming lens and image information of the image of the original document is converted to electrical signals with the light receiving element array. The original document reading apparatus includes a scanning device for scanning the original document OR; the light receiving element array SA; the image forming lens ORL for imaging, on the light receiving array SA, a light flux from a part of the original document being scanned by the scanning device; a signal processing device 185 for performing signal-processing of an output signal from the light receiving element array SA; and an image processing device 186 for performing image-processing of the signal processed by the signal processing device 185. The image forming lens ORL would be any one of the image forming lenses described above.

In the original document reading apparatus illustrated in FIG. 18, the scanning device for scanning the original document OR includes an original document contact glass 180 provided in a fixed position, an original document conveying device which conveys the original document OR while bringing the original document OR into contact with the surface of the original document contact glass 180, and an illuminating device for illuminating the original document OR on the original document contact glass 180 in the main scanning direction.

Conveying rollers 181 and 182 are driven by a motor, not shown, to rotate at a fixed speed. The original document OR from which the image thereof is to be read is conveyed by the conveying rollers 181 and 182 in the direction of the arrow in such a condition that the original document OR is in contact with the upper surface of the original document contact glass 180, thereby traveling over the contact glass 180 at a fixed speed. A pressure plate indicated with the reference numeral 180A presses the traveling original document OR on the original document contact glass 180 so that the surface of the traveling original document OR will not separate from the upper surface of the original document contact glass 180. The conveying rollers 181 and 182, the pressure plate 180A and the motor (not shown) constitute the original document conveying device.

An illuminating lamp indicated with the reference symbol LP is the illuminating device to illuminate the original document OR traveling over the original document contact glass 180 in the main scanning direction (the direction perpendicular to the drawing).

In other words, the original document OR is scanned by conveying the original document OR across the original document illuminating part while illuminating the original document OR at an original document illuminating part set in a fixed position on the original document contact glass 180.

In the original document illuminating part, a light flux reflected on the surface of the original document OR is incident on a reflecting mirror 183, by which its optical path is so turned that the light flux is guided into the image forming lens ORL. Thus, the image forming lens ORL forms an image (reduced image) of the original document OR on the light receiving element array SA. The light receiving element array SA repeatedly outputs electrical signals converted from the optical image as the original document OR travels over the original document contact glass 180. The outputted electrical signals are subjected to signal-processing such as A/D conversion in the signal processing device 185, and are inputted to the image processing device 186. The image processing device 186 processes inputted image information signals so as to be in an appropriate signal format for outputting.

The image processing device 186 can be implemented as a computer or the like. Further, depending on the layout of the original document reading apparatus, the reflecting mirror 183 may be eliminated, or two or more reflecting mirrors may need to be provided for guiding the light flux from the original document illuminating part into the image forming lens ORL.

In the original document reading apparatus illustrated in FIG. 19, the scanning device for scanning an original document OR includes an original document glass 190 on which the original document OR is placed flatly, an illuminating device LP for illuminating the original document OR placed on the original document glass 190 in the main scanning direction (the direction perpendicular to the drawing), a group of mirrors 191, 192, 193 for guiding a light flux from a part of the original document OR illuminated by the illuminating device LP into the image forming lens ORL, and a displacement device for displacing the illuminating device LP in the sub-scanning direction (the lateral direction in the drawing) while displacing the group of mirrors 191, 192, 193 with keeping a constant optical path length of the light flux guided from the part of the original document OR illuminated by the illuminating device LP into the image forming lens ORL. The illuminating device LP is for example an illuminating lamp.

When reading an image of the original document OR with the above-described original document reading apparatus, the original document OR is placed flat on the original document glass 190 with the surface thereof having the image to be read faced down. Under this condition, if reading processing is instructed, the illumination lamp LP emits light to illuminate the original document OR in the main scanning direction while moving to the right in the drawing at a fixed speed V, thus illuminating and scanning the original document OR.

Distance from the image forming lens ORL to the light receiving element array SA is fixed. The mirror 191 is displaced to the right at the fixed speed V in synchronization with the movement of the illuminating lamp LP.

Simultaneously, the mirrors 192 and 193 are displaced as one body to the right in the drawing at a fixed speed V/2.

A light flux from the part of the original document OR illuminated by the illumination lamp LP is reflected by the mirrors 191, 192, 193 in this order, and is guided into the image forming lens ORL. At this time, the optical path length of the guided light flux from the surface of the original document OR to the image forming lens ORL is constant.

The image forming lens ORL forms the image of the original document OR on the light receiving element array SA.

The displacement device for displacing the illuminating lamp LP and the group of mirrors 191 to 193 while keeping constant the optical path length of the light flux guided from the part of the original document OR illuminated by the illuminating lamp LP into the image forming lens ORL can be any appropriate device known related to this type of conventional original document reading apparatuses.

The process of reading the image on the light receiving element array SA and the processes of signal-processing and image processing the electrical signals outputted from the light receiving element array SA are substantially the same as those of the embodiment described referring to FIG. 18.

Thus, in the original document reading apparatuses as described above and illustrated in FIGS. 18 and 19, an original document reading method, in which an image forming lens forms the image of an original document formed on a light receiving element array while scanning the original document and the image of the original document is converted to electrical signals, is performed using any one of the image forming lenses described above.

The image forming lens ORL used in the original document reading apparatuses illustrated in FIGS. 18 and 19 may be formed in the image forming lens unit described above, or combined with the light receiving element array SA into the original document reading module also described above.

Further, the signal processing device 185 and/or the image processing device 186 can be configured to have the function of electrically adjusting the size of an image of an original document formed by an image forming lens. Such an electrical adjustment of the size of the image of the original document formed by the image forming lens eliminates the need for optical adjustment of the image forming lens, and hence the need to take into account the magnification of the image forming lens when focusing the lens is eliminated, which simplifies the adjustment mechanism and process.

Figure 20:
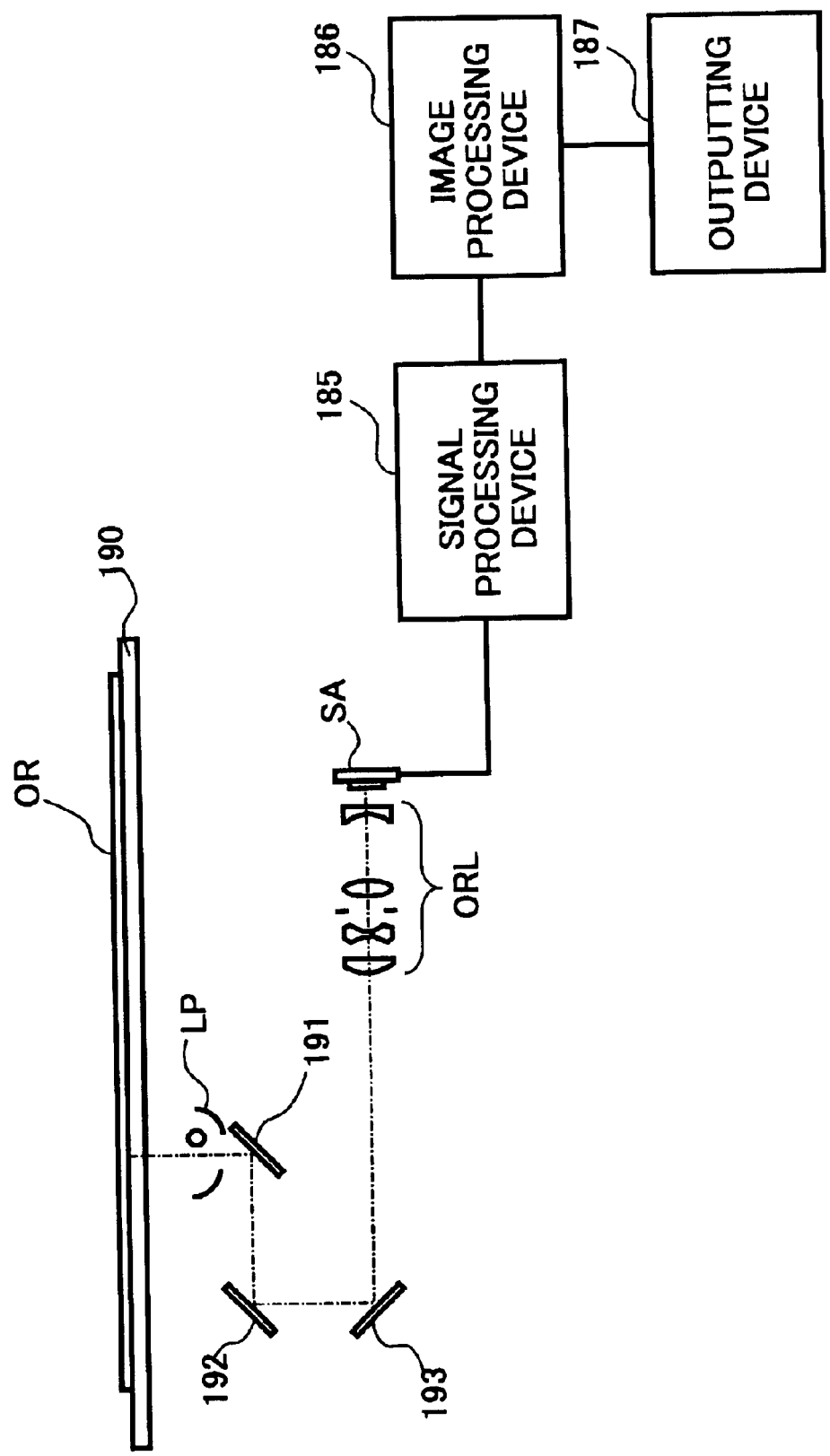
FIG. 20 is a diagram illustrating an image information processing apparatus according to a preferred embodiment of the present invention.

FIG. 20 illustrates an image information processing apparatus according to a preferred embodiment of the present invention. The image information processing apparatus of the present invention includes an original document reading device for reading an image of an original document and converting the read image to an electrical signal, and an outputting device 187 for outputting information of the electrical signal converted by the original document reading device. The original document reading device is one of the original document reading apparatuses described above. In the embodiment of FIG. 20, the original document reading apparatus illustrated in FIG. 19 is used. The original document reading apparatus illustrated in FIG. 18 can be also used.

The outputting device 187 can be of various types, for example, a display device for displaying an image on a display medium, a device for writing image information onto an electronic recording medium, a transmission device for transmitting the image information, or a printer for printing out or recording the image information on a sheet-shaped recording medium. The printer may be an ink jet printer or an electrophotographic type optical printer. Further, the image information processing apparatus may be provided with two or more of the above-mentioned types of the outputting device 187.

Figure 21:
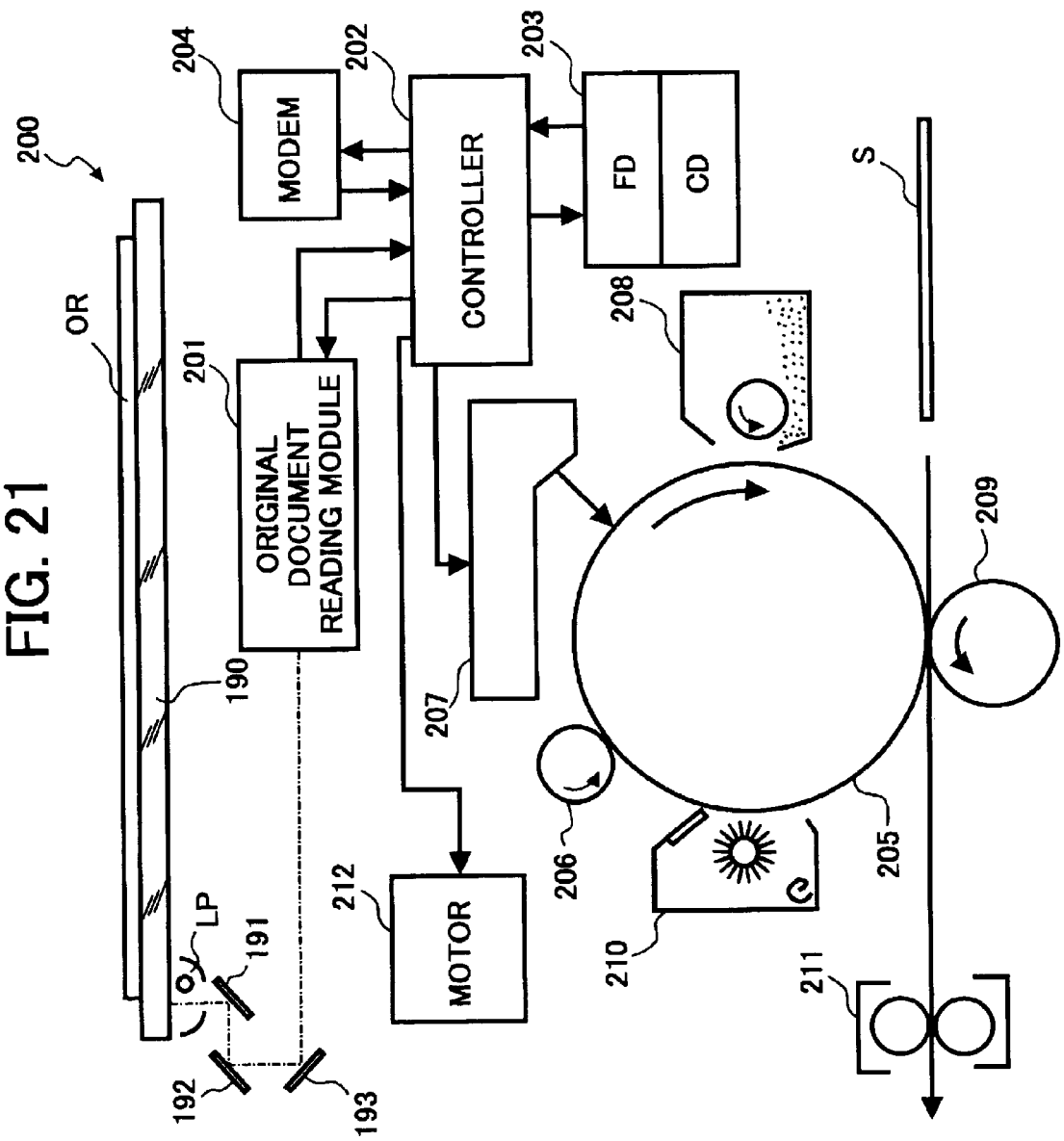
FIG. 21 is a diagram illustrating an image processing apparatus having multiple outputting devices, according to another preferred embodiment of the present invention.

FIG. 21 illustrates an image information processing apparatus according to another preferred embodiment of the present invention.

The image information processing apparatus is the one having two types of the outputting device 187. When reading the image of an original document OR, the original document OR is placed flatly on the original document glass 190, illuminated by the illuminating lamp LP in the main scanning direction (the direction perpendicular to the drawing), and scanned in the sub-scanning direction (to the right in the drawing) by the illuminating lamp LP. A light flux reflected from an illuminated part of the original document OR is guided by the group of mirrors 191, 192, 193 into an original document reading module 201. In the original document reading module 201, a light-receiving element array converts the light flux into an electrical signal.

In other words, the original document reading part of the above-described image information processing apparatus has substantially the same configuration as that of the original document reading apparatus described in reference to FIG. 19.

The signal outputted from the original document reading module 201 is inputted into a controller 202. The controller 202 includes a program-controlled microcomputer and various inputting and outputting devices therefor. The controller 202 further includes a signal processing device and an image processing device that constitute a part of the original document reading device. The controller 202 controls each part of the image information processing apparatus. A motor 210 is not only a driving source for each operating part of the apparatus, but also a part of the displacement device in the original document reading device to drive a displacement mechanism, not shown, to displace the mirrors 191 to 193 in the manner as described with reference to FIG. 19.

Further, the controller 202 controls an on-off switch of the illuminating lamp LP when reading the image of an original document.

The image information processing apparatus includes as its outputting device a modem 204 as a transmission device, a writing device 203, and an electrophotographic type optical printer.

If an operator wants to transmit the information of an image of an original document read as described above via facsimile transmission, the operator can instruct the facsimile transmission through an operation panel of the apparatus, not shown. Upon receipt of the instruction for the facsimile transmission, the controller 202 performs signal-processing/image-processing to the image information inputted from the original document reading module 201 so that the image information is processed into the form of a signal adapted to the facsimile transmission, and transmits the processed image information through the modem 204.

If the operator wants to write the read-out image information onto a floppy disk FD or an optical disk CD, the operator can instruct such writing through the operation panel and set or insert the floppy disk FD or the optical disk CD into the writing device 203. The controller 202 converts the image information to a signal format adapted to the set electronic recording medium, and writes the image information onto the set electronic recording medium (floppy disk FD or optical disk CD).

If the operator wants to print out the image of an original document, the operator can select a copying operation on the operation panel. In this case, the controller 202 executes an operation of copying the image of the original as described below.

The controller 202 converts the image information of an original document to a signal format adapted to optical scanning processing with an optical scanning device 207, while rotating a photoconductive body 205 in the direction of arrow at a fixed speed and uniformly charging the circumferential surface of the photoconductive body 205 with a charging device 209. As the charging device 209, a contact type charging device, such as a charging roller as used in the embodiment, or a non-contact type charging device, such as a corona charging device, can be used.

Then, the controller 202 applies the image information to the optical scanning device 207, in which optical scanning and writing of the image information on the photoconductive body 205 are performed, so that an electrostatic latent image of the image information is formed on the photoconductive body 205. The electrostatic latent image (negative latent image) thus formed is reversely developed by a developing device 208 so as to be made visible as a toner image. The toner image is transferred onto the surface of a sheet-like recording medium S, such as a transfer sheet or an OHP sheet, at a transferring position by a transfer device 209. In this embodiment, a transferring roller of a contact type is used for the transfer device 209, but a transferring charger of a non-contact type can be used. Further, an intermediate transferring material such as an intermediate transferring belt can also be used.

The toner image is fixed onto the recording medium S by a fixing device 211, and the recording medium S is discharged to the outside of the apparatus. Residual toner or paper dust remaining on the photoconductive body 205 after the toner image has been transferred is removed from the surface of the photosensitive body 205 by a cleaning device 210.

It should be noted that the image information processing apparatus can also print out image information, which has been inputted from the outside through the modem 204, on the recording medium S, or write and record the same on a floppy disk or an optical disk. Further, the information recorded on the floppy disk or the optical disk can be read out by the writing device 203 so that the read-out information can be transmitted to the outside through the modem 204 or printed out on the recording medium S.

Herein below, description will be made with respect to examples of the image forming lenses of the present invention. In each of the examples, aberration is satisfactorily corrected, so that any one of the image forming lenses in the examples is suitable for use in reading the image of an original document in a digital copying machine or an image information processing apparatus.

The following examples 3, 7 through 10, 12, 16, 17, and 18 assume a case where the image forming lens is combined with a light receiving element array having a shield glass SG (see FIG. 11). The other examples assume a case where a rear side lens group directly seals a package of the light receiving element array without the provision of the shield glass (see FIG. 12).

The meanings of symbols below are as follows:

f: Focal length of the entire system (Paraxial focal point in the main scanning direction)
m: Magnification
$F_m$: Effective f-number at magnification m (Normal f-number×(1+m)×(entrance pupil diameter/exit pupil diameter))

Y: Maximum object height
R: Radius of curvature (In a case of an anamorphic surface, radius of paraxial curvature in the main scanning direction=Ry)
D: Surface separation (interval between surfaces)
Nd: Refractive index (d-line)
Vd: Abbe number
K: Conical constant of non-spherical surface
$A_4$: Fourth-order non-spherical coefficient
$A_6$: Sixth-order non-spherical coefficient
$A_8$: Eighth-order non-spherical coefficient
$A_{10}$: Tenth-order non-spherical coefficient
Ky: Conical constant of anamorphic non-spherical surface in the main scanning direction
Kz: Conical constant of anamorphic non-spherical surface in the sub-scanning scanning direction
Rz: radius of paraxial curvature of anamorphic non-spherical surface in the sub-scanning scanning direction
Ar4: Coefficient of fourth-order rotating symmetric component of anamorphic non-spherical surface
Ar6: Coefficient of sixth-order rotating symmetric component of anamorphic non-spherical surface
Ar8: Coefficient of eighth-order rotating symmetric component of anamorphic non-spherical surface
Ar10: Coefficient of tenth-order rotating symmetric component of anamorphic non-spherical surface
Ap4: Coefficient of fourth-order non-rotating symmetric component of anamorphic non-spherical surface
Ap6: Coefficient of sixth-order non-rotating symmetric component of anamorphic non-spherical surface
Ap8: Coefficient of eighth-order non-rotating symmetric component of anamorphic non-spherical surface
Ap10: Coefficient of tenth-order non-rotating symmetric component of anamorphic non-spherical surface The non-spherical surfaces used here are defined by the following known equation, where X represents a distance for each image height from the non-spherical surface to a plane perpendicular to the optical axis of the lens and contacting the lens surface at a part of the lens surface on the optical axis:

$$X = CH^2/[1+\sqrt{\{(1-(1+K)C^2H^2)\}}] + A_4 \cdot H^4 + A_6 \cdot H^6 + A_8 \cdot H^8 + A_{10} \cdot H^{10},$$

where C is a reciprocal number of the radius of paraxial curvature (paraxial curvature) and H is height from the optical axis.

It should be noted that the unit indicative of the amount of length with certain degree is mm.

It should be further noted that anamorphic non-spherical surfaces used here are defined by the following equation:

$$X = \frac{CzZ^2 + CyY^2}{1+\sqrt{\{(1-(1+Kz)Cz^2Z^2)-(1+Ky)Cy^2Y^2\}}} +$$

$$Ar4\{(1-Ap4)Z^2 + (1+Ap4)Y^2\}^2 +$$

$$Ar6\{(1-Ap6)Z^2 + (1+Ap6)Y^2\}^3 +$$

$$Ar8\{(1-Ap8)Z^2 + (1+Ap8)Y^2\}^4 +$$

$$Ar10\{(1-Ap10)Z^2 + (1+Ap10)Y^2\}^5$$

where Cy is a reciprocal number of the radius of paraxial curvature (paraxial curvature) in the main scanning direction, Cz is a reciprocal number of the radius of paraxial curvature (paraxial curvature) in the sub-scanning scanning direction, Y is distance from the optical axis in the main scanning direction, and Z is distance from the optical axis in the sub-scanning direction.

EXAMPLE 1 f=41.08, m=0.11102, $F_m$=4.80, Y=152.4

| Surface No. | R | D | $N_d$ | $v_d$ | Remark |
|---|---|---|---|---|---|
| 01 | ∞ | 3.20 | 1.51680 | 64.20 | Contact glass |
| 02 | ∞ | | | | |
| 03 | 17.300 | 2.34 | 1.71300 | 53.94 | First lens |
| 04 | 62.620 | 1.80 | | | |
| 05 | −43.884 | 4.84 | 1.62004 | 36.30 | Second lens |
| 06 | 16.577 | 2.22 | | | |
| 07 | 31.300 | 2.79 | 1.60311 | 60.69 | Third lens |
| 08 | −25.973 | 39.91 | | | |
| 09 | −35.734 | 1.00 | 1.53046 | 55.84 | Fourth lens |
| 10 | ∞ | | | | |

Total lens length: 54.9
Back Focus: 1.01 (1.8% of the total lens length)
Interval between front and rear side lens groups:
  39.91 (72.3% of the total lens length)
$f_F/f_R$=1.56

In Example 1, all of the lens surfaces are spherical.

Figure 22:
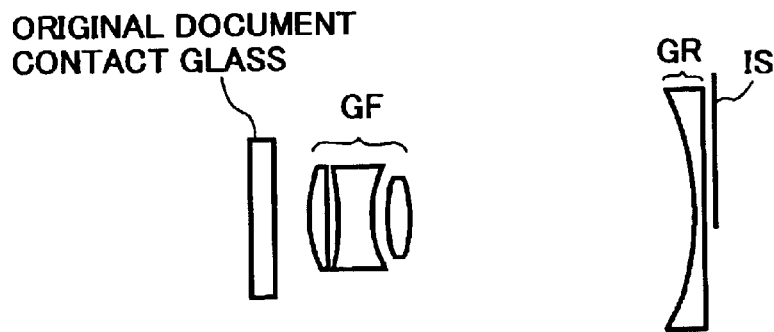
FIG. 22 is a diagram illustrating construction of an image forming lens according to example 1 of the present invention.

FIG. 22 illustrates a lens configuration and FIG. 40 illustrates aberration diagrams of Example 1.

In the aberration diagrams, C, e and F represent C-line, e-line and F-line, respectively. In the diagram showing spherical aberration, a broken line indicates the sine condition. In the diagram showing astigmatism, a broken line indicates a meridional ray and a solid line indicates a sagittal ray. These indications are the same as in any aberration diagrams of the other Examples below.

EXAMPLE 2 f=39.68, m=0.11102, $F_m$=4.35, Y=152.4

| Surface No. | R | D | $N_d$ | $v_d$ | Remark |
|---|---|---|---|---|---|
| 01 | ∞ | 3.20 | 1.51680 | 64.20 | Contact glass |
| 02 | ∞ | | | | |
| 03 | 18.136 | 2.54 | 1.77250 | 49.62 | First lens |
| 04 | 99.502 | 2.14 | | | |
| 05 | −43.344 | 4.40 | 1.72825 | 28.32 | Second lens |
| 06 | 18.141 | 1.30 | | | |
| 07 | 34.251 | 3.62 | 1.59551 | 39.22 | Third lens |
| 08 | −23.307 | 37.70 | | | |
| 09* | −22.795 | 1.00 | 1.53046 | 55.84 | Fourth lens |
| 10 | ∞ | | | | |

Non-spherical surface: Ninth surface $K=0.0, A_4=6.16139\times10^{-5}, A_6=-2.39719\times10^{-7}$, $A_8=6.82553\times10^{-10}, A_{10}=-6.07709\times10^{-13}$ Total lens length: 52.7

Back Focus: 1.00 (1.9% of the total lens length)

Interval between front and rear side lens groups:

37.70 (71.5% of the total lens length)

$f_F/f_R=1.01$

Figure 23:
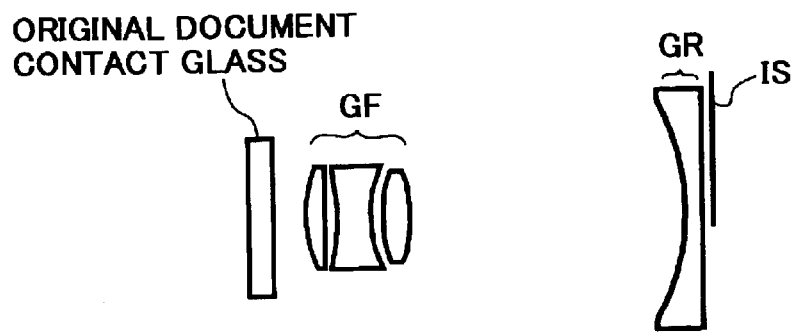
FIG. 23 is a diagram illustrating construction of an image forming lens according to example 2 of the present invention.

FIG. 23 illustrates a lens configuration and FIG. 41 strates aberration diagrams of Example 2.

EXAMPLE 3 f=41.00, m=0.11102, $F_m$=4.40, Y=152.4

| Surface No. | R | D | $N_d$ | $v_d$ | Remark |
|---|---|---|---|---|---|
| 01 | ∞ | 3.20 | 1.51680 | 64.20 | Contact glass |
| 02 | ∞ | | | | |
| 03 | 19.958 | 2.24 | 1.74330 | 49.22 | First lens |
| 04 | 75.700 | 2.09 | | | |
| 05 | −32.834 | 4.95 | 1.68893 | 31.16 | Second lens |
| 06 | 22.884 | 1.52 | | | |
| 07 | 49.445 | 3.19 | 1.80420 | 46.50 | Third lens |
| 08 | −26.788 | 36.82 | | | |
| 09* | −16.135 | 1.00 | 1.53046 | 55.84 | Fourth lens |
| 10 | −36.377 | | | | |
| 11 | ∞ | 1.00 | 1.51680 | 64.20 | Shield glass |
| 12 | ∞ | | | | |

Non-spherical surface: Ninth surface $K=0.0, A_4=5.33596\times10^{-5}, A_6=-4.97559\times10^{-9}$, $A_8=-3.08944\times10^{-10}, A_{10}=2.95608\times10^{-12}$ Total lens length: 51.81

Back Focus: 3.66 (7.1% of the total lens length converted to that in the air)

Interval between front and rear side lens groups:

36.82 (71% of the total lens length)

$f_F/f^R=1.36$

Figure 24:
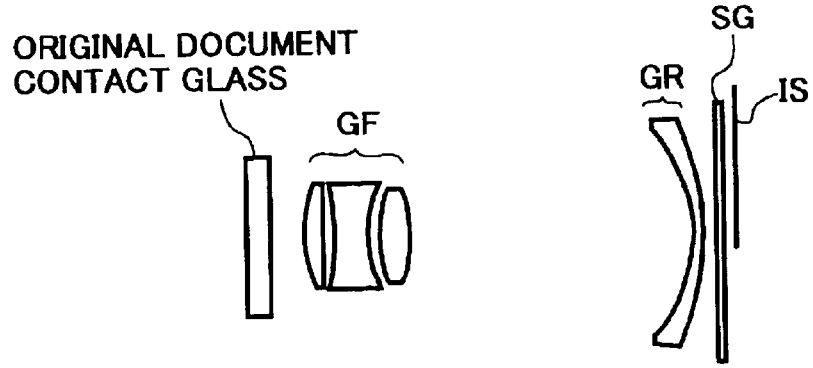
FIG. 24 is a diagram illustrating construction of an image forming lens according to example 3 of the present invention.
Figure 42:
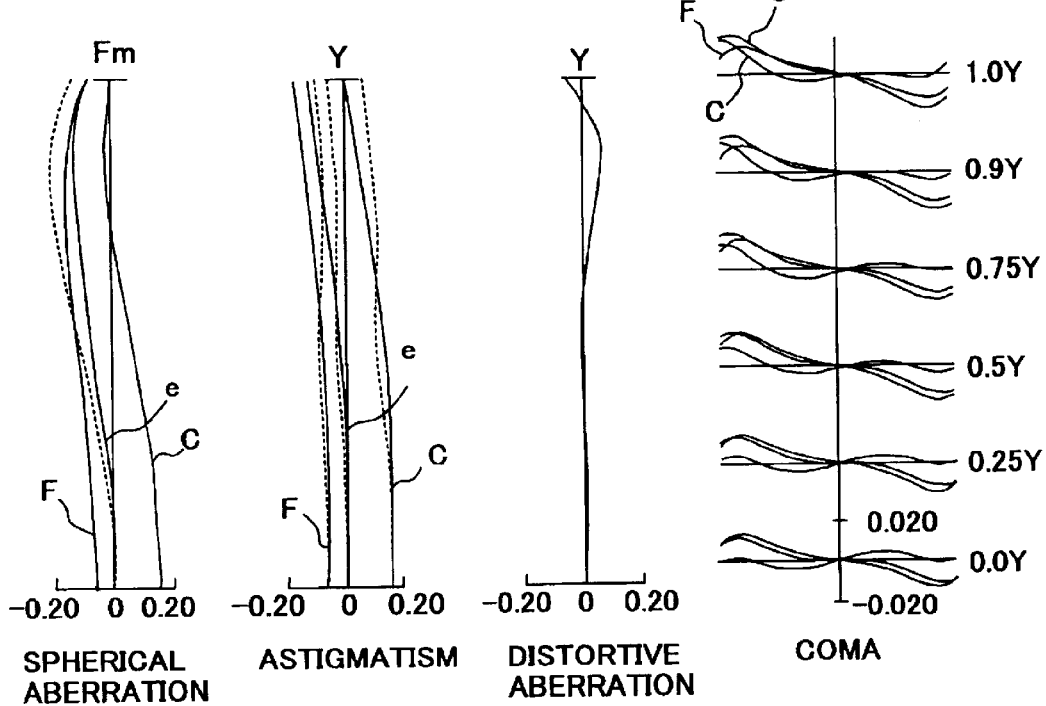
FIG. 42 is a diagram illustrating aberration of the image forming lens of example 3.

FIG. 24 illustrates a lens configuration and FIG. 42 illustrates aberration diagrams of Example 3.

EXAMPLE 4 f=38.90, m=0.11102, $F_m$=4.50, Y=152.4

| Surface No. | R | D | $N_d$ | $v_d$ | Remark |
|---|---|---|---|---|---|
| 01 | ∞ | 3.20 | 1.51680 | 64.20 | Contact glass |
| 02 | ∞ | | | | |
| 03* | 38.353 | 6.22 | 1.84666 | 23.78 | First lens |
| 04* | 24.257 | 4.50 | | | |
| 05 | 69.817 | 3.28 | 1.48749 | 70.44 | Second lens |
| 06 | −17.301 | 42.65 | | | |
| 07* | −18.025 | 2.00 | 1.53046 | 55.84 | Third lens |
| 08 | ∞ | | | | |

Non-spherical surface: Third surface $K=0.0, A_4=-5.31404\times10^{-5}, A_6=-1.84115\times10^{-7}$ $A_8=-6.12936\times10^{-10}, A_{10}=1.35889\times10^{-12}$ Non-spherical surface: Fourth surface $K=0.0, A_4=-4.32140\times10^{-5}, A_6=-2.17569\times10^{-7}$, $A_8=3.5037\times10^{-10}, A_{10}=8.11068\times10^{-12}$ Non-spherical surface: Seventh surface $K=0.0, A_4=6.36218\times10^{-5}, A_6=-2.74719\times10^{-7}$, $A_8=1.09686\times10^{-9}, A_{10}=-1.03521\times10^{-12}$ Total lens length: 58.65

Back Focus: 1.00 (1.7% of the total lens length)

Interval between front and rear side lens groups:

42.65 (73% of the total lens length)

$f_F/f_R=-818$

Figure 43:
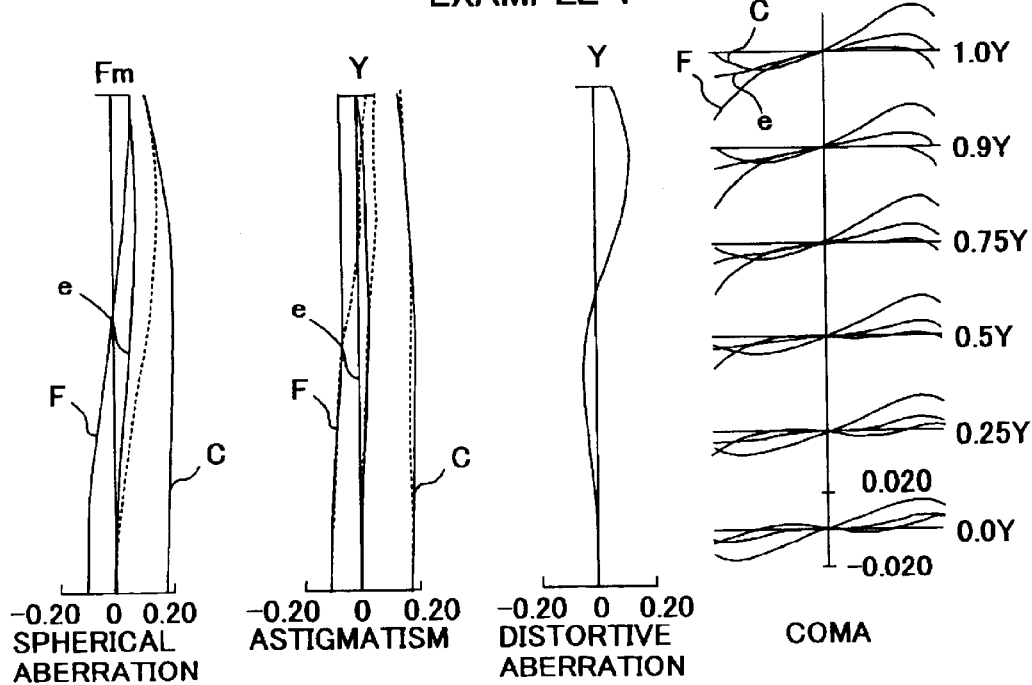
FIG. 43 is a diagram illustrating aberration of the image forming lens of example 4.

FIG. 25 illustrates a lens configuration and FIG. 43 illustrates aberration diagrams of Example 4.

EXAMPLE 5 f=61.62, m=0.018898, $F_m$=4.80, Y=152.4

| Surface No. | R | D | $N_d$ | $v_d$ | Remark |
|---|---|---|---|---|---|
| 01 | ∞ | 3.20 | 1.51680 | 64.20 | Contact glass |
| 02 | ∞ | | | | |
| 03 | 35.901 | 8.00 | 1.74330 | 49.22 | First lens |
| 04 | 76.694 | 2.43 | | | |
| 05 | −64.307 | 8.00 | 1.68893 | 31.16 | Second lens |
| 06 | 34.790 | 0.58 | | | |
| 07 | 54.494 | 8.00 | 1.83400 | 37.34 | Third lens |
| 08 | −319.753 | 0.10 | | | |
| 09 | 109.219 | 8.00 | 1.48749 | 70.44 | Fourth lens |
| 10* | −45.001 | 70.04 | | | |
| 11* | −38.671 | 2.58 | 1.53046 | 55.84 | Fifth lens |
| 12 | ∞ | | | | |

Non-spherical surface: Tenth surface $K=0.0, A_4=3.13841\times10^{-7}, A_6=-7.22203\times10^{-10}$, $A_8=-4.79523\times10^{-11}, A_{10}=1.38768\times10^{-13}$ Non-spherical surface: Eleventh surface $K=0.0, A_4=9.80652\times10^{-6}, A_6=-1.78814\times10^{-8}$, $A_8=2.17574\times10^{-11}, A_{10}=-9.08966\times10^{-15}$ Total lens length: 107.73

Back Focus: 1.00 (0.9% of the total lens length)

Interval between front and back groups:

70.04 (65% of the total lens length)

$f^F/f_R=-1.03$

Figure 44:
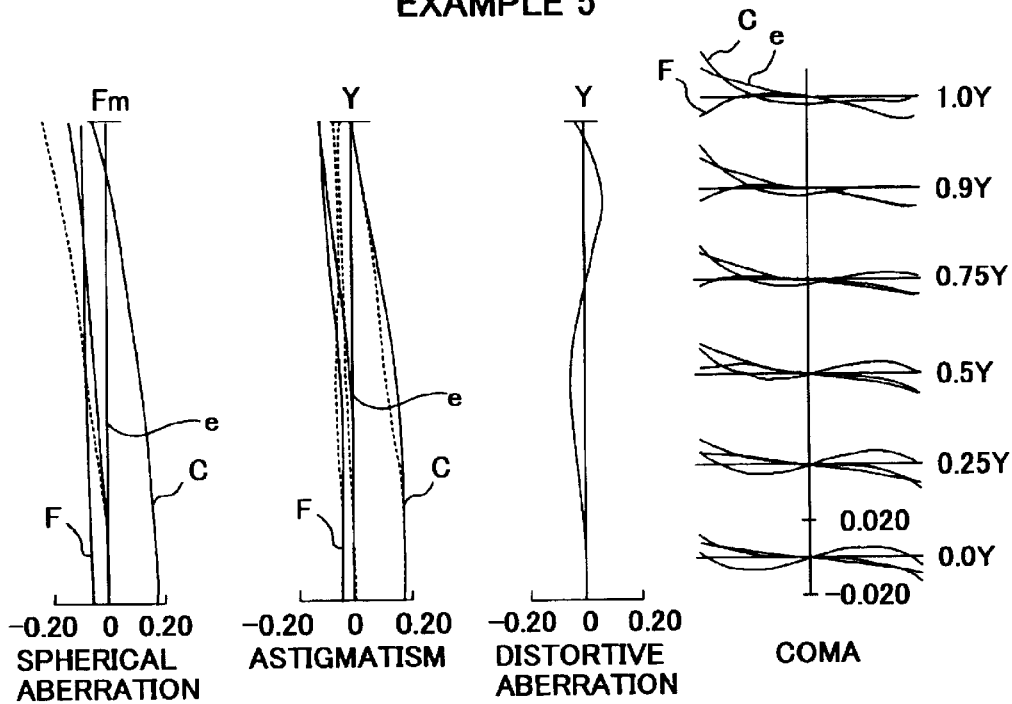
FIG. 44 is a diagram illustrating aberration of the image forming lens of example 5.

FIG. 26 illustrates a lens configuration and FIG. 44 illustrates aberration diagrams of Example 5.

EXAMPLE 6 f=70.29, m=0.23622, $F_m$=6.22, Y=152.4

| Surface No. | R | D | $N_d$ | $v_d$ | Remark |
|---|---|---|---|---|---|
| 01 | ∞ | 3.20 | 1.51680 | 64.20 | Contact glass |
| 02 | ∞ | | | | |
| 03 | 34.071 | 3.27 | 1.60311 | 60.69 | First lens |
| 04 | 321.127 | 5.26 | | | |
| 05 | −65.711 | 8.00 | 1.72342 | 37.99 | Second lens |
| 06 | 38.825 | 2.45 | | | |
| 07 | 71.413 | 8.00 | 1.69680 | 55.46 | Third lens |
| 08 | −46.983 | 89.00 | | | |
| 09* | −42.383 | 4.29 | 1.53046 | 55.84 | Fourth lens |
| 10 | ∞ | | | | |

Non-spherical surface: Ninth surface
  K=0.0, $A_4$=7.50222×10$^{-6}$, $A_6$=−7.35149×10$^{-9}$,
  $A_8$=5.82164×10$^{-12}$, $A_{10}$=−1.46608×10$^{-15}$
Total lens length: 120.27
Back Focus: 1.01 (0.8% of the total lens length)
Interval between front and rear side lens groups:
  89.00 (74% of the total lens length)
$f_F/f_R$=95

Figure 45:
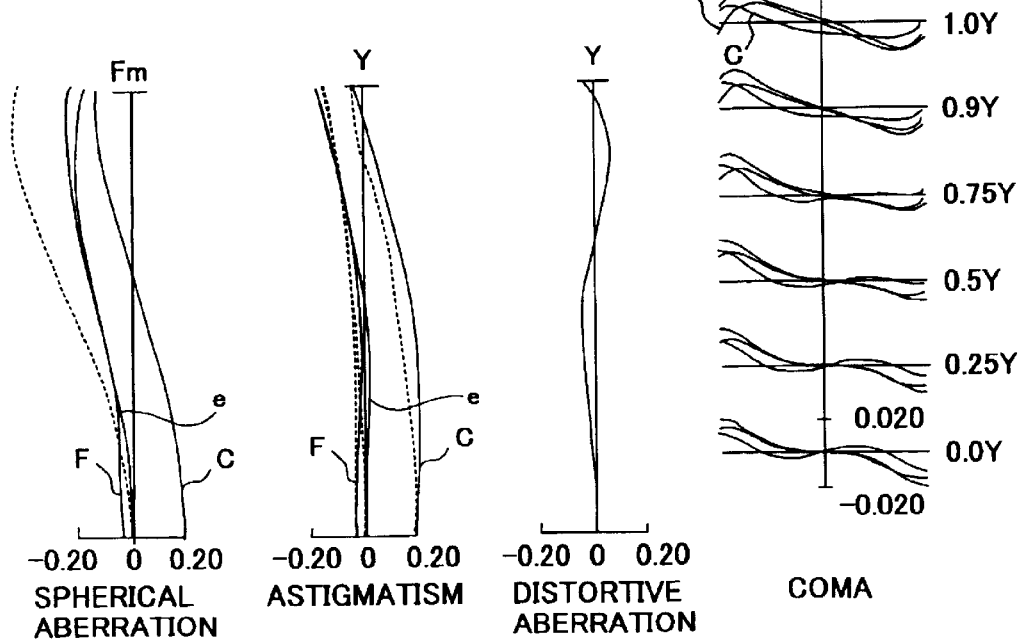
FIG. 45 is a diagram illustrating aberration of the image forming lens of example 6.

FIG. 27 illustrates a lens configuration and FIG. 45 illustrates aberration diagrams of Example 6.

EXAMPLE 7 f=73.20, m=0.23622, $F_m$=6.01, Y=152.4

| Surface No. | R | D | $N_d$ | $v_d$ | Remark |
|---|---|---|---|---|---|
| 01 | ∞ | 3.20 | 1.51680 | 64.20 | Contact glass |
| 02 | ∞ | | | | |
| 03 | 37.478 | 3.44 | 1.69680 | 55.46 | First lens |
| 04 | 197.210 | 7.91 | | | |
| 05 | −62.309 | 8.00 | 1.71736 | 29.50 | Second lens |
| 06 | 38.767 | 2.54 | | | |
| 07 | 67.415 | 8.00 | 1.70154 | 41.15 | Third lens |
| 08 | −46.115 | 83.36 | | | |
| 09* | −62.269 | 2.00 | 1.53046 | 55.84 | Fourth lens |
| 10* | 277.552 | | | | |
| 11 | ∞ | 1.00 | 1.51680 | 64.20 | Shield glass |
| 12 | ∞ | | | | |

Non-spherical surface: Ninth surface
  K=0.0, $A_4$=−3.76635×10$^{-6}$, $A_6$=6.30996×10$^{-9}$,
  $A_8$=−1.85384×10$^{-12}$, $A_{10}$=−5.96053×10$^{-16}$
Non-spherical surface: Tenth surface
  K=0.0, $A_4$=−4.68601×10$^{-6}$, $A_6$=1.26013×10$^{-9}$,
  $A_8$=3.19086×10$^{-12}$, $A_{10}$=−1.87719×10$^{-15}$
Total lens length: 115.25
Back Focus: 4.66 (4.0% of the total lens length converted to that in the air)
Interval between front and rear side lens groups:
  83.36 (72% of the total lens length)
$f_F/f_R$=−1.14

Figure 46:
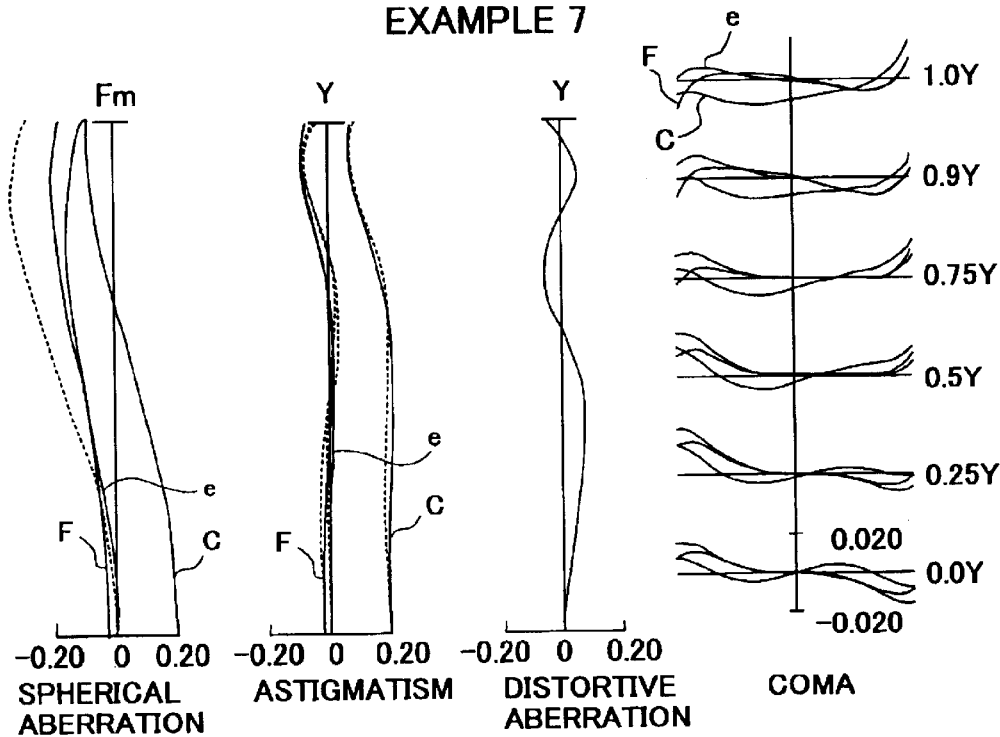
FIG. 46 is a diagram illustrating aberration of the image forming lens of example 7.

FIG. 28 illustrates a lens configuration and FIG. 46 illustrates aberration diagrams of Example 7.

EXAMPLE 8 f=63.63, m=0.18898, $F_m$=5.01, Y=152.4

| Surface No. | R | D | $N_d$ | $v_d$ | Remark |
|---|---|---|---|---|---|
| 01 | ∞ | 3.20 | 1.51680 | 64.20 | Contact glass |
| 02 | ∞ | | | | |
| 03 | 35.539 | 4.88 | 1.48749 | 70.44 | First lens |
| 04 | 212.293 | 9.32 | | | |
| 05 | −51.136 | 8.00 | 1.72825 | 28.32 | Second lens |
| 06 | 516.722 | 2.35 | | | |
| 07* | 310.769 | 8.00 | 1.69350 | 53.34 | Third lens |
| 08 | −42.331 | 67.10 | | | |
| 09* | −51.910 | 2.00 | 1.53046 | 55.84 | Fourth lens |
| 10* | 106.745 | | | | |
| 11 | ∞ | 1.00 | 1.51680 | 64.20 | Shield glass |
| 12 | ∞ | | | | |

Non-spherical surface: Seventh surface
  K=0.0, $A_4$=−3.66708×10$^{-6}$, $A_6$=−1.16532×10$^{-8}$,
  $A_8$=2.14790×10$^{-10}$, $A_{10}$=−1.33775×10$^{-12}$
Non-spherical surface: Ninth surface
  K=0.0, $A_4$=−1.46868×10$^{-5}$, $A_6$=4.32801×10$^{-8}$,
  $A_8$=−5.35630×10$^{-11}$, $A_{10}$=2.59883×10$^{-14}$
Non-spherical surface: Tenth surface
  K=0.0, $A_4$=−1.60498×10$^{-5}$, $A_6$=3.08020×10$^{-8}$,
  $A_8$=−2.84394×10$^{-11}$, $A_{10}$=1.00585×10$^{-14}$
Total lens length: 101.65
Back Focus: 4.66 (4.6% of the total lens length converted to that in the air)
Interval between front and rear side lens groups:
  67.10 (66% of the total lens length)
$f_F/f_R$=−0.92

Figure 47:
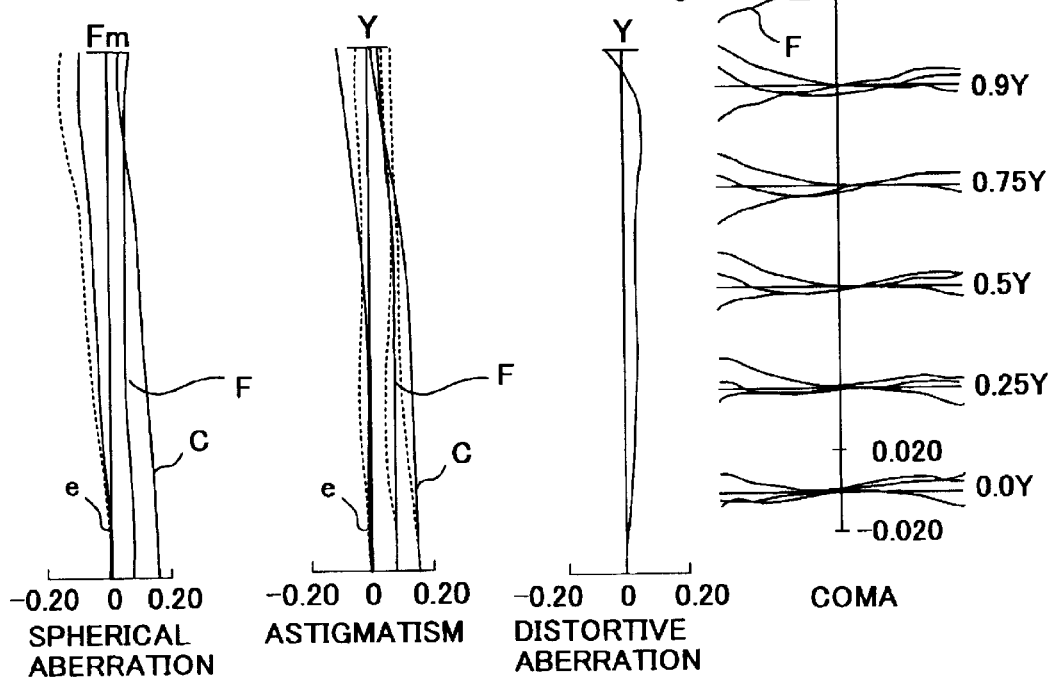
FIG. 47 is a diagram illustrating aberration of the image forming lens of example 8.

FIG. 29 illustrates a lens configuration and FIG. 47 illustrates aberration diagrams of Example 8.

EXAMPLE 9 f=41.00, m=0.11102, $F_m$=4.40, Y=152.4

| Surface No. | R | D | $N_d$ | $v_d$ | Remark |
|---|---|---|---|---|---|
| 01 | ∞ | 3.20 | 1.51680 | 64.20 | Contact glass |
| 02 | ∞ | | | | |
| 03 | 17.338 | 2.37 | 1.77250 | 49.62 | First lens |
| 04 | 61.199 | 3.53 | | | |
| 05 | −32.820 | 1.14 | 1.80518 | 25.46 | Second lens |
| 06 | 20.606 | 1.38 | | | |
| 07 | 47.180 | 5.58 | 1.83400 | 37.34 | Third lens |
| 08 | −23.995 | 31.47 | | | |
| 09* | −14.590 | 1.00 | 1.53046 | 55.84 | Fourth lens |
| 10 | −26.330 | | | | |
| 11 | ∞ | 1.00 | 1.51680 | 64.20 | Shield glass |
| 12 | ∞ | | | | |

Non-spherical surface: Ninth surface
  K=0., $A_4$=−3.57449×10$^{-6}$, $A_6$=2.01006×10$^{-7}$,
  $A_8$=−1.47522×10$^{-9}$, $A_{10}$=8.45052×10$^{-12}$
Total lens length: 46.47
Back Focus: 6.66 (14.3% of the total lens length converted to that in the air)
Interval between front and rear side lens groups:
  31.47 (68% of the total lens length)
$f_F/f_R$=−1.60

Figure 30:
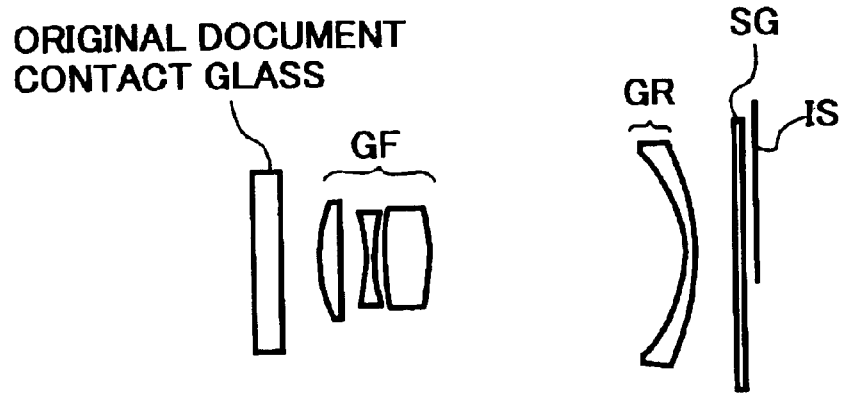
FIG. 30 is a diagram illustrating construction of an image forming lens according to example 9 of the present invention.
Figure 48:
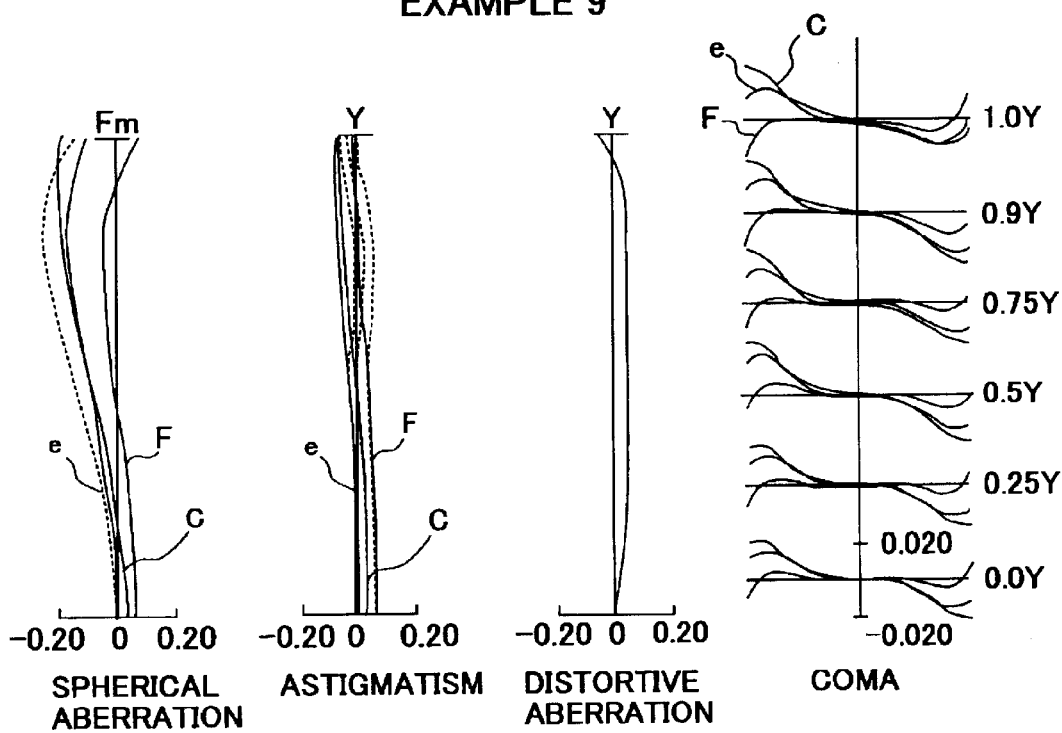
FIG. 48 is a diagram illustrating aberration of the image forming lens of example 9.

FIG. 30 illustrates a lens configuration and FIG. 48 illustrates aberration diagrams of Example 9.

EXAMPLE 10 f=42.25, m=0.11102, $F_m$=4.43, Y=152.4

| Surface No. | R | D | $N_d$ | $v_d$ | Remark |
|---|---|---|---|---|---|
| 01 | ∞ | 3.20 | 1.51680 | 64.20 | Contact glass |
| 02 | ∞ | | | | |
| 03 | 18.725 | 2.15 | 1.79450 | 45.39 | First lens |
| 04 | 50.452 | | | | |
| 05 | −35.539 | 5.54 | 1.72825 | 28.32 | Second lens |
| 06 | 20.467 | 1.57 | | | |
| 07 | 33.614 | 2.92 | 1.83500 | 42.98 | Third lens |
| 08 | −29.292 | 28.43 | | | |
| 09* | −13.555 | 1.00 | 1.53046 | 55.84 | Fourth lens |
| 10 | −22.209 | | | | |
| 11 | ∞ | 1.00 | 1.51680 | 64.20 | Shield glass |
| 12 | ∞ | | | | |

Non-spherical surface: Ninth surface

K=0.0, $A_4$=2.21483×10$^{-5}$, $A_6$=1.77589×10$^{-7}$,
$A_8$=−1.30330×10$^{-9}$, $A_{10}$=1.08288×10$^{-11}$

Total lens length: 43.43
Back Focus: 10.66 (24.5% of the total lens length converted to that in the air)
Interval between front and rear side lens groups:
  28.43 (65% of the total lens length)
$f^F/f_R$=−1.79

Figure 31:
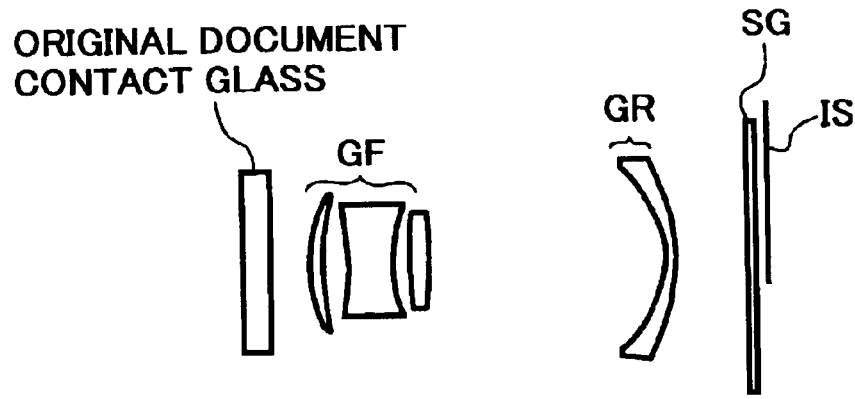
FIG. 31 is a diagram illustrating construction of an image forming lens according to example 10 of the present invention.
Figure 49:
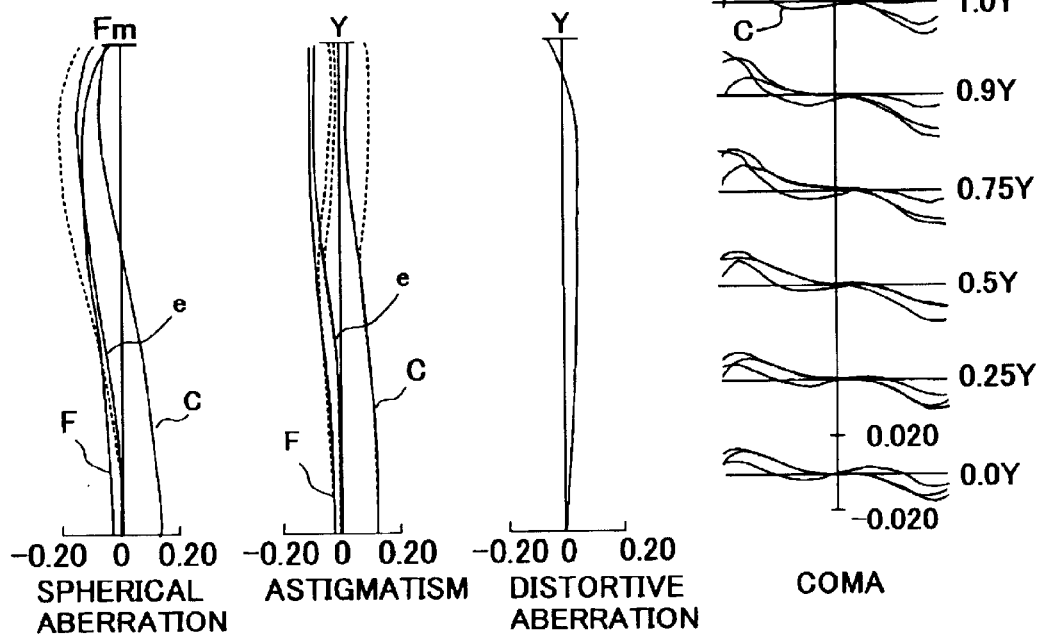
FIG. 49 is a diagram illustrating aberration of the image forming lens of example 10.

FIG. 31 illustrates a lens configuration and FIG. 49 illustrates aberration diagrams of Example 10.

EXAMPLE 11 f=39.68, m=0.11102, $F_m$=4.44, y=152.4

| Surface No. | R | D | Nd | vd | Remark |
|---|---|---|---|---|---|
| 01 | ∞ | 3.20 | 1.51680 | 64.20 | Contact glass |
| 02 | ∞ | | | | |
| 03 | 17.971 | 2.53 | 1.77250 | 49.62 | First lens |
| 04 | 98.354 | 2.17 | | | |
| 05 | −43.786 | 4.12 | 1.72825 | 28.32 | Second lens |
| 06 | 17.988 | 1.30 | | | |
| 07 | 34.649 | 3.88 | 1.59551 | 39.22 | Third lens |
| 08 | −23.338 | 37.68 | | | |
| 09* | −22.795 | 1.00 | 1.53046 | 55.84 | Fourth lens |
| 10 | ∞ | | | | |

Note that the first to third lenses constitute a front side lens group and the fourth lens is a rear side lens group.

Note that the first to third lenses constitute a front side lens group and the fourth lens is a rear side lens group.

Anamorphic, non-spherical surface: Ninth surface

Ky=−0.661406, Kz=3.042663, Rz=−22.795,
Ar4=1.81958×10$^{-4}$, Ar6=−2.30560×10$^{-6}$
Ar8=6.05114×10$^{-9}$, Ar10=−1.35589×10$^{-14}$
Ar4=−0.461208, Ap6=−0.531361,
Ar8=−0.424941, Ap10=1.18448

Total lens length: 52.68
Back focus: 1.00
Interval between front and rear side lens groups: 37.68

Figure 50:
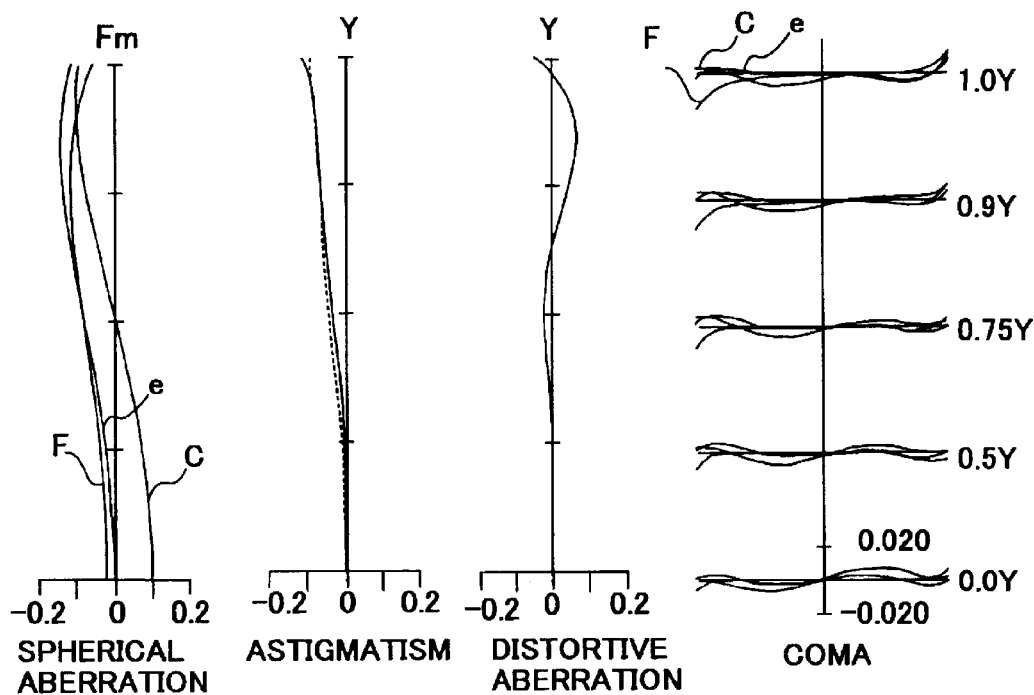
FIG. 50 is a diagram illustrating aberration of the image forming lens of example 11.

FIG. 32 illustrates a lens construction and FIG. 50 illustrates aberration diagrams of Example 11.

EXAMPLE 12 f=40.79, m=0.11102, $F_m$=4.44, y=152.4

| Surface No. | R | D | Nd | vd | Remark |
|---|---|---|---|---|---|
| 01 | ∞ | 3.20 | 1.51680 | 64.20 | Contact glass |
| 02 | ∞ | | | | |
| 03 | 20.020 | 2.18 | 1.74330 | 49.22 | First lens |
| 04 | 86.875 | 1.54 | | | |
| 05 | −34.199 | 5.46 | 1.68893 | 31.16 | Second lens |
| 06 | 23.398 | 1.11 | | | |
| 07 | 54.552 | 3.70 | 1.80420 | 46.50 | Third lens |
| 08 | −27.112 | 36.55 | | | |
| 09* | −16.135 | 1.00 | 1.53046 | 55.84 | Fourth lens |
| 10 | −39.423 | | | | |
| 11 | ∞ | 1.00 | 1.51680 | 64.20 | Shield glass |
| 12 | ∞ | | | | |

Note that the first to third lenses constitute a front side lens group and the fourth lens is a rear side lens group.

Anamorphic non-spherical surface: Ninth surface

Ky=−0.035723, Kz=−1.594439, Rz=−16.135,
Ar4=4.11503×10$^{-5}$, Ar6=−7.47545×10$^{-8}$
Ar8=2.28225×10$^{-7}$, Ar10=6.4437'10$^{-12}$
Ar4=0.177774, Ap6=−0.0861326,
Ap8=−1.12613, Ap10=−0.222025

Total lens length: 51.54
Back focus: 3.66 (Converted to that in the air)
Interval between front and rear side lens groups: 36.55

Figure 51:
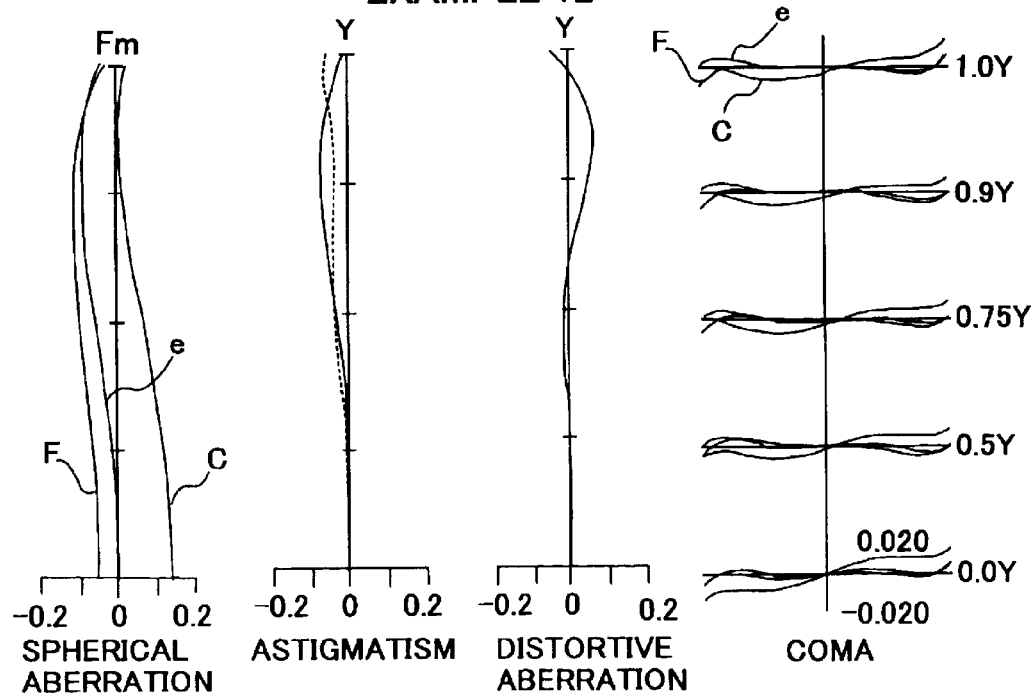
FIG. 51 is a diagram illustrating aberration of the image forming lens of example 12.

FIG. 33 illustrates a lens construction and FIG. 51 illustrates aberration diagrams of Example 12.

EXAMPLE 13 f=38.59, m=0.11102, $F_m$=4.44, y=152.4

| Surface No. | R | D | Nd | vd | Remark |
|---|---|---|---|---|---|
| 01 | ∞ | 3.20 | 1.51680 | 64.20 | Contact glass |
| 02 | ∞ | | | | |
| 03* | 39.206 | 6.27 | 1.84666 | 23.78 | First lens |
| 04* | 24.724 | 4.45 | | | |
| 05 | 68.641 | 3.28 | 1.48749 | 70.44 | Second lens |
| 06 | −17.366 | 42.44 | | | |
| 07* | −16.704 | 2.00 | 1.53046 | 55.84 | Third lens |
| 08 | ∞ | | | | |

Note that the first and second lenses constitute a front side lens group and the third lens is a rear side lens group.

Non-spherical surface: Third surface

K=0.0, A4=−5.23648'10$^{-5}$, A6=−1.81495×10$^{-7}$,
A8=−5.98225×10$^{-10}$, A10=1.43686×10$^{-12}$

Non-spherical surface: Fourth surface

K=0.0, A4=−4.16623×10$^{-5}$, A6=−2.17734×10$^{-7}$,
A8=4.24187×10$^{-10}$, A10=8.14876×10$^{-12}$,

Anamorphic non-spherical surface: Seventh surface

Ky=−0.049994, Kz=−0.804234, Rz=−18.025,
Ar4=9.06755×10$^{-5}$, Ar6=−5.7460×10$^{-7}$,
Ar8=8.99519×10$^{-10}$, Ar10=−2.59437×10$^{-14}$,
Ap4=−0.0564433, Ap6=−0.200993,
Ap=0.00594202, Ap10=0.0453199

Total lens length: 58.44
Back focus: 1.00
Interval between front and rear side lens groups: 42.44

Figure 52:
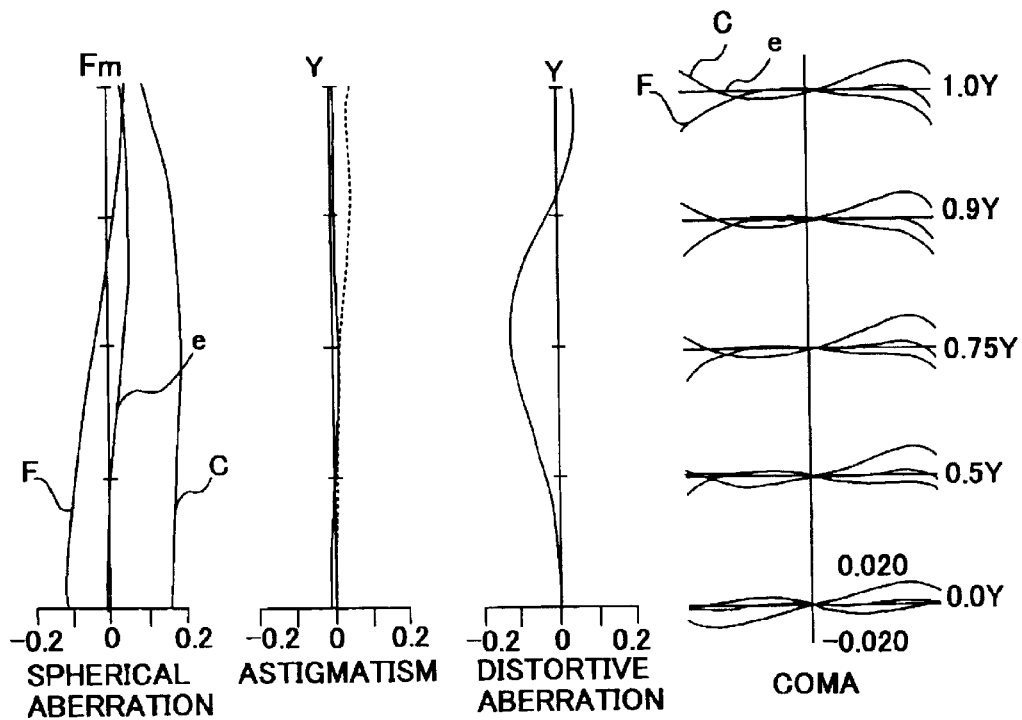
FIG. 52 is a diagram illustrating aberration of the image forming lens of example 13.

FIG. 34 illustrates a lens construction and FIG. 52 rates aberration diagrams of Example 13.

EXAMPLE 14 f=60.78, m=0.18898, $F_m$=4.76, y=152.4

| Surface No. | R | D | Nd | vd | Remark |
|---|---|---|---|---|---|
| 01 | ∞ | 3.20 | 1.51680 | 64.20 | Contact glass |
| 02 | ∞ | | | | |
| 03 | 36.829 | 8.00 | 1.74330 | 49.22 | First lens |
| 04 | 81.633 | 2.39 | | | |
| 05 | −62.773 | 8.00 | 1.68893 | 31.16 | Second lens |
| 06 | 36.801 | 0.57 | | | |
| 07 | 59.057 | 7.90 | 1.83400 | 37.34 | Third lens |
| 08 | −293.269 | 0.10 | | | |
| 09 | 103.556 | 8.00 | 1.48749 | 70.44 | Fourth lens |
| 10* | −45.016 | 69.25 | | | |
| 11* | −34.662 | 3.28 | 1.53046 | 55.84 | Fifth lens |
| 12 | ∞ | | | | |

Note that the first to fourth lenses constitute a front side lens group and the fifth lens is a rear side lens group.

Figure 53:
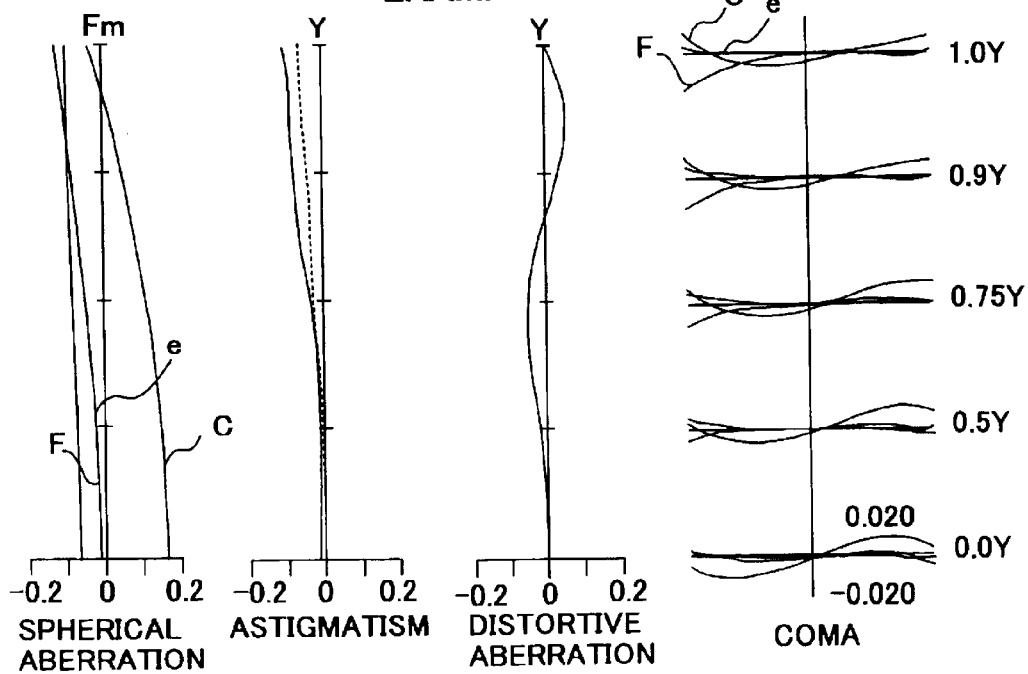
FIG. 53 is a diagram illustrating aberration of the image forming lens of example 14.

Non-spherical surface: Tenth surface
  K=0.0, A4=6.78543×10$^{-7}$, A6=−3.20159×10$^{-9}$,
  A8=−7.53771×10$^{-12}$, A10=−1.14835×10$^{-14}$
Anamorphic non-spherical surface: Eleventh surface
  Ky=−1.457856, Kz=5.453812, Rz=−38.671,
  Ar4=3.92170×10$^{-5}$, Ar6=−8.79593×10$^{-8}$
  Ar8=5.38083×10$^{-11}$, Ar10=−2.11660×10$^{-15}$
  Ap4=−0.564759, Ap6=−0.394843,
  Ap8=−0.195904, Ap10=0.369208
Total lens length: 107.49
Back focus: 1.00
Interval between front and rear side lens groups: 69.25
  FIG. 35 illustrates a lens construction and FIG. 53 illustrates aberration diagrams of Example 14.

EXAMPLE 15 f=69.98, m=0.23622, $F_m$=6.47, y=152.4

| Surface No. | R | D | Nd | vd | Remark |
|---|---|---|---|---|---|
| 01 | ∞ | 3.20 | 1.51680 | 64.20 | Contact glass |
| 02 | ∞ | | | | |
| 03 | 34.640 | 3.26 | 1.60311 | 60.69 | First lens |
| 04 | 348.744 | 5.50 | | | |
| 05 | −64.559 | 8.00 | 1.72342 | 37.99 | Second lens |
| 06 | 40.233 | 2.23 | | | |
| 07 | 75.950 | 8.00 | 1.69680 | 55.46 | Third lens |
| 08 | −46.704 | 93.13 | | | |
| 09* | −43.953 | 1.00 | 1.53046 | 55.84 | Fourth lens |
| 10 | ∞ | | | | |

Note that the first to third lenses constitute a front side lens group and the fourth lens is a rear side lens group.

Figure 54:
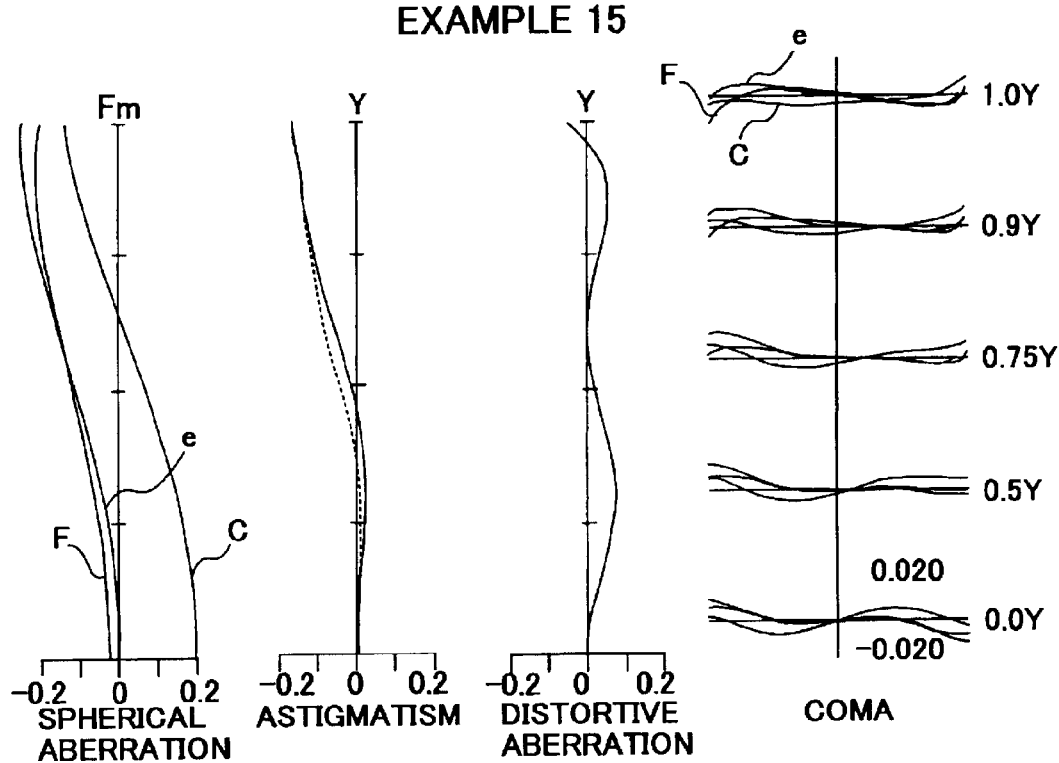
FIG. 54 is a diagram illustrating aberration of the image forming lens of example 15.

Anamorphic non-spherical surface: Ninth surface
  Ky=−0.676574, Kz=4.381140, Rz=−42.383,
  Ar4=6.74064×10$^{-6}$, Ar6=−8.85894×10$^{-9}$
  Ar8=7.33176×10$^{-12}$, Ar10=−7.6769×10$^{-16}$
  Ar4=0.178486, Ap6=0.0608945,
  Ap8=−0.0309833, Ap10=0.142678
Total lens length: 121.12
Back focus: 1.00
Interval between front and rear side lens groups: 93.13
  FIG. 36 illustrates a lens construction and FIG. 54 illustrates aberration diagrams of Example 15.

EXAMPLE 16 f=63.92, m=0.18898, $F_m$=5.00, y=152.4

| Surface No. | R | D | Nd | vd | Remark |
|---|---|---|---|---|---|
| 01 | ∞ | 3.20 | 1.51680 | 64.20 | Contact glass |
| 02 | ∞ | | | | |
| 03 | 34.832 | 4.49 | 1.48749 | 70.44 | First lens |
| 04 | 144.141 | 9.30 | | | |
| 05 | −51.978 | 8.00 | 1.72825 | 28.32 | Second lens |
| 06 | 501.614 | 1.32 | | | |
| 07* | 210.585 | 8.00 | 1.69350 | 53.34 | Third lens |
| 08 | −43.338 | 67.34 | | | |
| 09* | −50.340 | 2.58 | 1.53046 | 55.84 | Fourth lens |
| 10* | 126.085 | | | | |
| 11 | ∞ | 1.00 | 1.51680 | 64.20 | Shield glass |
| 12 | ∞ | | | | |

Note that the first to third lenses constitute a front side lens group and the fourth lens is a rear side lens group.

Figure 55:
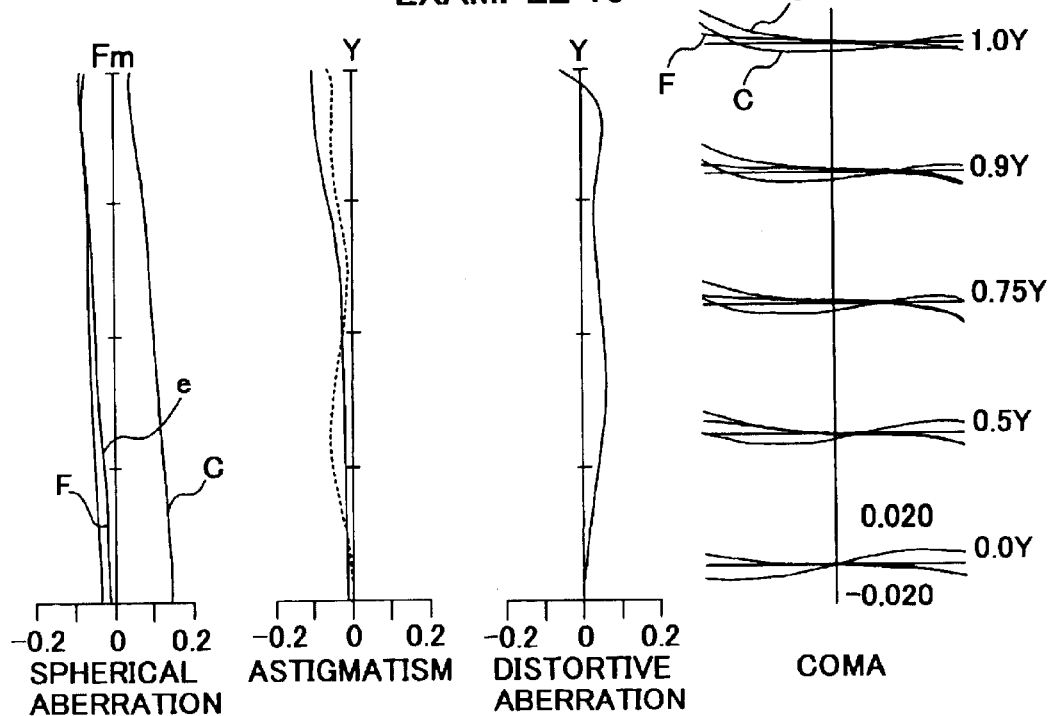
FIG. 55 is a diagram illustrating aberration of the image forming lens of example 16.

Non-spherical surface: Seventh surface
  K=0.0, A4=−3.83883×10$^{-6}$, A6=−6.85613×10$^{-9}$,
  A8=1.19638×10$^{-10}$, A10=−7.02416×10$^{-13}$
Anamorphic non-spherical surface: Ninth surface
  Ky=−0.600869, Kz=12.199779, Rz=−51.910,
  Ar4=−2.34995×10$^{-5}$, Ar6=4.57092×10$^{-8}$
  Ar8=−4.88959×10$^{-11}$, Ar10=2.88600×10$^{-14}$
  Ap4=0.0353927, Ap6=0.0458283,
  Ap8=0.00628342, Ap10=−0.124619
Non-spherical surface: Tenth surface
  K=0.0, A4=−2.93589×10$^{-5}$, A6=3.73867×10$^{8}$,
  A8=−2.17572×10$^{-11}$, A10=2.07039×10$^{-15}$
Total lens length: 101.03
Back focus: 4.66 (converted to that in the air)
Interval between front and rear side lens groups: 67.34
  FIG. 37 illustrates a lens construction and FIG. 55 illustrates aberration diagrams of Example 16.

EXAMPLE 17 f=42.21, m=0.11102, $F_m$=4.44, y=152.4

| Surface No. | R | D | Nd | vd | Remark |
|---|---|---|---|---|---|
| 01 | ∞ | 3.20 | 1.51680 | 64.20 | Contact glass |
| 02 | ∞ | | | | |
| 03 | 17.469 | 2.37 | 1.77250 | 49.62 | First lens |
| 04 | 58.731 | 3.80 | | | |
| 05 | −32.700 | 1.00 | 1.80518 | 25.46 | Second lens |
| 06 | 20.535 | 1.38 | | | |
| 07 | 45.096 | 5.45 | 1.83400 | 37.34 | Third lens |
| 08 | −24.172 | 31.96 | | | |
| 09* | −14.489 | 1.00 | 1.53046 | 55.84 | Fourth lens |
| 10 | −22.374 | | | | |
| 11 | ∞ | 1.00 | 1.51680 | 64.20 | Shield glass |
| 12 | ∞ | | | | |

Note that the first to third lenses constitute a front side lens group and the fourth lens is a rear side lens group.

Anamorphic non-spherical surface: Ninth surface
  Ky=−0.203304, Kz=0.206564, Rz=−14.58970,
  Ar4=2.09955×10$^{-5}$, Ar6=3.91751×10$^{-6}$
  Ar8=−1.98286×10$^{-9}$, Ar=3.18517×10$^{-12}$
  Ap4=0.144078, Ap6=−0.899680,
  Ap8=−0.782298, Ap10=−0.138325

Total lens length: 46.96
Back focus: 5.66 (converted to that in the air)
Interval between front and rear side lens groups: 31.96

Figure 38:
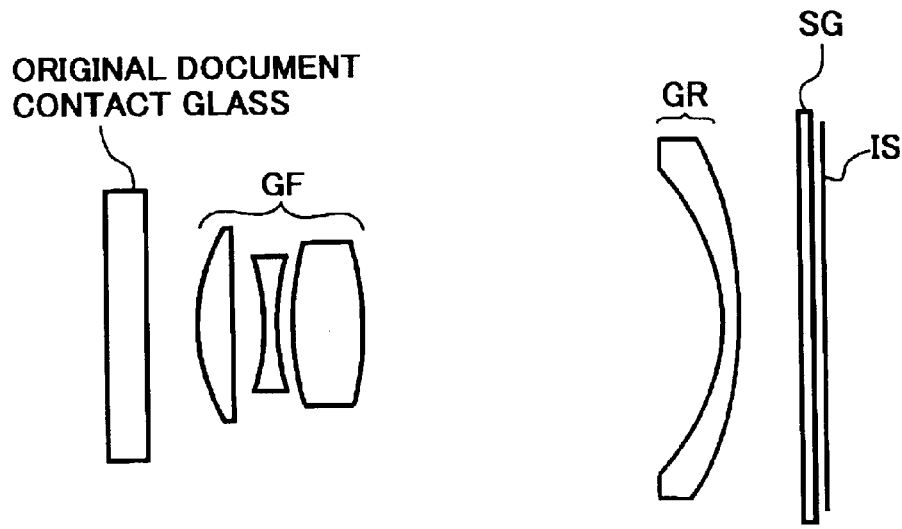
FIG. 38 is a diagram illustrating construction of an image forming lens according to example 17 of the present invention.
Figure 56:
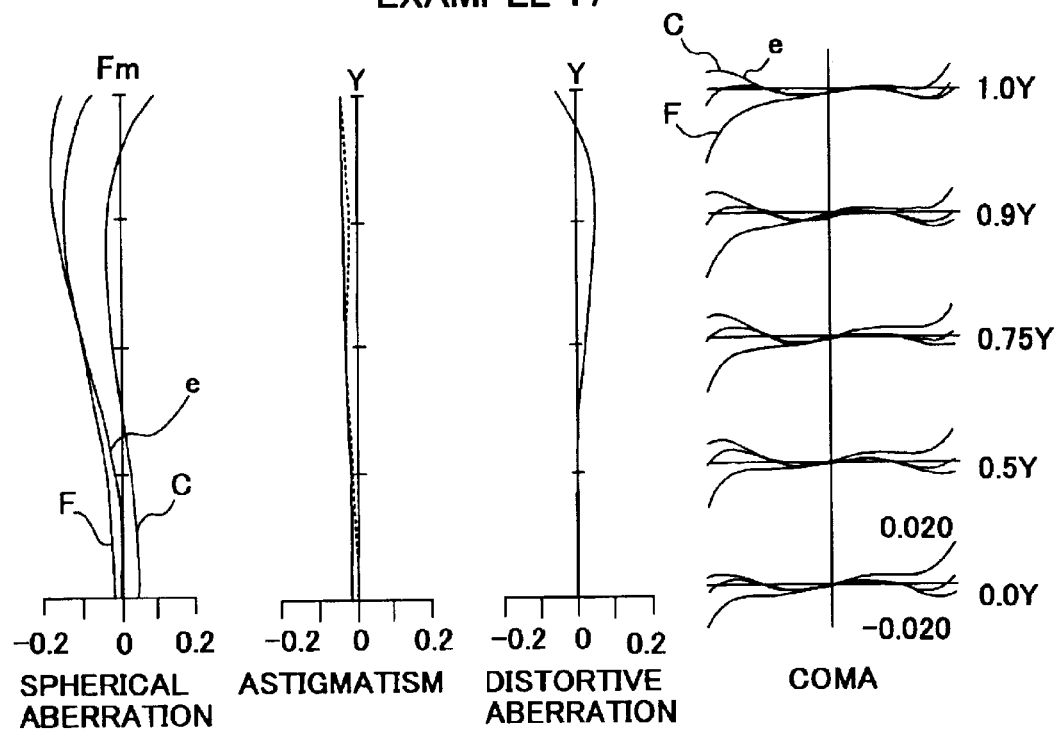
FIG. 56 is a diagram illustrating aberration of the image forming lens of example 17.

FIG. 38 illustrates a lens construction and FIG. 56 illustrates aberration diagrams of Example 17.

EXAMPLE 18

$f=2.43$, $m=0.11102$, $F_m=4.441$ $y=152.4$

| Surface No. | R | D | Nd | vd | Remark |
|---|---|---|---|---|---|
| 01 | ∞ | 3.20 | 1.51680 | 64.20 | Contact glass |
| 02 | ∞ | | | | |
| 03 | 17.447 | 2.11 | 1.79450 | 45.39 | First lens |
| 04 | 41.697 | 2.52 | | | |
| 05 | −36.063 | 3.32 | 1.72825 | 28.32 | Second lens |
| 06 | 18.947 | 1.50 | | | |
| 07 | 32.183 | 4.54 | 1.83500 | 42.98 | Third lens |
| 08 | −28.708 | 28.48 | | | |
| 09* | −13.555 | 1.00 | 1.53046 | 55.84 | Fourth lens |
| 10 | −20.731 | | | | |
| 11 | ∞ | 1.00 | 1.51680 | 64.20 | Shield glass |
| 12 | ∞ | | | | |

Note that the first to third lenses constitute a front side lens group and the fourth lens is a rear side lens group.

Anamorphic non-spherical surface: Ninth surface
Ky=−0.271254, Kz=−0.359977, Rz=−13.55465,
Ar4=4.43077×10$^{-6}$, Ar6=8.13063×10$^{-6}$
Ar8=−2.77248×10$^{-7}$, Ar10=8.94510×10$^{-13}$
Ap4=0.469320, Ap6=−1.00025,
Ap8=−1.05721, Ap10=−0.0550631
Total lens length: 43.47
Back focus: 10.66 (converted to that in the air)
Interval between front and rear groups: 28.48

Figure 39:
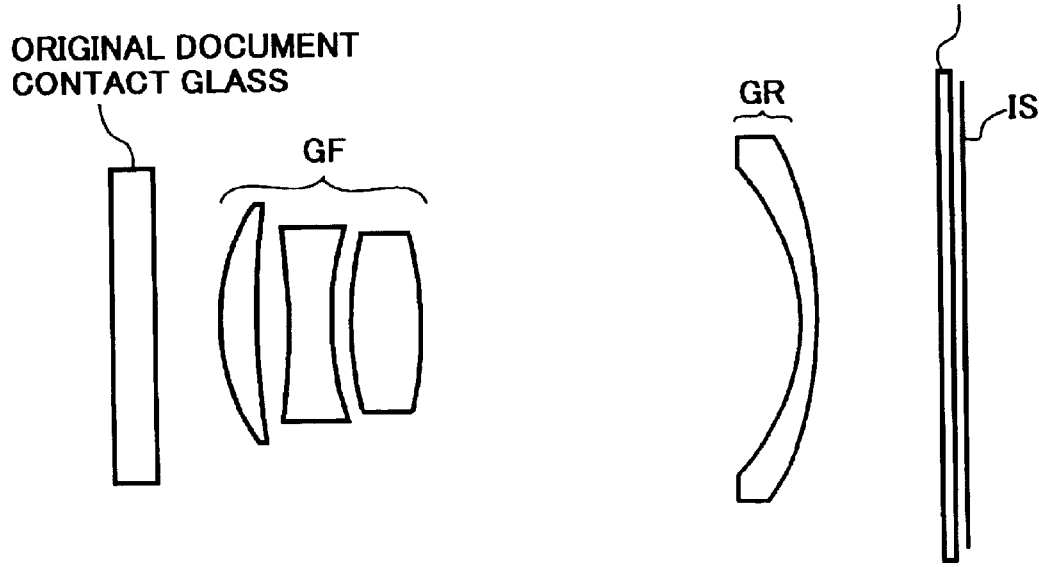
FIG. 39 is a diagram illustrating construction of an image forming lens according to example 18 of the present invention.
Figure 57:
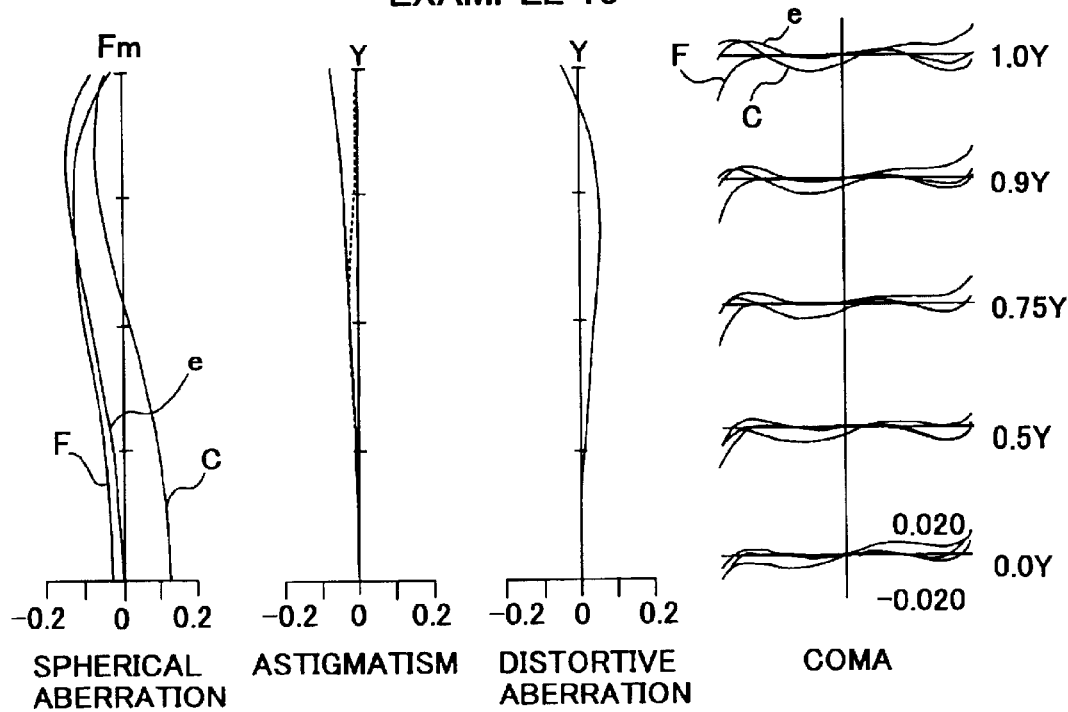
FIG. 57 is a diagram illustrating aberration of the image forming lens of example 18.

FIG. 39 illustrates a lens construction and FIG. 57 illustrates aberration diagrams of Example 18.

The image forming lenses of the above Examples 1–10 are suitable for use in reading an image of an original document. Each of the image forming lenses includes a front side lens group arranged at an object side and a rear side lens group arranged at an image forming side. The front side lens group may include from 2 to 4 pieces of lenses including at least one positive lens, and the rear side lens group includes one negative lens. The back-focus of the image forming lens in an actual usage state of the image forming lens is equal to or smaller than 25% of an entire length of the image forming lens and an air space between the front side lens group and the rear side lens group is equal to or greater than 50% of the entire length of the image forming lens.

The image forming lens of Example 4 includes the front side lens group having 2 pieces of lenses, the image forming lens of Examples 1, 2, 3, and 6–10 includes the front side lens group having 3 pieces of lenses, and the image forming lens of Example 5 includes the front side lens group having 4 pieces of lenses.

The image forming lens of Example 1 is constructed such that all of the lenses are spherical lenses. The image forming lenses of Examples 2–10 are configured such that at least one surface of the lenses is made non-spherical. In each of Examples 2–10, the incident side surface of the rear side lens group is non-spherical. In Examples 7 and 8, the imaging side surface of the rear side lens group is non-spherical.

Further, in each of the image forming lens of Examples 1–10, the rear side lens group is plastic. In each of the image forming lenses of Examples 1–8, the back-focus of the image forming lens in the actual usage state thereof is equal to or smaller than 10% of the entire length of the image forming lens.

What is claimed is:

1. An image forming lens for forming an image of an original document, comprising:
    a front side lens group having 2 to 4 pieces of lenses and arranged at an object side, said 2 to 4 pieces of lenses including at least one positive lens; and
    a rear side lens group constituted of one negative lens and arranged at an image forming side,
    wherein a back-focus of the image forming lens in an actual usage state thereof is equal to or smaller than 25% of an entire length of the image forming lens, and an air space between the front side lens group and the rear side lens group is equal to or greater than 50% of the entire length of the image forming lens.

2. The image forming lens according to claim 1, wherein an incident side surface of the rear side lens group is non-spherical.

3. The image forming lens according to claim 1, wherein an imaging side surface of the rear side lens group is non-spherical.

4. The image forming lens according to claim 1, wherein the rear side lens group is plastic.

5. The image forming lens according to claim 1, wherein the back-focus of the image forming lens in the actual usage state thereof is equal to or smaller than 10% of the entire length of the image forming lens.

6. The image forming lens according to claim 1, wherein the rear side lens group includes at least one anamorphic surface.

7. An image forming lens for forming an image of an original document, comprising:
    a front side lens group having 2 to 4 pieces of lenses and arranged at an object side, said 2 to 4 pieces of lenses including at least one positive lens; and
    a rear side lens group constituted of one negative lens and arranged at an image forming side,
    wherein an outer shape of the rear side lens group has a rotational asymmetry with respect to an optical axis of the image forming lens,
    wherein a back-focus of the image forming lens in an actual usage state thereof is equal to or smaller than 25% of an entire length of the image forming lens, and an air space between the front side lens group and the rear side lens group is equal to or greater than 50% of the entire length of the image forming lens.

8. The image forming lens according to claim 7, wherein the outer shape of the rear side lens group is in a strip-like form long in a main scanning direction.

9. The image forming lens according to claim 7, wherein the rear side lens group is plastic and includes an engaging part for positioning, supporting or fixing the image forming lens.

10. An image forming lens unit, comprising:
    an image forming lens for forming an image of an original document, the image forming lens including a front side lens group having 2 to 4 pieces of lenses and arranged at an object side, said 2 to 4 pieces of lenses including at least one positive lens, and a rear side lens group constituted of one negative lens and arranged at an image forming side, a back-focus of the image forming lens in an actual usage state thereof being equal to or smaller than 25% of an entire length of the image forming lens and an air space between the front side lens group and the rear side lens group being equal to or greater than 50% of the entire length of the image forming lens; and a supporting device configured to support each lens of the front side lens group and the rear side lens group and to integrate the front side lens group and the rear side lens group with each other.

11. The image forming lens unit according to claim 10, wherein an incident side surface of the rear side lens group is non-spherical.

12. The image forming lens unit according to claim 10, wherein an imaging side surface of the rear side lens group is non-spherical.

13. The image forming lens unit according to claim 10, wherein the rear side lens group is plastic.

14. The image forming lens unit according to claim 10, wherein the back-focus of the image forming lens in the actual usage state thereof is equal to or smaller than 10% of the entire length of the image forming lens.

15. The image forming lens unit according to claim 10, wherein the supporting device includes a front side lens group supporting part for supporting each lens of the front side group lens and a rear side lens group mounting part for mounting the rear side lens group thereto, and the front side lens group supporting part and the rear side lens group mounting part are formed integrally with the supporting device.

16. The image forming lens unit according to claim 10, wherein the supporting device includes a front side lens group supporting device configured to support the front side lens group, a rear side lens group supporting device configured to support the rear side lens group, and a connecting device configured to connect the front side lens group supporting device and the rear side lens group supporting device with each other so as to be integrated with each other.

17. The image forming lens unit according to claim 16, wherein the front side lens group supporting device is movable relative to the rear side lens group supporting device in an optical axis direction of the image forming lens.

18. The image forming lens unit according to claim 16, wherein the front side lens group supporting device is rotatable relative to the rear side lens group supporting device around an optical axis of the image forming lens.

19. The image forming lens unit according to claim 18, wherein the front side lens group supporting device is movable relative to the rear side lens group supporting device in an optical axis direction of the image forming lens.

20. The image forming lens unit according to claim 10, wherein the image forming lens includes a folding mirror configured to bend an optical path of the image forming lens, between the front side lens group and the rear side lens group.

21. The image forming lens unit according to claim 10, wherein the rear side lens group includes at least one anamorphic surface.

22. An image forming lens unit, comprising:

an image forming lens for forming an image of an original document, the image forming lens including a front side lens group having 2 to 4 pieces of lenses and arranged at an object side, said 2 to 4 pieces of lenses including at least one positive lens, and a rear side lens group constituted of one negative lens and arranged at an image forming side, an outer shape of the rear side lens group having a rotational asymmetry with respect to an optical axis of the image forming lens, a back-focus of the image forming lens in an actual usage state thereof being equal to or smaller than 25% of an entire length of the image forming lens and an air space between the front side lens group and the rear side lens group being equal to or greater than 50% of the entire length of the image forming lens; and a supporting device configured to support each lens of the front side lens group and the rear side lens group and to integrate the front side lens group and the rear side lens group with each other.

23. The image forming lens unit according to claim 22, wherein the outer shape of the rear side lens group is in a strip-like form long in a main scanning direction.

24. The image forming lens unit according to claim 22, wherein the rear side lens group is plastic and includes an engaging part for positioning, supporting or fixing the image forming lens.

25. An image forming lens unit, comprising:

an image forming lens for forming an image of an original document, the image forming lens including a front side lens group having 2 to 4 pieces of lenses and arranged at an object side, said 2 to 4 pieces of lenses including at least one positive lens, and a rear side lens group constituted of one negative lens and arranged at an image forming side, a shading device, which is configured to correct brightness of an image at an image surface of the image forming lens with respect to a main scanning direction, between the front side lens group and the rear side lens group, a back-focus of the image forming lens in an actual usage state thereof being equal to or smaller than 25% of an entire length of the image forming lens and an air space between the front side lens group and the rear side lens group being equal to or greater than 50% of the entire length of the image forming lens; and a supporting device configured to support each lens of the front side lens group and the rear side lens group and to integrate the front side lens group and the rear side lens group with each other.

26. The image forming lens unit according to claim 25, wherein the shading device includes a shielding plate having an opening having a predetermined shape.

27. An image forming lens unit, comprising:

an image forming lens for forming an image of an original document, the image forming lens including a front side lens group having 2 to 4 pieces of lenses and arranged at an object side, said 2 to 4 pieces of lenses including at least one positive lens, a rear side lens group constituted of one negative lens and arranged at an image forming side, a folding mirror configured to bend an optical path of the image forming lens between the front side lens group and the rear side lens group, the folding mirror having a reflecting surface of a predetermined shape and is configured to function as a shielding device to correct brightness of an image at an image surface of the image forming lens with respect to a main scanning direction, a back-focus of the image forming lens in an actual usage state thereof being equal to or smaller than 25% of an entire length of the image forming lens and an air space between the front side lens group and the rear side lens group being equal to or greater than 50% of the entire length of the image forming lens; and a supporting device configured to support each lens of the front side lens group and the rear side lens group and to integrate the front side lens group and the rear side lens group with each other.

28. An original document reading module for forming an image of an original document and converting image information of the image into electrical signals, comprising:

an image forming lens configured to form the image of the original document, the image forming lens including a front side lens group having 2 to 4 pieces of lenses and arranged at an object side, said 2 to 4 pieces of lenses including at least one positive lens, and a rear side lens group constituted of one negative lens and arranged at an image forming side, a back-focus of the image forming lens in an actual usage state thereof being equal to or smaller than 25% of an entire length of the image forming lens, and an air space between the front side lens group and the rear side lens group being equal to or greater than 50% of the entire length of the image forming lens; and a light receiving element array configured to photo-electrically convert image information of the image of the original document formed thereupon by the image forming lens into the electrical signals.

29. The original document reading module according to claim 28, wherein an incident side surface of the rear side lens group is non-spherical.

30. The original document reading module according to claim 28, wherein an imaging side surface of the rear side lens group is non-spherical.

31. The original document reading module according to claim 28, wherein the rear side lens group is plastic.

32. The original document reading module according to claim 28, wherein the back-focus of the image forming lens in the actual usage state thereof is equal to or smaller than 10% of the entire length of the image forming lens.

33. The original document reading module according to claim 28, wherein the image forming lens includes a supporting device configured to support each lens of the front side lens group and the rear side lens group and to integrate the front side lens group and the rear side lens group with each other.

34. The original document reading module according to claim 33, wherein the supporting device includes a front side lens group supporting part for supporting each lens of the front side group lens and a rear side lens group mounting part for mounting the rear side lens group thereto, and the front side lens group supporting part and the rear side lens group mounting part are formed integrally with the supporting device.

35. The original document reading module according to claim 33, wherein the supporting device includes a front side lens group supporting device configured to support the front side lens group, a rear side lens group supporting device configured to support the rear side lens group, and a connecting device configured to connect the front side lens group supporting device and the rear side lens group supporting device with each other so as to be integrated with each other.

36. The original document reading module according to claim 35, wherein the front side lens group supporting device is movable relative to the rear side lens group supporting device in an optical axis direction of the image forming lens.

37. The original document reading module according to claim 28, wherein the image forming lens includes a folding mirror configured to bend an optical path of the image forming lens, between the front side lens group and the rear side lens group.

38. The original document reading module according to claim 37, wherein the folding mirror has a reflecting surface of a predetermined shape and is configured to function as a shielding device to correct brightness of an image at an image surface of the image forming lens with respect to a main scanning direction.

39. The original document reading module according to claim 28, wherein the rear side lens group includes at least one anamorphic surface.

40. An original document reading module for forming an image of an original document and converting image information of the image into electrical signals, comprising:

an image forming lens configured to form the image of the original document, the image forming lens including a front side lens group having 2 to 4 pieces of lenses and arranged at an object side, said 2 to 4 pieces of lenses including at least one positive lens, and a rear side lens group constituted of one negative lens and arranged at an image forming side, the rear side lens group having a rotational asymmetry with respect to an optical axis of the image forming lens, a back-focus of the image forming lens in an actual usage state thereof being equal to or smaller than 25% of an entire length of the image forming lens, and an air space between the front side lens group and the rear side lens group being equal to or greater than 50% of the entire length of the image forming lens; and a light receiving element array configured to photo-electrically convert image information of the image of the original document formed thereupon by the image forming lens into the electrical signals.

41. The original document reading module according to claim 40, wherein the outer shape of the rear side lens group is in a strip-like form long in a main scanning direction.

42. The original document reading module according to claim 40, wherein the rear side lens group is plastic and includes an engaging part for positioning, supporting or fixing the image forming lens.

43. An original document reading module for forming an image of an original document and converting image information of the image into electrical signals, comprising:

an image forming lens configured to form the image of the original document, the image forming lens including a front side lens group having 2 to 4 pieces of lenses and arranged at an object side, said 2 to 4 pieces of lenses including at least one positive lens, and a rear side lens group constituted of one negative lens and arranged at an image forming side, the rear side lens group and the light receiving element array being integrated with each other, a back-focus of the image forming lens in an actual usage state thereof being equal to or smaller than 25% of an entire length of the image forming lens, and an air space between the front side lens group and the rear side lens group being equal to or greater than 50% of the entire length of the image forming lens; and a light receiving element array configured to photo-electrically convert image information of the image of the original document formed thereupon by the image forming lens into the electrical signals.

44. The original document reading module of according to claim 43, wherein the back-focus of the image forming lens in the actual usage state thereof is relatively small such that an imaging side surface of the rear side lens group functions as a shielding member of a package of the light receiving element array.

45. The original document reading module according to claim 43, wherein the back-focus of the image forming lens in the actual usage state thereof is substantially zero, and wherein the light receiving element array is directly pasted to an imaging side surface of the rear side lens group.

46. The original document reading module according to claim 45, wherein the imaging side surface of the rear side lens group is non-spherical.

47. An original document reading module for forming an image of an original document and converting image information of the image into electrical signals, comprising:

an image forming lens configured to form the image of the original document, the image forming lens including a front side lens group having 2 to 4 pieces of lenses and arranged at an object side, said 2 to 4 pieces of lenses including at least one positive lens, a rear side lens group constituted of one negative lens and arranged at an image forming side, and a supporting device configured to support each lens of the front side lens group and the rear side lens group and to integrate the front side lens group and the rear side lens group with each other, the supporting device including a front side lens group supporting device configured to support the front side lens group, the front side lens group supporting device being rotatable relative to the rear side lens group supporting device around an optical axis of the image forming lens, a rear side lens group supporting device configured to support the rear side lens group, and a connecting device configured to connect the front side lens group supporting device and the rear side lens group supporting device with each other so as to be integrated with each other, a back-focus of the image forming lens in an actual usage state thereof being equal to or smaller than 25% of an entire length of the image forming lens, and an air space between the front side lens group and the rear side lens group being equal to or greater than 50% of the entire length of the image forming lens; and a light receiving element array configured to photo-electrically convert image information of the image of the original document formed thereupon by the image forming lens into the electrical signals.

48. The original document reading module according to claim 47, wherein the front side lens group supporting device is movable relative to the rear side lens group supporting device in an optical axis direction of the image forming lens.

49. An original document reading module for forming an image of an original document and converting image information of the image into electrical signals, comprising:

an image forming lens configured to form the image of the original document, the image forming lens including a front side lens group having 2 to 4 pieces of lenses and arranged at an object side, said 2 to 4 pieces of lenses including at least one positive lens, a rear side lens group constituted of one negative lens and arranged at an image forming side, and a shading device, which is configured to correct brightness of an image at an image surface of the image forming lens with respect to a main scanning direction, between the front side lens group and the rear side lens group, a back-focus of the image forming lens in an actual usage state thereof being equal to or smaller than 25% of an entire length of the image forming lens, and an air space between the front side lens group and the rear side lens group being equal to or greater than 50% of the entire length of the image forming lens; and a light receiving element array configured to photo-electrically convert image information of the image of the original document formed thereupon by the image forming lens into the electrical signals.

50. The original document reading module according to claim 49, wherein the shading device includes a shielding plate having an opening having a predetermined shape.

51. An original document reading apparatus, comprising:

a scanning device configured to scan an original document;

a light receiving element array configured to photo-electrically convert image information of an image formed thereupon into electrical signals;

an image forming lens configured to image a light flux from the original document being scanned by the scanning device so as to form an image of the original document on the light receiving element array, the image forming lens including a front side lens group having 2 to 4 pieces of lenses and arranged at an object side, said 2 to 4 pieces of lenses including at least one positive lens, and a rear side lens group constituted of one negative lens and arranged at an image forming side, a back-focus of the image forming lens in an actual usage state thereof being equal to or smaller than 25% of an entire length of the image forming lens and an air space between the front side lens group and the rear side lens group being equal to or greater than 50% of the entire length of the image forming lens;

a signal processing device configured to process the electrical signals of the light receiving element array; and an image processing device configured to apply image processing to the electrical signals processed by the signal processing device.

52. The original document reading apparatus according to claim 51, wherein an incident side surface of the rear side lens group of the image forming lens is non-spherical.

53. The original document reading apparatus according to claim 51, wherein an imaging side surface of the rear side lens group of the image forming lens is non-spherical.

54. The original document reading apparatus according to claim 51, wherein the rear side lens group of the image forming lens is plastic.

55. The original document reading apparatus according to claim 51, wherein the back-focus of the image forming lens in the actual usage state thereof is equal to or smaller than 10% of the entire length of the image forming lens.

56. The original document reading apparatus according to claim 51, wherein the image forming lens includes a supporting device configured to support each lens of the front side lens group and the rear side lens group and to integrate the front side lens group and the rear side lens group with each other, and wherein the image forming lens and the supporting device are integrated with each other so as to form an image forming lens unit.

57. The original document reading apparatus according to claim 56, wherein the supporting device includes a front side lens group supporting part for supporting each lens of the front side lens group and a rear side lens group mounting part for mounting the rear side lens group thereto, and the front side lens group supporting part and the rear side lens group mounting part are formed integrally with the supporting device.

58. The original document reading apparatus according to claim 56, wherein the supporting device includes a front side lens group supporting device configured to support the front side lens group, a rear side lens group supporting device configured to support the rear side lens group, and a connecting device configured to connect the front side lens group supporting device and the rear side lens group supporting device with each other so as to be integrated with each other.

59. The original document reading apparatus according to claim 58, wherein the front side lens group supporting device is movable relative to the rear side lens group supporting device in an optical axis direction of the image forming lens.

60. The original document reading apparatus according to claim 51, wherein the image forming lens includes a folding mirror configured to bend an optical path of the image forming lens, between the front side lens group and the rear side lens group.

61. The original document reading apparatus according to claim 51, wherein the scanning device includes an original document contact glass provided at a predetermined position, a conveying device configured to convey the original document contacting the contact glass over the contact glass, and an illuminating device configured to illuminate the original document being conveyed over the contact glass across a main scanning direction of the original document.

62. The original document reading apparatus according to claim 51, wherein the scanning device includes an original document glass on which the original document is flatly placed at a predetermined position, an illuminating device configured to illuminate the original document placed at the predetermined position on the contact glass across a main scanning direction of the original document, a series of mirrors for guiding a light flux from a part of the original document illuminated by the illuminating device to the image forming lens through an optical path from the illuminated part of the original document to the image forming lens, and a moving device configured to move the illuminating device in a sub-scanning direction and to move the series of mirrors so as to maintain the optical path from the illuminated part of the original document to the image forming lens at a constant length.

63. The original document reading apparatus according to claim 51, wherein the signal processing device processes the electrical signals of the light receiving element array such that a size of the image of the original document formed by the image forming lens on the light receiving element array is electrically adjusted.

64. The original document reading apparatus according to claim 51, wherein the image processing device processes the electrical signals of the light receiving element array such that a size of the image of the original document formed by the image forming lens on the light receiving element array is electrically adjusted.

65. The original document reading apparatus according to claim 51, wherein the signal processing device and the image processing device process the electrical signals of the light receiving element array such that a size of the image of the original document formed by the image forming lens on the light receiving element array is electrically adjusted.

66. The original document reading apparatus according to claim 51, wherein the rear side lens group includes at least one anamorphic surface.

67. An original document reading apparatus, comprising:
a scanning device configured to scan an original document;
a light receiving element array configured to photo-electrically convert image information of an image formed thereupon into electrical signals;
an image forming lens configured to image a light flux from the original document being scanned by the scanning device so as to form an image of the original document on the light receiving element array, the image forming lens including a front side lens group having 2 to 4 pieces of lenses and arranged at an object side, said 2 to 4 pieces of lenses including at least one positive lens, and a rear side lens group constituted of one negative lens and arranged at an image forming side, an outer shape of the rear side lens group of the image forming lens having a rotational asymmetry with respect to an optical axis of the image forming lens, a back-focus of the image forming lens in an actual usage state thereof being equal to or smaller than 25% of an entire length of the image forming lens and an air space between the front side lens group and the rear side lens group being equal to or greater than 50% of the entire length of the image forming lens;
a signal processing device configured to process the electrical signals of the light receiving element array; and
an image processing device configured to apply image processing to the electrical signals processed by the signal processing device.

68. The original document reading apparatus according to claim 67, wherein the outer shape of the rear side lens group of the image forming lens is in a strip-like form long in a main scanning direction.

69. The original document reading apparatus according to claim 67, wherein the rear side lens group of the image forming lens is plastic and includes an engaging part for positioning, supporting or fixing the image forming lens.

70. An original document reading apparatus, comprising:
a scanning device configured to scan an original document;
a light receiving element array configured to photo-electrically convert image information of an image formed thereupon into electrical signals;
an image forming lens unit, the image forming lens unit comprising an image forming lens configured to image a light flux from the original document being scanned by the scanning device so as to form an image of the original document on the light receiving element array, the image forming lens including a front side lens group having 2 to 4 pieces of lenses and arranged at an object side, said 2 to 4 pieces of lenses including at least one positive lens, and a rear side lens group constituted of one negative lens and arranged at an image forming side, a back-focus of the image forming lens in an actual usage state thereof being equal to or smaller than 25% of an entire length of the image forming lens and an air space between the front side lens group and the rear side lens group being equal to or greater than 50% of the entire length of the image forming lens, and
a supporting device including a front side lens group supporting device configured to support the front side lens group, a rear side lens group supporting device configured to support the rear side lens group, and a connecting device configured to connect the front side lens group supporting device and the rear side lens group supporting device with each other so as to be integrated with each other, the front side lens group supporting device being rotatable relative to the rear side lens group supporting device around an optical axis of the image forming lens;
a signal processing device configured to process the electrical signals of the light receiving element array; and
an image processing device configured to apply image processing to the electrical signals processed by the signal processing device.

71. The original document reading apparatus according to claim 70, wherein the front side lens group supporting device is movable relative to the rear side lens group supporting device in an optical axis direction of the image forming lens.

72. An original document reading apparatus, comprising:
a scanning device configured to scan an original document;
a light receiving element array configured to photoelectrically convert image information of an image formed thereupon into electrical signals;
an image forming lens configured to image a light flux from the original document being scanned by the scanning device so as to form an image of the original document on the light receiving element array, the image forming lens including a front side lens group having 2 to 4 pieces of lenses and arranged at an object side, said 2 to 4 pieces of lenses including at least one positive lens, a rear side lens group constituted of one negative lens and arranged at an image forming side, and a shading device, which is configured to correct brightness of an image at an image surface of the image forming lens with respect to a main scanning direction, between the front side lens group and the rear side lens group, a back-focus of the image forming lens in an actual usage state thereof being equal to or smaller than 25% of an entire length of the image forming lens and an air space between the front side lens group and the rear side lens group being equal to or greater than 50% of the entire length of the image forming lens;
a signal processing device configured to process the electrical signals of the light receiving element array; and
an image processing device configured to apply image processing to the electrical signals processed by the signal processing device.

73. The original document reading apparatus according to claim 72, wherein the shading device includes a shielding plate having an opening having a predetermined shape.

74. An original document reading apparatus, comprising:
a scanning device configured to scan an original document;
a light receiving element array configured to photoelectrically convert image information of an image formed thereupon into electrical signals;
an image forming lens configured to image a light flux from the original document being scanned by the scanning device so as to form an image of the original document on the light receiving element array, the image forming lens including a front side lens group having 2 to 4 pieces of lenses and arranged at an object side, said 2 to 4 pieces of lenses including at least one positive lens, a rear side lens group constituted of one negative lens and arranged at an image forming side, and a folding mirror configured to bend an optical path of the image forming lens, between the front side lens group and the rear side lens group, the folding mirror having a reflecting surface of a predetermined shape and configured to function as a shielding device to correct brightness of an image at an image surface of the image forming lens with respect to a main scanning direction, a back-focus of the image forming lens in an actual usage state thereof being equal to or smaller than 25% of an entire length of the image forming lens and an air space between the front side lens group and the rear side lens group being equal to or greater than 50% of the entire length of the image forming lens;
a signal processing device configured to process the electrical signals of the light receiving element array; and
an image processing device configured to apply image processing to the electrical signals processed by the signal processing device.

75. An original document reading apparatus, comprising:
a scanning device configured to scan an original document;
a light receiving element array configured to photoelectrically convert image information of an image formed thereupon into electrical signals;
an image forming lens configured to image a light flux from the original document being scanned by the scanning device so as to form an image of the original document on the light receiving element array, the image forming lens including a front side lens group having 2 to 4 pieces of lenses and arranged at an object side, said 2 to 4 pieces of lenses including at least one positive lens, and a rear side lens group constituted of one negative lens and arranged at an image forming side, a back-focus of the image forming lens in an actual usage state thereof being equal to or smaller than 25% of an entire length of the image forming lens and an air space between the front side lens group and the rear side lens group being equal to or greater than 50% of the entire length of the image forming lens,
the image forming lens and the light receiving element array being integrated with each other so as to form an original document reading module;
a signal processing device configured to process the electrical signals of the light receiving element array; and
an image processing device configured to apply image processing to the electrical signals processed by the signal processing device.

76. The original document reading apparatus according to claim 75, wherein the rear side lens group and the light receiving element array are integrated with each other.

77. The original document reading apparatus according to claim 75, wherein the back-focus of the image forming lens in the actual usage state thereof is relatively small such that an imaging side surface of the rear side lens group functions as a shielding member of a package of the light receiving element array.

78. The original document reading apparatus according to claim 75, wherein the back-focus of the image forming lens in the actual usage state thereof is substantially zero, and
wherein the light receiving element array is directly pasted to an imaging side surface of the rear side lens group.

79. The original document reading apparatus according to claim 78, wherein the imaging side surface of the rear side lens group is non-spherical.

80. The original document reading apparatus according to claim 75, wherein the image forming lens includes a supporting device configured to support each lens of the front side lens group and the rear side lens group and to integrate the front side lens group and the rear side lens group with each other.

81. The original document reading apparatus according to claim 80, wherein the supporting device includes a front side lens group supporting part for supporting each lens of the front side lens group and a rear side lens group mounting part for mounting the rear side lens group thereto, and the front side lens group supporting part and the rear side lens group mounting part are formed integrally with the supporting device.

82. The original document reading apparatus according to claim 80, wherein the supporting device includes a front side lens group supporting device configured to support the front side lens group, a rear side lens group supporting device configured to support the rear side lens group, and a connecting device configured to connect the front side lens group supporting device and the rear side lens group supporting device with each other so as to be integrated with each other.

83. The original document reading apparatus according to claim 82, wherein the front side lens group supporting device is movable relative to the rear side lens group supporting device in an optical axis direction of the image forming lens.

84. The original document reading apparatus according to claim 82, wherein the front side lens group supporting device is rotatable relative to the rear side lens group supporting device around an optical axis of the image forming lens.

85. The original document reading apparatus according to claim 84, wherein the front side lens group supporting device is movable relative to the rear side lens group supporting device in an optical axis direction of the image forming lens.

86. The original document reading apparatus according to claim 75, wherein the image forming lens includes a folding mirror configured to bend an optical path of the image forming lens, between the front side lens group and the rear side lens group.

87. The original document reading apparatus according to claim 86, wherein the folding mirror has a reflecting surface of a predetermined shape and is configured to function as a shielding device to correct brightness of an image at an image surface of the image forming lens with respect to a main scanning direction.

88. The original document reading apparatus according to claim 75, wherein the image forming lens includes a shading device, which is configured to correct brightness of an image at an image surface of the image forming lens with respect to a main scanning direction, between the front side lens group and the rear side lens group.

89. The original document reading apparatus according to claim 88, wherein the shading device includes a shielding plate having an opening having a predetermined shape.

90. An image information processing apparatus, comprising:
   an original document reading device for forming an image of an original document and converting image information of the image into electrical signals, the original document reading device including;
   a scanning device configured to scan the original document,
   a light receiving element array configured to photo-electrically convert image information of an image formed thereupon into electrical signals;
   an image forming lens configured to image a light flux from the original document being scanned by the scanning device so as to form the image of the original document on the light receiving element array, the image forming lens including a front side lens group having 2 to 4 pieces of lenses and arranged at an object side, said 2 to 4 pieces of lenses including at least one positive lens, and a rear side lens group constituted of one negative lens and arranged at an image forming side, a back-focus of the image forming lens in an actual usage state thereof being equal to or smaller than 25% of an entire length of the image forming lens, and an air space between the front side lens group and the rear side lens group being equal to or greater than 50% of the entire length of the image forming lens,
   a signal processing device configured to process an output signal of the light receiving element array, and
   an image processing device configured to apply image processing to the signal processed by the signal processing device; and
   an outputting device configured to output the electrical signals of the original document reading device.

91. The image information processing apparatus according to claim 90, wherein an incident side surface of the rear side lens group of the image forming lens is non-spherical.

92. The image information processing apparatus according to claim 90, wherein an imaging side surface of the rear side lens group of the image forming lens is non-spherical.

93. The image information processing apparatus according to claim 90, wherein the rear side lens group of the image forming lens is plastic.

94. The image information processing apparatus according to claim 90, wherein the back-focus of the image forming lens in the actual usage state thereof is equal to or smaller than 10% of the entire length of the image forming lens.

95. The image information processing apparatus according to claim 90, wherein the image forming lens includes a supporting device configured to support each lens of the front side lens group and the rear side lens group and to integrate the front side lens group and the rear side lens group with each other, and
   wherein the image forming lens and the supporting device are integrated with each other so as to form an image forming lens unit.

96. The image information processing apparatus according to claim 95, wherein the supporting device includes a front side lens group supporting part for supporting each lens of the front side lens group and a rear side lens group mounting part for mounting the rear side lens group thereto, and the front side lens group supporting part and the rear side lens group mounting part are formed integrally with the supporting device.

97. The image information processing apparatus according to claim 95, wherein the supporting device includes a front side lens group supporting device configured to support the front side lens group, a rear side lens group supporting device configured to support the rear side lens group, and a connecting device configured to connect the front side lens group supporting device and the rear side lens group supporting device with each other so as to be integrated with each other.

98. The image information processing apparatus according to claim 97, wherein the front side lens group supporting device is movable relative to the rear side lens group supporting device in an optical axis direction of the image forming lens.

99. The image information processing apparatus according to claim 90, wherein the image forming lens includes a folding mirror configured to bend an optical path of the image forming lens, between the front side lens group and the rear side lens group.

100. The image information processing apparatus according to claim 90, wherein the image forming lens includes a supporting device configured to support each lens of the front side lens group and the rear side lens group and to integrate the front side lens group and the rear side lens group with each other.

101. The image information processing apparatus according to claim 100, wherein the supporting device includes a front side lens group supporting part for supporting each lens of the front side lens group and a rear side lens group mounting part for mounting the rear side lens group thereto, and the front side lens group supporting part and the rear side lens group mounting part are formed integrally with the supporting device.

102. The image information processing apparatus according to claim 100, wherein the supporting device includes a front side lens group supporting device configured to support the front side lens group, a rear side lens group supporting device configured to support the rear side lens group, and a connecting device configured to connect the front side lens group supporting device and the rear side lens group supporting device with each other so as to be integrated with each other.

103. The image information processing apparatus according to claim 102, wherein the front side lens group supporting device is movable relative to the rear side lens group supporting device in an optical axis direction of the image forming lens.

104. The image information processing apparatus according to claim 90, wherein the image forming lens includes a folding mirror configured to bend an optical path of the image forming lens, between the front side lens group and the rear side lens group.

105. The image information processing apparatus according to claim 104, wherein the folding mirror has a reflecting surface of a predetermined shape and is configured to function as a shielding device to correct brightness of an image at an image surface of the image forming lens with respect to a main scanning direction.

106. The image information processing apparatus according to claim 90, wherein the scanning device includes an original document contact glass provided at a predetermined position, a conveying device configured to convey the original document contacting the contact glass over the contact glass, and an illuminating device configured to illuminate the original document being conveyed over the contact glass across a main scanning direction of the original document.

107. The image information processing apparatus according to claim 90, wherein the scanning device includes an original document contact glass on which the original document is flatly placed at a predetermined position, an illuminating device configured to illuminate the original document placed at the predetermined position on the contact glass across a main scanning direction of the original document, a series of mirrors for guiding a light flux from a part of the original document illuminated by the illuminating device to the image forming lens through an optical path from the illuminated part of the original document to the image forming lens, and a moving device configured to move the illuminating device in a sub-scanning direction and to move the series of mirrors so as to maintain the optical path from the illuminated part of the original document to the image forming lens at a constant length.

108. The image information processing apparatus according to claim 90, wherein the signal processing device processes the electrical signals of the light receiving element array such that a size of the image of the original document formed by the image forming lens on the light receiving element array is electrically adjusted.

109. The image information processing apparatus according to claim 90, wherein the image processing device processes the electrical signals of the light receiving element array such that a size of the image of the original document formed by the image forming lens on the light receiving element array is electrically adjusted.

110. The image information processing apparatus according to claim 90, wherein the signal processing device and the image processing device process the electrical signals of the light receiving element array such that a size of the image of the original document formed by the image forming lens on the light receiving element array is electrically adjusted.

111. The image information processing apparatus according to claim 90, wherein the outputting device includes a display device to display the image information.

112. The image information processing apparatus according to claim 90, wherein the outputting device includes a writing device to write the image information onto an electrical recording medium.

113. The image information processing apparatus according to claim 90, wherein the outputting device includes a transmitting device to transmit the image information.

114. The image information processing apparatus according to claims 90, wherein the outputting device includes a printer configured to print the image information on a recording medium formed in a sheet.

115. The image information processing apparatus according to claim 90, wherein the rear side lens group includes at least one anamorphic surface.

116. An image information processing apparatus, comprising:
an original document reading device for forming an image of an original document and converting image information of the image into electrical signals, the original document reading device including;
a scanning device configured to scan the original document,
a light receiving element array configured to photoelectrically convert image information of an image formed thereupon into electrical signals;
an image forming lens configured to image a light flux from the original document being scanned by the scanning device so as to form the image of the original document on the light receiving element array, the image forming lens including a front side lens group having 2 to 4 pieces of lenses and arranged at an object side, said 2 to 4 pieces of lenses including at least one positive lens, and a rear side lens group constituted of one negative lens and arranged at an image forming side, an outer shape of the rear side lens group of the image forming lens having a rotational asymmetry with respect to an optical axis of the image forming lens, a back-focus of the image forming lens in an actual usage state thereof being equal to or smaller than 25% of an entire length of the image forming lens, and an air space between the front side lens group and the rear side lens group being equal to or greater than 50% of the entire length of the image forming lens,
a signal processing device configured to process an output signal of the light receiving element array, and
an image processing device configured to apply image processing to the signal processed by the signal processing device; and
an outputting device configured to output the electrical signals of the original document reading device.

117. The image information processing apparatus according to claim 116, wherein the outer shape of the rear side lens group of the image forming lens is in a strip-like form long in a main scanning direction.

118. The image information processing apparatus according to claim 116, wherein the rear side lens group of the image forming lens is plastic and includes an engaging part for positioning, supporting or fixing the image forming lens.

119. An image information processing apparatus, comprising:

an original document reading device for forming an image of an original document and converting image information of the image into electrical signals, the original document reading device including;

a scanning device configured to scan the original document, a light receiving element array configured to photoelectrically convert image information of an image formed thereupon into electrical signals;

an image forming lens unit comprising an image forming lens configured to image a light flux from the original document being scanned by the scanning device so as to form the image of the original document on the light receiving element array, the image forming lens including a front side lens group having 2 to 4 pieces of lenses and arranged at an object side, said 2 to 4 pieces of lenses including at least one positive lens, a rear side lens group constituted of one negative lens and arranged at an image forming side, and a supporting device including a front side lens group supporting device configured to support the front side lens group, a rear side lens group supporting device configured to support the rear side lens group, and a connecting device configured to connect the front side lens group supporting device, the front side lens group supporting device being rotatable relative to the rear side lens group supporting device around an optical axis of the image forming lens, and the rear side lens group supporting device with each other so as to be integrated with each other, a back-focus of the image forming lens in an actual usage state thereof being equal to or smaller than 25% of an entire length of the image forming lens, and an air space between the front side lens group and the rear side lens group being equal to or greater than 50% of the entire length of the image forming lens, a signal processing device configured to process an output signal of the light receiving element array, and an image processing device configured to apply image processing to the signal processed by the signal processing device; and an outputting device configured to output the electrical signals of the original document reading device.

120. The image information processing apparatus according to claim 119, wherein the front side lens group supporting device is movable relative to the rear side lens group supporting device in an optical axis direction of the image forming lens.

121. An image information processing apparatus, comprising:

an original document reading device for forming an image of an original document and converting image information of the image into electrical signals, the original document reading device including;

a scanning device configured to scan the original document, a light receiving element array configured to photoelectrically convert image information of an image formed thereupon into electrical signals;

an image forming lens configured to image a light flux from the original document being scanned by the scanning device so as to form the image of the original document on the light receiving element array, the image forming lens including a front side lens group having 2 to 4 pieces of lenses and arranged at an object side, said 2 to 4 pieces of lenses including at least one positive lens, a rear side lens group constituted of one negative lens and arranged at an image forming side, and a shading device, which is configured to correct brightness of an image at an image surface of the image forming lens with respect to a main scanning direction, between the front side lens group and the rear side lens group, a back-focus of the image forming lens in an actual usage state thereof being equal to or smaller than 25% of an entire length of the image forming lens, and an air space between the front side lens group and the rear side lens group being equal to or greater than 50% of the entire length of the image forming lens, a signal processing device configured to process an output signal of the light receiving element array, and an image processing device configured to apply image processing to the signal processed by the signal processing device; and an outputting device configured to output the electrical signals of the original document reading device.

122. The image information processing apparatus according to claim 121, wherein the shading device includes a shielding plate having an opening having a predetermined shape.

123. An image information processing apparatus, comprising:

an original document reading device for forming an image of an original document and converting image information of the image into electrical signals, the original document reading device including;

a scanning device configured to scan the original document, a light receiving element array configured to photoelectrically convert image information of an image formed thereupon into electrical signals;

an image forming lens configured to image a light flux from the original document being scanned by the scanning device so as to form the image of the original document on the light receiving element array, the image forming lens including a front side lens group having 2 to 4 pieces of lenses and arranged at an object side, said 2 to 4 pieces of lenses including at least one positive lens, a rear side lens group constituted of one negative lens and arranged at an image forming side, and a folding mirror configured to bend an optical path of the image forming lens, between the front side lens group and the rear side lens group, the folding mirror having a reflecting surface of a predetermined shape and is configured to function as a shielding device to correct brightness of an image at an image surface of the image forming lens with respect to a main scanning direction, a back-focus of the image forming lens in an actual usage state thereof being equal to or smaller than 25% of an entire length of the image forming lens, and an air space between the front side lens group and the rear side lens group being equal to or greater than 50% of the entire length of the image forming lens, a signal processing device configured to process an output signal of the light receiving element array, and an image processing device configured to apply image processing to the signal processed by the signal processing device; and an outputting device configured to output the electrical signals of the original document reading device.

124. An image information processing apparatus, comprising:
an original document reading device for forming an image of an original document and converting image information of the image into electrical signals, the original document reading device including;
a scanning device configured to scan the original document,
a light receiving element array configured to photoelectrically convert image information of an image formed thereupon into electrical signals;
an image forming lens configured to image a light flux from the original document being scanned by the scanning device so as to form the image of the original document on the light receiving element array, the image forming lens including a front side lens group having 2 to 4 pieces of lenses and arranged at an object side, said 2 to 4 pieces of lenses including at least one positive lens, and a rear side lens group constituted of one negative lens and arranged at an image forming side, a back-focus of the image forming lens in an actual usage state thereof being equal to or smaller than 25% of an entire length of the image forming lens, and an air space between the front side lens group and the rear side lens group being equal to or greater than 50% of the entire length of the image forming lens,
the image forming lens and the light receiving element array being integrated with each other so as to form an original document reading module,
a signal processing device configured to process an output signal of the light receiving element array, and
an image processing device configured to apply image processing to the signal processed by the signal processing device; and
an outputting device configured to output the electrical signals of the original document reading device.

125. The image information processing apparatus according to claim 124, wherein the rear side lens group and the light receiving element array are integrated with each other.

126. The image information processing apparatus according to claim 125, wherein the back-focus of the image forming lens in the actual usage state thereof is relatively small such that an imaging side surface of the rear side lens group functions as a shielding member of a package of the light receiving element array.

127. The image information processing apparatus according to claim 125, wherein the back-focus of the image forming lens in the actual usage state thereof is substantially zero, and wherein the light receiving element array is directly pasted to an imaging side surface of the rear side lens group.

128. The image information processing apparatus according to claim 127, wherein the imaging side surface of the rear side lens group is non-spherical.

129. An image information processing apparatus, comprising:
an original document reading device for forming an image of an original document and converting image information of the image into electrical signals, the original document reading device including;
a scanning device configured to scan the original document,
a light receiving element array configured to photoelectrically convert image information of an image formed thereupon into electrical signals;
an image forming lens configured to image a light flux from the original document being scanned by the scanning device so as to form the image of the original document on the light receiving element array, the image forming lens including a front side lens group having 2 to 4 pieces of lenses and arranged at an object side, said 2 to 4 pieces of lenses including at least one positive lens, a rear side lens group constituted of one negative lens and arranged at an image forming side, and a supporting device including a front side lens group supporting device configured to support the front side lens group, the front side lens group supporting device being rotatable relative to the rear side lens group supporting device around an optical axis of the image forming lens, a rear side lens group supporting device configured to support the rear side lens group, and a connecting device configured to connect the front side lens group supporting device and the rear side lens group supporting device with each other so as to be integrated with each other, a back-focus of the image forming lens in an actual usage state thereof being equal to or smaller than 25% of an entire length of the image forming lens, and an air space between the front side lens group and the rear side lens group being equal to or greater than 50% of the entire length of the image forming lens,
a signal processing device configured to process an output signal of the light receiving element array, and
an image processing device configured to apply image processing to the signal processed by the signal processing device; and
an outputting device configured to output the electrical signals of the original document reading device.

130. The image information processing apparatus according to claim 129, wherein the front side lens group supporting device is movable relative to the rear side lens group supporting device in an optical axis direction of the image forming lens.

131. An image information processing apparatus, comprising:
an original document reading device for forming an image of an original document and converting image information of the image into electrical signals, the original document reading device including;
a scanning device configured to scan the original document,
a light receiving element array configured to photoelectrically convert image information of an image formed thereupon into electrical signals;
an image forming lens configured to image a light flux from the original document being scanned by the scanning device so as to form the image of the original document on the light receiving element array, the image forming lens including a front side lens group having 2 to 4 pieces of lenses and arranged at an object side, said 2 to 4 pieces of lenses including at least one positive lens, a rear side lens group constituted of one negative lens and arranged at an image forming side, and a shading device, which is configured to correct brightness of an image at an image surface of the image forming lens with respect to a main scanning direction, between the front side lens group and the rear side lens group, a back-focus of the image forming lens in an actual usage state thereof being equal to or smaller than 25% of an entire length of the image forming lens, and an air space between the front side lens group and the rear side lens group being equal to or greater than 50% of the entire length of the image forming lens, a signal processing device configured to process an output signal of the light receiving element array, and an image processing device configured to apply image processing to the signal processed by the signal processing device; and an outputting device configured to output the electrical signals of the original document reading device.

132. The image information processing apparatus according to claim 131, wherein the shading device includes a shielding plate having an opening having a predetermined shape.

133. An image forming lens for forming an image of an original document, comprising:

a front side lens group having 2 or more lenses and arranged at an object side, said 2 or more lenses including at least one positive lens; and a rear side lens group constituted of one negative lens and arranged at an image forming side, wherein a back-focus of the image forming lens in an actual usage state thereof is equal to or smaller than 25% of an entire length of the image forming lens, and an air space between the front side lens group and the rear side lens group is equal to or greater than 50% of the entire length of the image forming lens, and wherein the rear side lens group includes at least one anamorphic surface.

134. The image forming lens according to claim 133, further comprising:

a front side lens group supporting device configured to support the front side lens group; and a rear side lens group supporting device configured to support the rear side lens group, wherein the front side lens group supporting device and the rear side lens group supporting device are separate.

135. The image forming lens according to claim 134, wherein the front side lens group supporting device has a rotational symmetry relative to an optical axis of the front side lens group so that inclination of an image surface of the image forming lens due to eccentricity thereof can be corrected by only rotating the front side lens group around the optical axis thereof.

136. The image forming lens according to claim 134, wherein focusing is made by moving only the front side lens group in an optical axis direction thereof.

137. An image forming lens for forming an image of an original document, comprising:

a front side lens group having 2 or more lenses and arranged at an object side, said 2 or more lenses including at least one positive lens; and a rear side lens group constituted of one negative lens and arranged at an image forming side, wherein a back-focus of the image forming lens in an actual usage state thereof is equal to or smaller than 25% of an entire length of the image forming lens, and an air space between the front side lens group and the rear side lens group is equal to or greater than 50% of the entire length of the image forming lens, and wherein the rear side lens group includes at least one anamorphic surface, and wherein a curved line, which is formed when the anamorphic lens surface of the rear side lens group crosses a flat plane including an optical axis of the rear side lens group, is formed in a non-arc shape.

138. An image forming lens for forming an image of an original document, comprising:

a front side lens group having 2 or more lenses and arranged at an object side, said 2 or more lenses including at least one positive lens; and a rear side lens group constituted of one negative lens and arranged at an image forming side, wherein an outer shape of the rear side lens group has a rotational asymmetry with respect to an optical axis of the image forming lens, wherein a back-focus of the image forming lens in an actual usage state thereof is equal to or smaller than 25% of an entire length of the image forming lens, and an air space between the front side lens group and the rear side lens group is equal to or greater than 50% of the entire length of the image forming lens, and wherein the rear side lens group includes at least one anamorphic surface.

139. An original document reading module for forming an image of an original document and converting image information of the image into electrical signals, comprising:

an image forming lens configured to form the image of the original document, the image forming lens including a front side lens group having 2 or more lenses and arranged at an object side, said 2 more lenses including at least one positive lens, and a rear side lens group constituted of one negative lens and arranged at an image forming side, a back-focus of the image forming lens in an actual usage state thereof being equal to or smaller than 25% of an entire length of the image forming lens, an air space between the front side lens group and the rear side lens group being equal to or greater than 50% of the entire length of the image forming lens, and the rear side lens group including at least one anamorphic surface; and a light receiving element array configured to photoelectrically convert the image information of the image of the original document formed thereupon by the image forming lens into the electrical signals.

140. An original document reading module for forming an image of an original document and converting image information of the image into electrical signals, comprising:

an image forming lens configured to form the image of the original document, the image forming lens including a front side lens group having 2 or more lenses and arranged at an object side, said 2 more lenses including at least one positive lens, and a rear side lens group constituted of one negative lens and arranged at an image forming side, a back-focus of the image forming lens in an actual usage state thereof being equal to or smaller than 25% of an entire length of the image forming lens, an air space between the front side lens group and the rear side lens group being equal to or greater than 50% of the entire length of the image forming lens, and the rear side lens group including at least one anamorphic surface; and a light receiving element array configured to photoelectrically convert the image information of the image of the original document formed thereupon by the image forming lens into the electrical signals, wherein the rear side lens group and the light receiving element array are integrated with each other.

141. The original document reading module according to claim 140, wherein the light receiving element array is included in a package, and wherein the rear side lens group directly shields the package of the light receiving element array.

142. The original document reading module according to claim 140, wherein the light receiving element array is directly pasted to a surface of the rear side lens group at the image forming side.

143. An original document reading apparatus for forming an image of an original document and converting image information of the image into electrical signals, comprising:

an image forming lens configured to form the image of the original document, the image forming lens including a front side lens group having 2 or more lenses and arranged at an object side, said 2 more lenses including at least one positive lens, and a rear side lens group constituted of one negative lens and arranged at an image forming side, a back-focus of the image forming lens in an actual usage state thereof being equal to or smaller than 25% of an entire length of the image forming lens, an air space between the front side lens group and the rear side lens group being equal to or greater than 50% of the entire length of the image forming lens, and the rear side lens group including at least one anamorphic surface;

a light receiving element array configured to photo-electrically convert the image information of the image of the original document formed thereupon by the image forming lens into the electrical signals;

an illumination device configured to illuminate the original document;

a scanning device configured to scan the original document;

a signal processing device configured to process the electrical signals obtained from the light receiving element array by scanning of the original document with the scanning device; and an image processing device configured to apply image processing to the signals processed by the signal processing device.

144. The original document reading apparatus according to claim 143, wherein the signal processing device processes the electrical signals of the light receiving element array such that a size of the image of the original document formed by the image forming lens on the light receiving element array is electrically adjusted.

145. The original document reading apparatus according to claim 143, wherein the image processing device processes the electrical signals of the light receiving element array such that a size of the image of the original document formed by the image forming lens on the light receiving element array is electrically adjusted.

146. The original document reading apparatus according to claim 143, wherein the signal processing device and the image processing device process the electrical signals of the light receiving element array such that a size of the image of the original document formed by the image forming lens on the light receiving element array is electrically adjusted.

147. An image forming apparatus, comprising:

an image forming lens configured to form an image of an original document, the image forming lens including a front side lens group having 2 or more lenses and arranged at an object side, said 2 or more lenses including at least one positive lens, and a rear side lens group constituted of one negative lens and arranged at an image forming side, a back-focus of the image forming lens in an actual usage state thereof being equal to or smaller than 25% of an entire length of the image forming lens, an air space between the front side lens group and the rear side lens group being equal to or greater than 50% of the entire length of the image forming lens, and the rear side lens group including at least one anamorphic surface;

a light receiving element array configured to photo-electrically convert image information of the image of the original document formed thereupon by the image forming lens into electrical signals;

an illumination device configured to illuminate the original document;

a scanning device configured to scan the original document;

a signal processing device configured to process the signals obtained from the light receiving element array by scanning of the original document with the scanning device;

an image processing device configured to process the signals processed by the signal processing device; and an image outputting device configured to form and output the image of the original document according to the signals processed by the image processing device.

148. An image forming lens unit, comprising:

an image forming lens including a front side lens group having 2 to 4 pieces of lenses and arranged at an object side, said 2 to 4 pieces of lenses including at least one positive lens, and a rear side lens group constituted of one negative lens and arranged at an image forming side, a back-focus of the image forming lens in an actual usage state thereof being equal to or smaller than 25% of an entire length of the image forming lens and an air space between the front side lens group and the rear side lens group being equal to or greater than 50% of the entire length of the image forming lens; and means for supporting each lens of the front side lens group and the rear side lens group and for integrating the front side lens group and the rear side lens group with each other.

149. An original document reading module for forming an image of an original document and converting image information of the image of the original document into electrical signals, comprising:

an image forming lens configured to form the image of the original document, the image forming lens including a front side lens group having 2 to 4 pieces of lenses and arranged at an object side, said 2 to 4 pieces of lenses including at least one positive lens, and a rear side lens group constituted of one negative lens and arranged at an image forming side, a back-focus of the image forming lens in an actual usage state thereof being equal to or smaller than 25% of an entire length of the image forming lens, and an air space between the front side lens group and the rear side lens group being equal to or greater than 50% of the entire length of the image forming lens; and means for converting the image information of the image of the original document formed thereupon by the image forming lens into the electrical signals.

150. An original document reading apparatus, comprising:

means for scanning an original document;

means for converting image information of an image of the original document formed thereupon into electrical signals;

an image forming lens configured to image a light flux from the image of the original document being scanned by the scanning device onto the converting means, the image forming lens including a front side lens group having 2 to 4 pieces of lenses and arranged at an object side, said 2 to 4 pieces of lenses including at least one positive lens, and a rear side lens group constituted of one negative lens and arranged at an image forming side, a back-focus of the image forming lens in an actual usage state thereof being equal to or smaller than 25% of an entire length of the image forming lens and an air space between the front side lens group and the rear side lens group being equal to or greater than 50% of the entire length of the image forming lens;

means for signal-processing the electrical signals of the converting means; and means for applying image processing to the electrical signals processed by the signal-processing means.

151. An image information processing apparatus, comprising:

an original document reading device configured to form an image of an original document and to convert image information of the image of the original document into electrical signals, the original document reading device including;

means for scanning the original document, means for converting the image information of the image of the original document into the electrical signals;

an image forming lens configured to image a light flux from the image of the original document being scanned by the scanning means onto the converting means, the image forming lens including a front side lens group having 2 to 4 pieces of lenses and arranged at an object side, said 2 to 4 pieces of lenses including at least one positive lens, and a rear side lens group constituted of one negative lens and arranged at an image forming side, a back-focus of the image forming lens in an actual usage state thereof being equal to or smaller than 25% of an entire length of the image forming lens, and an air space between the front side lens group and the rear side lens group being equal to or greater than 50% of the entire length of the image forming lens, means for signal-processing an output signal of the converting means, and means for applying image processing to the signal processed by the signal-processing means; and means for outputting the electrical signals of the original document reading device.

152. An original document reading module for forming an image of an original document and converting image information of the image into electrical signals, comprising:

an image forming lens configured to form the image of the original document, the image forming lens including a front side lens group having 2 or more lenses and arranged at an object side, said 2 or more lenses including at least one positive lens, and a rear side lens group constituted of one negative lens and arranged at an image forming side, a back-focus of the image forming lens in an actual usage state thereof being equal to or smaller than 25% of an entire length of the image forming lens, an air space between the front side lens group and the rear side lens group being equal to or greater than 50% of the entire length of the image forming lens, and the rear side lens group including at least one anamorphic surface; and means for converting the image information of the image of the original document formed by the image forming lens into the electrical signals.

153. An original document reading apparatus for reading an image of an original document, comprising:

an image forming lens configured to form the image of the original document, the image forming lens including a front side lens group having 2 or more lenses and arranged at an object side, said 2 more lenses including at least one positive lens, and a rear side lens group constituted of one negative lens and arranged at an image forming side, a back-focus of the image forming lens in an actual usage state thereof being equal to or smaller than 25% of an entire length of the image forming lens, an air space between the front side lens group and the rear side lens group being equal to or greater than 50% of the entire length of the image forming lens, and the rear side lens group including at least one anamorphic surface;

means for converting image information of the image of the original document formed by the image forming lens into electrical signals;

means for illuminating the original document;

means for scanning the original document;

means for signal-processing signals obtained from the converting means by scanning of the original document with the scanning means; and means for applying image processing to the signals processed by the signal-processing means.

154. An image forming apparatus, comprising:

an image forming lens for forming an image of an original document, the image forming lens including a front side lens group having 2 or more lenses and arranged at an object side, said 2 or more lenses including at least one positive lens, and a rear side lens group constituted of one negative lens and arranged at an image forming side, a back-focus of the image forming lens in an actual usage state thereof being equal to or smaller than 25% of an entire length of the image forming lens, an air space between the front side lens group and the rear side lens group being equal to or greater than 50% of the entire length of the image forming lens, and the rear side lens group including at least one anamorphic surface;

means for converting image information of the image of the original document formed by the image forming lens into electrical signals;

means for illuminating the original document;

means for scanning the original document;

means for signal-processing signals obtained from the converting means by scanning of the original document;

means for applying image processing to the signals processed by the signal processing means; and means for forming and outputting the image of the original document according to the signals processed by the image processing means.

155. A method of reading an image of an original document, comprising the steps of:

providing an image forming lens comprising a front side lens group having 2 to 4 pieces of lenses and arranged at an object side, said 2 to 4 pieces of lenses including at least one positive lens, and a rear side lens group constituted of one negative lens and arranged at an image forming side, a back-focus of the image forming lens in an actual usage state thereof being equal to or smaller than 25% of an entire length of the image forming lens, and an air space between the front side lens group and the rear side lens group being equal to or greater than 50% of the entire length of the image forming lens;

scanning the original document and forming the image of the original document on a light receiving element array by the image forming lens; and converting image information of the image of the original document formed on the light receiving element array by the image forming lens to electrical signals with the light receiving element array.

156. The method according to claim 155, wherein, in the step of providing the image forming lens, an incident side surface of the rear side lens group is non-spherical.

157. The method according to claim 155, wherein, in the step of providing the image forming lens, an imaging side surface of the rear side lens group is non-spherical.

158. The method according to claim 155, wherein, in the step of providing the image forming lens, the rear side lens group is plastic.

159. The method according to claim 155, wherein, in the step of providing the image forming lens, the back-focus of the image forming lens in the actual usage state thereof is equal to or smaller than 10% of the entire length of the image forming lens.

160. The method according to claim 155, wherein the step of providing the image forming lens includes the step of providing a supporting device to support each lens of the front side lens group and the rear side lens group and to integrate the front side lens group and the rear side lens group with each other so as to form an image forming lens unit, and wherein in the step of scanning and forming of the image of the original document, the original document is scanned and the image of the original document is formed on the light receiving element array with the image forming lens unit.

161. The method according to claim 155, wherein the step of scanning and forming of the image of the original document includes the step of illuminating the original document at an original document illuminating part at a predetermined position with an illuminating device while conveying the original document relative to the original document illuminating part.

162. The method according to claim 155, wherein the step of scanning and forming of the image of the original document includes the step of illuminating the original document in the main scanning direction with an illuminating device while maintaining a fixed optical path length from the image forming lens to the light receiving element array, guiding a light flux from a part of the original document illuminated by the illuminating device to the image forming lens via a series of mirrors, moving the illuminating device in the sub-scanning direction and moving the series of mirrors such that the optical path length from the illuminating device to the image forming lens is constant.

163. A method of reading an image of an original document, comprising the steps of:

providing an image forming lens comprising a front side lens group having 2 to 4 pieces of lenses and arranged at an object side, said 2 to 4 pieces of lenses including at least one positive lens, and a rear side lens group constituted of one negative lens and arranged at an image forming side, an outer shape of the rear side lens group having a rotational asymmetry with respect to an optical axis of the image forming lens, a back-focus of the image forming lens in an actual usage state thereof being equal to or smaller than 25% of an entire length of the image forming lens, and an air space between the front side lens group and the rear side lens group being equal to or greater than 50% of the entire length of the image forming lens;

scanning the original document and forming the image of the original document on a light receiving element array by the image forming lens; and converting image information of the image of the original document formed on the light receiving element array by the image forming lens to electrical signals with the light receiving element array.

164. The method according to claim 163, wherein, in the step of providing the image forming lens, the outer shape of the rear side lens group is in a strip-like form long in a main scanning direction.

165. The method according to claim 163, wherein, in the step of providing the image forming lens, the rear side lens group is plastic and includes an engaging part for positioning, supporting or fixing the image forming lens.

166. A method of reading an image of an original document, comprising the steps of:

providing an image forming lens comprising a front side lens group having 2 to 4 pieces of lenses and arranged at an object side, said 2 to 4 pieces of lenses including at least one positive lens, and a rear side lens group constituted of one negative lens and arranged at an image forming side, a back-focus of the image forming lens in an actual usage state thereof being equal to or smaller than 25% of an entire length of the image forming lens, and an air space between the front side lens group and the rear side lens group being equal to or greater than 50% of the entire length of the image forming lens; and scanning the original document and forming the image of the original document on a light receiving element array by the image forming lens, and converting image information of the image of the original document formed on the light receiving element array by the image forming lens to electrical signals with the light receiving element array, and integrating the rear side lens group of the image forming lens and the light receiving element array with each other so that the image forming lens and the light receiving element array forms an original document reading module.

* * * * *